United States Patent [19]

Bloomberg et al.

[11] Patent Number: 5,187,753
[45] Date of Patent: Feb. 16, 1993

[54] METHOD AND APPARATUS FOR IDENTIFICATION AND CORRECTION OF DOCUMENT SKEW

[75] Inventors: Dan S. Bloomberg, Palo Alto; Gary E. Kopec, Belmont, both of Calif.

[73] Assignee: Xerox Corporation, Rochester, N.Y.

[21] Appl. No.: 448,774

[22] Filed: Dec. 8, 1989

[51] Int. Cl.$^5$ .................. G06K 9/32; G06K 9/38; G06K 9/46; G09G 1/06
[52] U.S. Cl. .................................... 382/46; 382/18; 382/51; 340/727; 395/137
[58] Field of Search ............... 382/30, 46, 51, 18; 358/488; 340/727; 395/137

[56] References Cited

U.S. PATENT DOCUMENTS

| | | | |
|---|---|---|---|
| 3,831,146 | 8/1974 | Rundle | 382/46 |
| 4,052,699 | 10/1977 | Micka et al. | 340/146.3 |
| 4,338,588 | 7/1982 | Chevillat et al. | 340/146.3 |
| 4,414,685 | 11/1983 | Sternberg | 382/49 |
| 4,499,499 | 2/1985 | Brickman et al. | 358/263 |
| 4,533,959 | 8/1985 | Sakurai | 358/280 |
| 4,558,461 | 12/1985 | Schlang | 382/9 |
| 4,633,507 | 12/1986 | Cannistra et al. | 382/61 |
| 4,700,400 | 10/1987 | Ross | 382/27 |
| 4,723,297 | 2/1988 | Postl | 382/46 |
| 4,742,558 | 5/1988 | Ishibashi et al. | 382/56 |
| 4,747,150 | 5/1988 | Knutsson et al. | 382/21 |
| 4,747,151 | 5/1988 | Knutsson et al. | 382/21 |
| 4,747,152 | 5/1988 | Knutsson et al. | 382/21 |
| 4,748,676 | 5/1988 | Miyagawa et al. | 382/46 |
| 4,759,075 | 7/1988 | Lipkie et al. | 382/46 |
| 4,759,076 | 7/1988 | Tanaka et al. | 382/46 |
| 4,783,826 | 11/1988 | Koso | 382/8 |
| 4,783,828 | 11/1988 | Sadjadi | 382/21 |
| 4,786,976 | 11/1988 | Takao et al. | 358/283 |
| 4,791,679 | 12/1988 | Barski et al. | 382/55 |
| 4,805,031 | 2/1989 | Powell | 358/284 |
| 4,809,344 | 2/1989 | Peppers et al. | 382/32 |
| 4,817,186 | 3/1989 | Goolsbey et al. | 382/9 |
| 4,821,333 | 4/1989 | Gillies | 382/49 |
| 4,827,330 | 5/1989 | Walsh et al. | 358/280 |
| 4,858,018 | 8/1989 | Tanaka | 358/456 |
| 4,876,730 | 10/1989 | Britt | 382/37 |
| 4,912,559 | 3/1990 | Ariyoshi et al. | 358/261.1 |
| 4,926,490 | 5/1990 | Mano | 382/9 |
| 4,941,189 | 7/1990 | Britt | 382/46 |
| 4,953,230 | 8/1990 | Kurose | 382/46 |
| 5,001,766 | 3/1991 | Baird | 382/46 |

FOREIGN PATENT DOCUMENTS

| | | |
|---|---|---|
| 0287027 | 10/1988 | European Pat. Off. |
| 0287995 | 10/1988 | European Pat. Off. |
| 0288266 | 10/1988 | European Pat. Off. |
| 0308673 | 3/1989 | European Pat. Off. |
| 61-225974 | 10/1986 | Japan |

OTHER PUBLICATIONS

Baird, *SPSE Symposium on Hybrid Imaging Systems*, Rochester, N.Y., May 20-21, 1987, pp. 21-24.

Postl, "Detection of Linear Oblique Str..tures and Skew Scan in Digitized Documents," International Conference on Pattern Recognition (1986).

Wong et al., "Document Analysis System," *IBM J. Res. Development* (1982) 26:647-656.

Sternberg, "Biomedical Image Processing," *IEEE* (1983) pp. 22-34.

Maragos, "Tutorial on Advances in Morphological Image Processing and Analysis," *Optical Engineering* (1987) 26:623-632.

Haralick et al., "Image Analysis Using Mathematical Morphology," *IEEE*, vol. PAMI-9, No. 4, Jul. 1987, pp. 532-550.

Hunter et al., "International Digital Facsimile Coding Standards" *Proceedings of the IEEE* (1980) 68:854-867.

Spitz, USSN 07/454,339, filed Dec. 21, 1989, entitled Determination of Image Skew Angle from Data Including Data in Compressed Form.

*Primary Examiner*—Leo H. Boudreau
*Assistant Examiner*—Michael R. Cammarata
*Attorney, Agent, or Firm*—Townsend and Townsend

[57] ABSTRACT

A method and apparatus for identifying and correcting for document skew. Lines of a bitmap are scanned and a variance in the number of ON pixels as a function of skew angle is calculated. Skew of the original document occurs when the variance is a maximum. Once the skew has been identified, the document is deskewed accordingly.

20 Claims, 3 Drawing Sheets

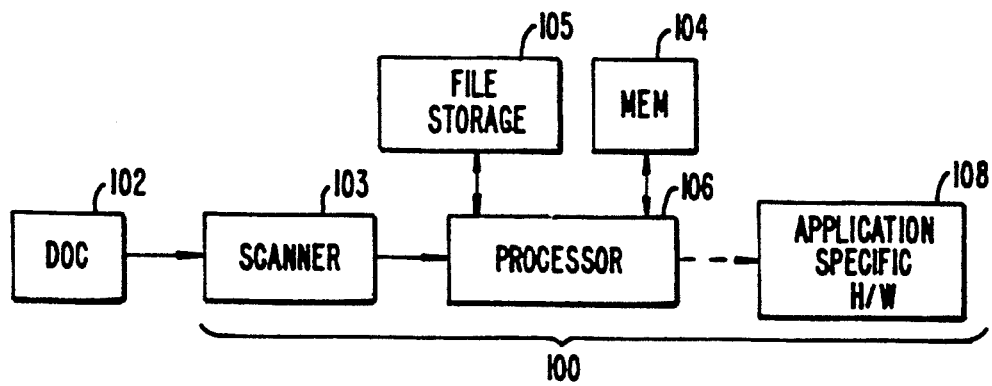
FIG._1A.
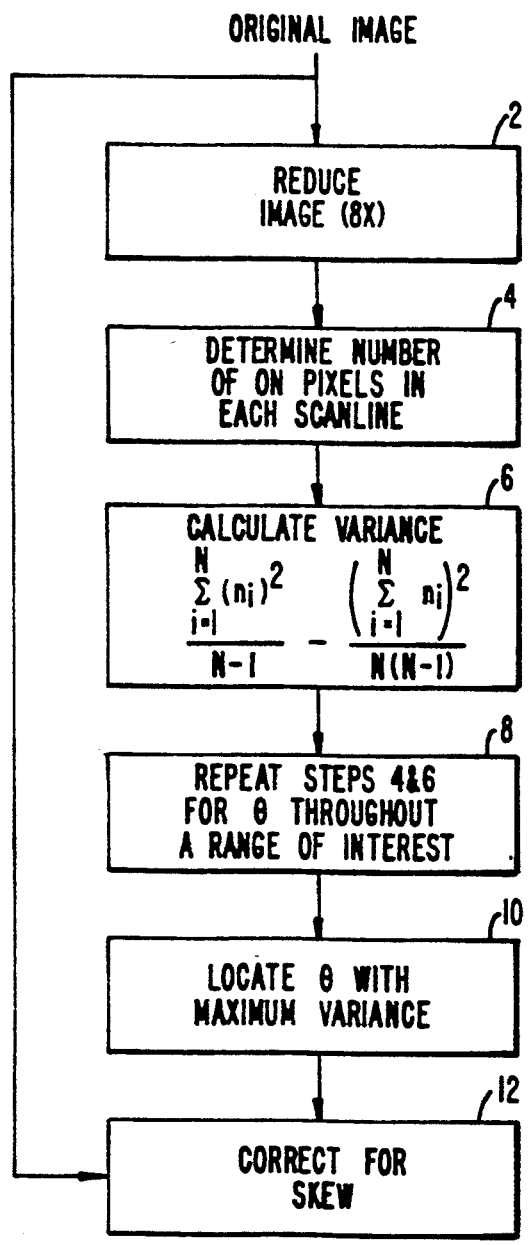
FIG._1B.

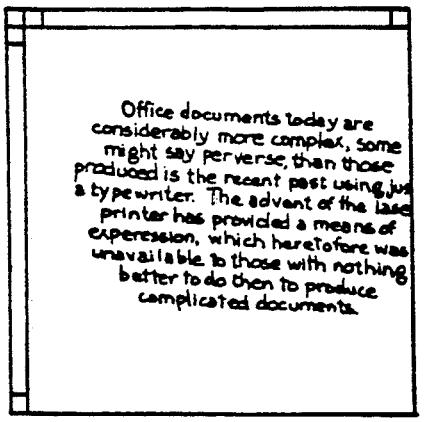
FIG._2A.
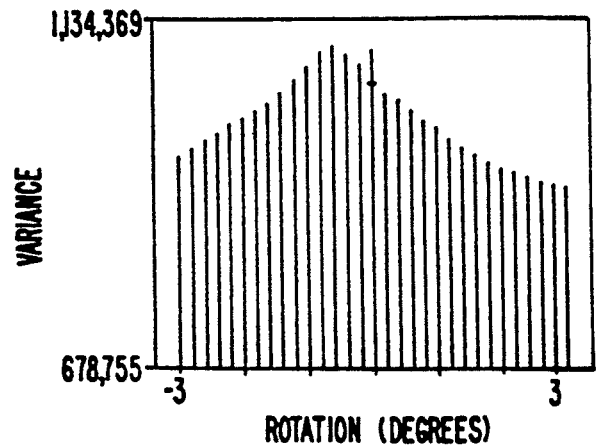
FIG._2B.
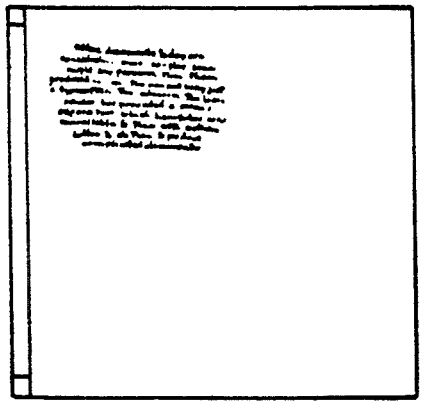
FIG._3A.
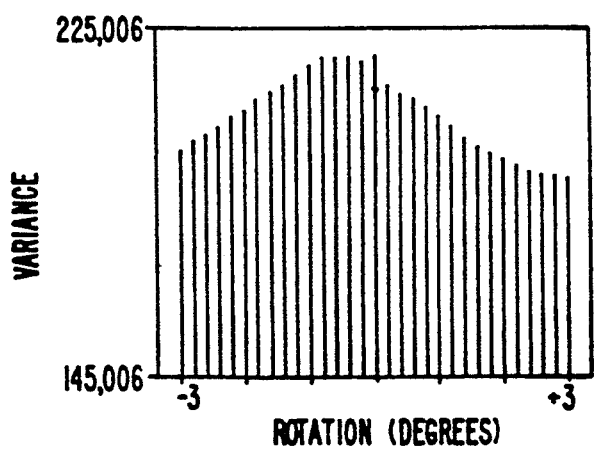
FIG._3B.

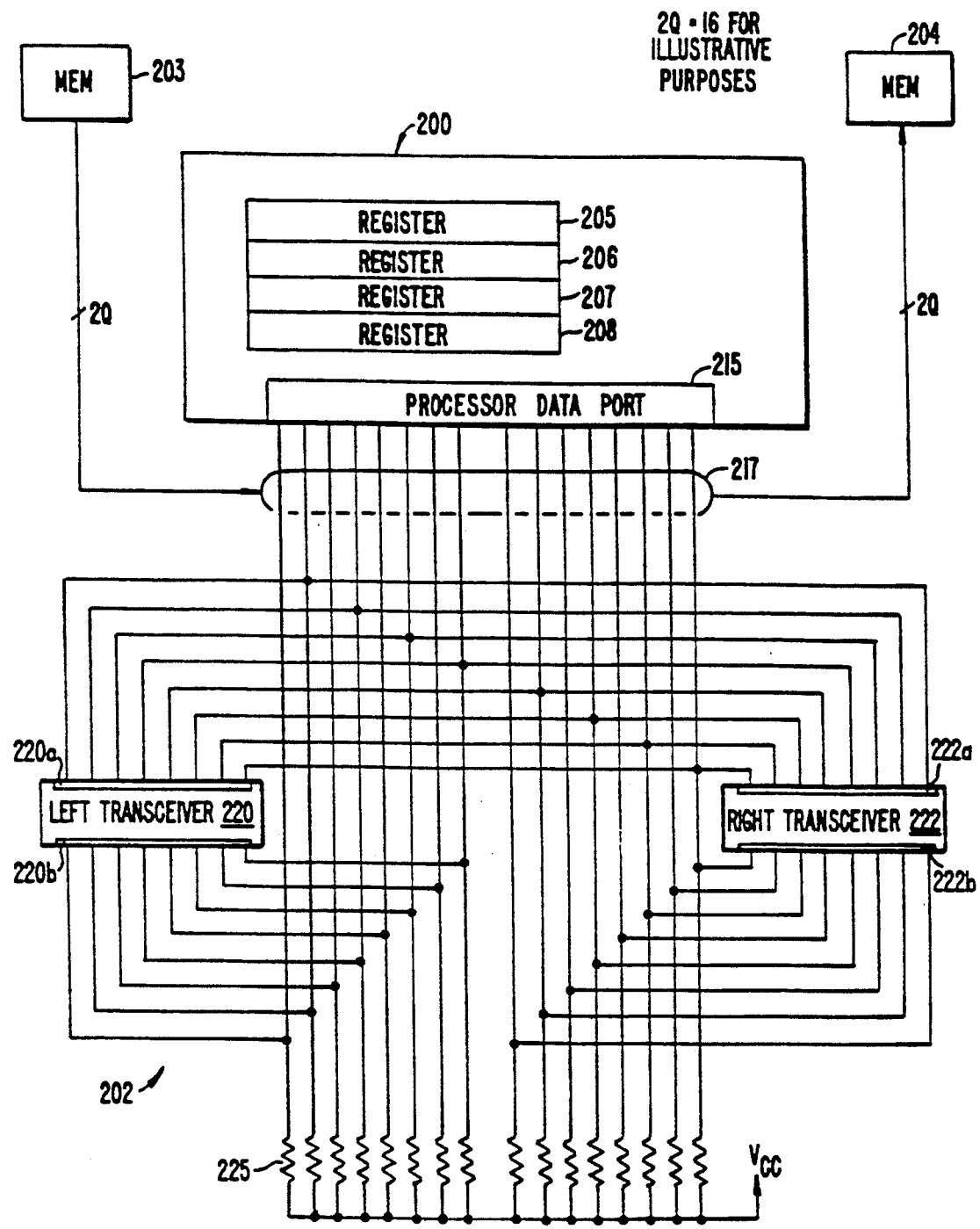
FIG._4.

METHOD AND APPARATUS FOR IDENTIFICATION AND CORRECTION OF DOCUMENT SKEW

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to the field of image processing. More specifically, in one embodiment the invention provides a method and apparatus for determining the skew of a document containing text and/or graphics and, optionally, adjusting the skew of the document to a desired angle.

In many image processing applications it is desirable to determine skew of a document image. For example, for a text image skew is the angle at which lines of the text image differ from a pre-selected reference line, such as a horizontal line. Optical character recognition systems are exemplary of an image processing system in which it would be desirable to know the angle of skew of text since such systems typically scan horizontally through a portion of a document when processing an image of the document. If a text image is not properly oriented, OCR systems may have difficulty in "recognizing" individual characters and, in severe cases, may actually scan through multiple lines of text.

A variety of methods and devices for determining document skew have been proposed. While meeting with some success, prior methods have met with a variety of limitations. For example, some methods/devices require non-conventional or special purpose hardware, increasing the complexity and cost of such systems. Some systems require unacceptable amounts of computer processing time or computer processing capability. Still other methods operate only on text or require that specialized data representations be utilized.

From the above it is seen that an improved method and apparatus for determining and adjusting document skew is desired.

SUMMARY OF THE INVENTION

The present invention provides an improved method and apparatus for identifying the skew of a document from a bitmap image. Image reduction is optionally used to enhance performance. The image is either rotated or vertically sheared to simulate rotation and a statistical measure, such as the variance of the number of pixels on a scanline, is maximized to determine skew angle.

The method/apparatus will have a variety of applications including use within a document recognition system. The accuracy of most optical character recognition (OCR) systems, for example, degrades badly when text is skewed by more than about 5%. Using the invention herein, an OCR system may quickly check for skew and adjust the skew of the document accordingly.

Alternatively, the present invention could be used within an electro-reprographic (ER) copier. The human eye can detect even a small amount of document skew. Accordingly, such ER copiers may check and compensate for document skew without mechanical complexity using the invention herein. The invention will be particularly useful in cases when an original that is being copied is skewed. Of course, these applications are merely illustrative of the variety of applications of the method and apparatus herein. Other possible applications include, but are not limited to, skew correction for image coding, and the like.

Accordingly, in one embodiment the invention provides an optical character recognition system. The optical character recognition system includes input means for inputting an image of a document; deskewing means comprising: (i) means for rotating the image from at least a first skew angle to a second skew angle; (ii) means for calculating variance of a number of ON pixels in a scanline of the image at each of the skew angles; and (iii) means for rotating the image to about an angle which substantially maximizes the variance to produce a deskewed image. The optical character recognition system further includes means for identifying characters in the deskewed image; and means for outputting the characters in the image.

In another embodiment the invention provides apparatus for copying a document. The apparatus includes input means for inputting an image of a document and deskewing means. The deskewing means includes: (i) means for rotating the image from at least a first skew angle to a second skew angle; (ii) means for calculating variance of a number of ON pixels in a scanline of the image at each of the skew angles; and (iii) means for rotating the image to about an angle which substantially maximizes the variance to produce a deskewed image of the document. The device then further includes means for outputting the deskewed image of the document.

A further understanding of the nature and advantages of the inventions herein may be realized by reference to the remaining portions of the specification and the attached drawings.

BRIEF DESCRIPTION OF THE DRAWINGS

FIG. 1A is an overall block diagram illustrating hardware used herein according to one embodiment of the invention and FIG. 1B is a flowchart illustrating operation of a preferred embodiment of the invention;

FIGS. 2A and 2B are a text image and a plot of variance as a function of skew angle, respectively;

FIGS. 3A and 3B are a text image and plot of variance as a function of skew angle for a reduced image; and FIG. 4 illustrates an improved reduction operation.

DESCRIPTION OF THE PREFERRED EMBODIMENTS

CONTENTS

I. Definitions and Terminology
II. Details of Operation of the Invention
III. Graphical Illustration of the Invention
VI. Discussion of the Software
V. Conclusion

I. Definitions and Terminology

The present discussion deals with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image.

Pixels are defined to be ON if they are black and OFF if they are white. It should be noted that the designation of black as ON and white as OFF reflects the fact that most documents of interest have a black foreground and a white background. While the techniques of the present invention could be applied to negative images as well, the discussion will be in terms of black on white. In some cases the discussion makes reference to a "don't care" pixel which may be either an ON or an OFF pixel.

A "solid region" of an image refers to a region extending many pixels in both dimensions within which substantially all the pixels are ON.

A "textured region" of an image refers to a region that contains a relatively fine-grained pattern. Examples of textured regions are halftone or stippled regions.

AND, OR, and XOR are logical operations carried out between two images on a pixel-by-pixel basis.

NOT is a logical operation carried out on a single image on a pixel-by-pixel basis.

"Expansion" is a scale operation characterized by a SCALE factor N, wherein each pixel in a source image becomes an N×N square of pixels, all having the same value as the original pixel.

"Reduction" is a scale operation characterized by a SCALE factor N and a threshold LEVEL M. Reduction with SCALE=N entails dividing the source image into N×N squares of pixels, mapping each such square in the source image to a single pixel on the destination image. The value for the pixel in the destination image is determined by the threshold LEVEL M, which is a number between 1 and $N^2$. If the number of ON pixels in the pixel square is greater or equal to M, the destination pixel is ON, otherwise it is OFF.

"Subsampling" is an operation wherein the source image is subdivided into smaller (typically square) elements, and each element in the source image is mapped to a smaller element in the destination image. The pixel values for each destination image element are defined by a selected subset of the pixels in the source image element. Typically, subsampling entails mapping to single pixels, with the destination pixel value being the same as a selected pixel from the source image element. The selection may be predetermined (e.g., upper left pixel) or random.

A "4-connected region" is a set of ON pixels wherein each pixel in the set is laterally or vertically adjacent to at least one other pixel in the set.

An "8-connected region" is a set of ON pixels wherein each pixel in the set is laterally, vertically, or diagonally adjacent to at least one other pixel in the set.

A number of morphological operations map a source image onto an equally sized destination image according to a rule defined by a pixel pattern called a structuring element (SE). The SE is defined by a center location and a number of pixel locations, each having a defined value (ON or OFF). The pixels defining the SE do not have to be adjacent each other. The center location need not be at the geometrical center of the pattern; indeed it need not even be inside the pattern.

A "solid" SE refers to an SE having a periphery within which all pixels are ON. For example, a solid 2×2 SE is a 2×2 square of ON pixels. A solid SE need not be rectangular.

A "hit-miss" SE refers to an SE that specifies at least one ON pixel and at least one OFF pixel.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image.

"Dilation" is a morphological operation wherein a given pixel in the source image being ON causes the SE to be written into the destination image with the SE center at the corresponding location in the destination image. The SE's used for dilation typically have no OFF pixels.

"Opening" is a morphological operation that consists of an erosion followed by a dilation. The result is to replicate the SE in the destination image for each match in the source image.

"Closing" is a morphological operation consisting of a dilation followed by an erosion.

A "mask" refers to an image, normally derived from an original image, which contains substantially solid regions of ON pixels in a region of interest in the original image.

The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

II. Details of Operation of the Invention

The present invention provides a method and apparatus for determining skew directly from a bitmap. In preferred embodiments, all or substantially all pixels in the bitmap are utilized. The variance of the number of ON pixels in a scanline is determined as a function of the angle of rotation of the bitmap. This variance will be substantially maximized when the image has very close to zero skew. Since the method uses all the pixels in the image, it will work on images with only text, only line graphics (if there are some horizontal lines), and on some images with mixed text, stipples and/or halftones.

FIG. 1A is a block diagram of an image analysis system 100 within which the present invention may be embodied. The basic operation of system 100 is to extract or eliminate certain characteristic portions of a document 102. To this end, the system includes a scanner 103 which digitizes the document on a pixel basis, and provides a resultant data structure. Depending on the application, the scanner may provide a binary image (a singel bit per pixel) or a gray scale image (a plurality of bits per pixel). This data structure contains the raw content of the document, to the precision of the resolution of the scanner. This data structure, typically referred to as an image, may be sent to a memory 104 or stored as a file in a file storage unit 105, which may be a disk or other mass storage device.

A processor 106 controls the data flow and performs the image processing. Processor 106 may be a general purpose computer, a special purpose computer optimized for image processing operations, or a combination of a general purpose computer and auxiliary special purpose hardware. If a file storage unit is used, the image is transferred to memory 104 prior to processing. Memory 104 may also be used to store intermediate data structures and possibly a final processed data structure.

The result of the image processing, of which the present invention forms a part, can be a derived image, numerical data (such as coordinates of salient features of the image) or a combination. This information may be communicated to application-specific hardware 108, which may be a printer or display, or may be written back to file storage unit 105.

FIG. 1B is a flowchart illustrating operation of the invention herein. In step 2, the input binary image is optionally reduced so as to accelerate operation of the invention. In preferred embodiments, where the image is scanned at 300 pixels/inch, a reduction of about 4× to 8× is utilized and has provided satisfactory results while significantly increasing the operational speed of the invention. While a conventional "reduction" step is used for purposes of illustration herein, other forms of reduction will also perform satisfactorily such as simple sub-sampling or a thresholded reduction.

In steps 4 to 6 the variance in the number of ON pixels is calculated for a particular angle of rotation of the image. As used herein, the "variance" in the number of ON pixels may mean:

$$\frac{\sum_{i=1}^{N}(n_i)^2}{C_1} - \frac{\left(\sum_{i=1}^{N}n_i\right)^2}{C_2}$$

where:

N is the number of lines utilized;

n is the number of ON pixels in a line;

i is a counter for the lines; and $C_1$ and $C_2$ are constants which may generally be ignored.

Although not critical to operation of the invention, substantially all of the lines of the image are utilized in calculating the variance. When similar documents will be encountered from scan to scan, it will be possible to utilize only a select sampling of scan lines or even a single scan line. In the above formula, all terms except the sum of the square of the number of pixels in a line will be substantially constant and can be ignored. Therefore, in one embodiment, only the sum of the square of the number of ON pixels on each scanline as a function of angle of rotation is calculated. This differs from the variance by a constant independent of skew.

While the invention is illustrated herein by way of the calculation of the square of the number of pixels in a scanline, it will be recognized that other powers could be utilized; any power greater than 1 of the number of ON pixels in a scanline could be effectively utilized. Taking the square is preferred because it is typically faster than any other power. For brevity the above formula in any of its alternative forms is referred to as "variance" herein.

In step 8, the variance is calculated at a wide variety of relatively closely spaced rotation angles In some embodiments, the image is not actually rotated in order to calculate variance, but instead vertical shear is applied to the image. In a vertical shear operation, vertical blocks of the image are moved upward (or downward) some number of pixels, and the number of pixels shifted increases by one for each block to the right. The horizontal width of each block varies inversely with the shear angle. For example, to simulate a rotation by one degree (approximately 1/57th of a radian), the first vertical block of width 28 pixels is left unchanged, while the next vertical block of width 57 pixels is shifted up by one pixel, the next vertical block of width 57 pixels is shifted up by two pixels, etc.

In preferred embodiments, the image is rotated both positively and negatively about −5 to +5 degrees ($\theta_{max}$) since, in most applications, document skew will not exceed this amount. After calculation of the variance at a number of rotation angles, the angle at which the variance is substantially a maximum is located at step 10 by means well known to those of skill in the art. The maximum in variance need not be located exactly, but it is preferred that the maximum variance be located within at least about ±20% and most preferably within about ±10% such that the variance is substantially a maximum. In some embodiments, the maximum is located by evaluating the variance at a variety of increments between ±$\theta_{max}$ and interpolated to find the maximum. Other more sophisticated methods may alternatively be used such as interval halving techniques. The angle at which the variance is a maximum will be very close to the angle of skew of the document.

The advantage of performing the operations at reduced scale is that the time to do each operation (such as vertical shearing or counting) varies with the square of the reduction factor. Thus, a reduction by a factor of 4 reduces the computation time by a factor of 16.

Of course, there is a loss in accuracy when a reduced image is used. The relation between the accuracy and the resolution is as follows: the angular resolution (in radians) of the deskew algorithm is approximately 1/(image width in pixels). Thus, if the original image is 2500 pixels wide and is reduced by a factor of 8, the angular resolution will be about 1/300, or about 0.2 degrees which is acceptable in most commercial applications. In practice, the error is typically found to be smaller than this.

Optionally in step 12 the original image is rotated by the negative of the angle determined in step 10 so as to deskew the image. Skew correction is achieved by rotating the image. Efficient means for rotating an image using bitblt (i.e., raster operations) exist are known and are discussed in, for example, Paeth, "A Fast Algorithm for Fast Raster Rotation," *Proc. Vision Interface '86*, Vancouver B.C., May 1986, pg. 77–81, which is incorporated by reference herein for all purposes. For small angles of rotation (say, less than 5 degrees), rotation can be approximated by two orthogonal shears. For larger angles, rotation can be approximated by three shears, with the first and third shear of equal magnitude in the horizontal direction and the second larger shear in the vertical direction.

One requirement of efficient operation, is that thresholded reduction must be done quickly. Suppose it is desired to reduce an image by a factor of two in the vertical direction. One way to do this is to use a raster operation (bitblt - bit block transfer) to logically combine the odd and even rows, creating a single row of the reduced image for each pair of rows in the original. The same procedure can then be applied to the columns of the vertically squashed image, giving an image reduced by a factor of two in both directions.

The result, however, depends on the logical operations of the horizontal and vertical raster operations. Obtaining a result with LEVEL=1 or 4 is straightforward. If an OR is used for both raster operation orientations, the result is an ON pixel if any of the four pixels within the corresponding 2×2 square of the original were ON. This is simply a reduction with LEVEL=1.

Likewise, if an AND for both raster operation orientations, the result is a reduction with LEVEL=4, where all four pixels must be ON.

A somewhat different approach is used to obtain a reduction with LEVEL=2 or 3. Let the result of doing a horizontal OR followed by a vertical AND be a reduced image R1, and let the result from doing a horizontal AND followed by a vertical OR be a reduced image R2. A reduction with LEVEL=2 is obtained by ORing R1 with R2, and a reduction with LEVEL=3 is obtained by ANDing R1 with R2.

The procedure may not be computationally efficient if implemented as described above. On some computers, such as Sun workstations, raster operations are done in software. The image is stored as a block of sequential data, starting with the first row of the image, moving left-to-right, then the second row, etc. Consequently, the raster operations between rows are fast, because 16 or 32 bits in two words can be combined in one operation. But to perform a raster operation between two columns, the corresponding bits must be found, two bits at a time (one from each column), before the logical operations can be done. It turns out that the time, per pixel, to do the vertical raster operations is at least 25 times greater than the horizontal ones. In fact, when the method is implemented entirely with raster operations, over 90 percent of the time is devoted to the vertical operations.

Fortunately, there is a simple and very fast way to implement the logical operations between columns. Rather than use column raster operations, take 16 sequential bits, corresponding to 16 columns in one row. These 16 bits can be accessed as a short integer. These 16 bits are used as an index into a $2^{16}$-entry array (i.e., a lookup table) of 8-bit objects. The 8-bit contents of the array give the result of ORing the first bit of the index with the second, the third bit with the fourth . . . and on to the 15th bit with the 16th. Actually, two arrays are needed, one for ORing the 8 sets of adjacent columns, and one for ANDing the columns. It should be understood that the numerical example is just that, an example. It is also possible to implement this as a $2^8$-entry array of 4-bit objects, or any one of a number of other ways.

The use of lookup tables to implement column logical operations is about as fast, per pixel, as Sun's row raster operations. A 1000×1000 pixel image can be reduced on a Sun 3/260, with either LEVEL=1 or 4, to a 500×500 pixel image in 0.10 second. On a Sun 4/260, the operation takes about 0.06 second.

As discussed above, 2×2 reductions require a first logical operation between rows followed by a second, possibly different, logical operation between columns. Moreover, some threshold levels require two intermediate reduced images which are then combined. The table lookup technique for column operations can become cumbersome if it is desired to have a very wide pixelword. Either the table becomes enormous or one needs special techniques of looking up parts of the wide pixelword in multiple parallel tables. The latter, while clearly superior, does require some way to use portions of the data word as memory addresses, which may not otherwise be necessary.

FIG. 4 is a logic schematic of specialized hardware for performing a logical operation between vertically adjacent 2Q-bit pixelwords and a pairwise bit reduction of the resulting 2Q-bit pixelword (bits 0 through 2Q-1). Although the drawing shows a 16-pixel word, the benefits of this hardware would become manifest for much longer pixelwords where the lookup table technique has become cumbersome. A 512-bit pixelword is contemplated, since a line of image would represent only a few pixelwords.

The reduction of the two pixelwords occurs in two stages, designated 200 and 202. In the first stage, a vertically adjacent pair of pixelwords is read from a first memory 203, and the desired first logical operation is carried out between them. The desired second logical operation is then carried out between the resulting pixelword and a version of the pixelword that is shifted by one bit. This provides a processed pixelword having the bits of interest (valid bits) in every other bit position. In the second stage, the valid bits in the processed pixelword are extracted and compressed, and the result stored in a second memory 204. Memory 203 is preferably organized with a word size corresponding to the pixelword size. Memory 204 may be organized the same way.

The preferred implementation for stage 200 is an array of bit-slice processors, such as the IDT 49C402 processor, available from Integrated Device Technology. This specific processor is a 16-bit wide device, each containing 64 shiftable registers. Thirty-two such devices would be suitable for a 512-bit pixelword. For simplification, only four registers 205, 206, 207, and 208 of one 16-bit device 210 are shown. Among the processor's operations are those that logically combine the contents of first and second registers, and store the result in the first. The processor has a data port 215, which is coupled to a data bus 217.

Second stage 202 includes first and second latched transceivers 220 and 222, each half as wide as the pixelword. Each transceiver has two ports, designated 220a and 220b for transceiver 220 and 222a and 222b for transceiver 222. Each transceiver is half as wide as the pixelword. Ports 220a and 222a are each coupled to the odd bits of data bus 217, which correspond to the bits of interest. Port 220b is coupled to bits 0 through (Q-1) of the data bus, while port 222b is coupled to bits Q through (2Q-1). The bus lines are pulled up by resistors 125 so that undriven lines are pulled high.

Consider the case of a 2×2 reduction with LEVEL=2. The sequence of operations requires that (a) a vertically adjacent pair of pixelwords be ANDed to form a single 2Q-bit pixelword, adjacent pairs of bits be ORed to form a Q-bit pixelword, and the result be stored; (b) the vertically adjacent pair of pixelwords be ORed, adjacent bits of the resultant 2Q-bit pixelword be ANDed, and the resultant Q-bit pixelword be stored; and (c) the two Q-bit pixelwords be ORed.

To effect this, a pair of vertically adjacent pixelwords are read from first memory 203 onto data bus 217 and into registers 205 and 206. Registers 205 and 206 are ANDed and the result stored in registers 207 and 208. The content of register 208 is shifted one bit to the right, registers 207 and 208 are ORed, and the result is stored in register 208. Registers 205 and 206 are ORed, and the result stored in registers 206 and 207. The content of register 207 is right shifted by one bit, registers 206 and 207 are ANDed, and the result stored in register 207.

At this point, register 207 contains the result of ORing the two pixelwords and ANDing pairs of adjacent bits, while register 208 contains the result of ANDing the pixelwords and ORing pairs of adjacent bits. However, registers 207 and 208 contain the valid bits in the odd bit positions 1, 3, . . . (2Q-1). For a reduction with LEVEL=2, registers 207 and 208 are ORed and the result is made available at processor data port 215 which is coupled to data bus 217.

The odd bits of the data bus are latched into transceiver 220 through port 220a, resulting in a Q-bit pixelword with the valid bits in adjacent positions. Although this Q-bit entity could be read back onto the bus and transferred to memory 204, it is preferable to use both latches. Thus, two new pixelwords (horizontally adjacent to the first two) are processed at stage 200 as described above, the result is made available at processor data port 215, and is latched into transceiver 222 through port 222a. The contents of the two transceivers are then read out through ports 220b and 222b onto data bus 217 in order to provide a 2Q-bit pixelword that represents the reduction of four 2Q-bit pixelwords. The result is transferred to second memory 204. This overall sequence continues until all the pixelwords in the pair of rows has been processed. Once the pair of rows has been processed, subsequent pairs are similarly processed.

As mentioned above each bit-slice processor has 64 registers. Accordingly, since memory accesses are more efficient in a block mode, faster operation is likely to result if 8 pairs of pixelwords are read from memory 203 in a block, processed as discussed above, stored in the processor's registers, and written to memory 204 in a block.

Image enlargement is similar, but the steps are executed in the reverse order. First, the processor reads a pixelword and sends the left half through port 220b of transceiver 220. This is read onto the bus through port 220a. Only every other pixel in the resulting word on the bus will initially be valid, so the processor will need to validate all the pixels using a sequence of shifts and logic operations. Since resistors 225 pull up all the bus lines that are not driven, each undriven line, all the even bits in this case, will be 1's. This expanded pixelword, which alternates 1's with valid data, is read into two registers, the content of one register is shifted one place, and the registers are logically ANDed. Everywhere there was a 0 in an odd bit, there will be 00 in an even-/odd pair. None of the other bits will be affected. This pixelword is then written to two vertically adjacent words in the expanded image. This process is repeated for the right half of the pixelword using the transceiver 222. The processor expands the entire row one pixelword at a time and the entire image one row at a time.

III. Graphical Illustration of the Invention

FIGS. 2 and 3 illustrate operation of the invention in graphical form. A 2× reduction is used to compute the skew angle for the text image shown in FIG. 2A. The variance for the image shown in FIG. 2A is shown in FIG. 2B. The calculated skew is found to be −0.60 degrees. In FIG. 3 a 4× reduction (shown in FIG. 3B) is used to compute the skew angle for the image. The variance curve for the image shown in FIG. 3A is shown in FIG. 3B. The calculated variance is a maximum at −0.66 degrees. The actual skew angle is about −0.60 degrees, showing typical accuracy of the method.

IV. Discussion of the Software

The method described above has been implemented in "C" using the software provided in Appendix 1 (© Copyright, Unpublished Work, Xerox Corporation, all rights reserved) on a Sun 3/260. While the invention is illustrated herein by way of a C program for use on the Sun 3/260, it will be apparent to those of skill in the art that a variety of programming languages and hardware configurations could be effectively utilized. Using 8-fold reduction on an 8½×11 page, the attached program takes about 4 seconds to determine skew angle. Improved performance could readily be achieved through optimization of the software.

V. Conclusion

The present invention provides a fast and accurate method of determining document skew. It is to be understood that the above description is intended to be illustrative and not restrictive. Many variations of the invention will become apparent to those of skill in the art upon review of this disclosure. For example, while the invention is illustrated above primarily with reference to maximizing the variance in the number of ON pixels in a scanline, the invention could readily be applied by optimizing the variance in the number of OFF pixels in a scanline as a function of rotation. The scope of the invention should, therefore, be determined not with reference to the above description, but instead should be determined with reference to the appended claims along with their full scope of equivalents.

APPENDIX 1

METHOD AND APPARATUS FOR

IDENTIFICATION OF DOCUMENT SKEW

```
/******************************************************
 * Copyright (c) 1988, Xerox Corporation. All rights reserved. *
 * Copyright protection claimed includes all forms and matters
 * of copyrightable material and information now allowed by
 * statutory or judicial law or hereafter granted, including
 * without limitation, material generated from the software
 * programs which are displayed on the screen such as icons,
 * screen display looks, etc.
 ******************************************************/

/*
 * skew.c: contains subroutines for
 *          (1) shear and rotation
 *                  --shear0()          about origin
 *                  --shearOS()         about origin, using OS algorithm
 *                  --shearOL()         about origin, using OL algorithm
 *                  --shearC()          about center
 *                  --shearCS()         about center, using CS algorithm
 *                  --shearCL()         about center, using CL algorithm
 *                  --rotateFast2O()    2-shear about origin
 *                  --rotateFast2OS()   2-shear about origin, using OS alg.
 *                  --rotateFast2OL()   2-shear about origin, using OL alg.
 *                  --rotateFast2C()    2-shear about center
 *                  --rotateFast2CS()   2-shear about center, using CS alg.
 *                  --rotateFast2CL()   2-shear about center, using CL alg.
 *                  --rotateFast3O()    3-shear about origin
 *                  --rotateFast3C()    3-shear about center
 *                  --rotateFast3CS()   3-shear about center, using CS alg.
 *                  --rotateFast3CL()   3-shear about center, using CL alg.
 *          (2) skew detection/correction
 *                  --detectSkew()
 *                  --correctSkew()
 *                  --findPowerSum()
 *                  --skewQuadraticFit()
 *       Note:  all input angles are in radians
 */ include <llama.h>
include <math.h>
#include <imageReps.h>
#include <imageGlobals.h>
#include "alpaca.h"
#include "morph.h"
#include "graphA.h"

#define  Sign(x)          (((x) < 0) ? -1 : 1)
#define  SMALL_ANGLE      .15     /* radians */
#define  MAX_SKEW_ANGLE   3.      /* degrees */
```

```
#define  DEL_ANGLE        0.2    /* degrees */
#define  EXCESS_SKEW      100.   /* "degrees": fake number */
define  PLOT_POWER       1      /* flag to turn on plotting */ define  LL_CORNERS       0      /* values for whichPixels  */
define  LL_LR_CORNERS    1      /*          "              */
#define  UR_CORNERS       2      /*          "              */
#define  ALL_CORNERS      3      /*          "              */
define  ALL_PIXELS       4      /*          "              */ define  DEBUG            0
static char                      message[50];
static unsigned short int *sumArray = NULL;
static int                       whichPixels = ALL_PIXELS;   /* default */
```

```
/************************************************************
 *      Shear and rotation procedures
 ************************************************************/

/*
 * shear0():   Shears image about the origin.  Uses shearOS() for
 *             small angles, and shearOL() for large angles.
 *             The shear causes the transformation
 *                x' = x + angle * y for x-shear
 *                y' = y + angle * x for y-shear
 *             where the argument "angle" is in fact equal to the tangent
 *             of the shear angle.
 *             For small angles, the "angle" argument is nearly equal
 *                to its tangent.  Additionally, two such shears
 *                can be used together to approximate a small rotation.
 *             A + horizontal shear pushes pixels horizontally, in
 *                a ccw direction (i.e., right-hand rule) about the origin
 *                of the image.  The pixels are pushed increasingly
 *                rightward (+x) as you move downward (+y).
 *             A + vertical shear pushes pixels vertically, in
 *                a cw direction (i.e., left-hand rule) about the origin
 *                of the image.  The pixels are pushed increasingly
 *                downward (+y) as you move rightward (+x).
 *             To approximate a general rotation, the variable "angle" must be
 *                taken to be a function of the rotation angle.  Specifically,
 *                the magnitudes of the x shears are  tan(angle/2), and
 *                the magnitude of the y shear is sin(angle).
 */
shear0(pixrD, pixrS, direction, angle)
Pixrect     *pixrS, *pixrD;
int         direction;
double      angle;
{ if (Abs(angle) < SMALL_ANGLE)
        shearOS(pixrD, pixrS, direction, angle);
    else  /* large angle */
        shearOL(pixrD, pixrS, direction, angle);
}

/*
 * shearOS():  Shears image about the origin, in a way that is appropriate
 *             for small angles.  Each block of sheared pixels is of
 *             equal width except the first, which is half the width of
 *             the others, and the last, which can be any width.
```

The direction is either HORIZ or VERT; the angle is in radians.
A + horizontal shear pushes pixels horizontally, in
   a ccw direction (i.e., right-hand rule) about the origin
   of the image.  The pixels are pushed increasingly
   rightward (+x) as you move downward (+y).
A + vertical shear pushes pixels vertically, in
   a cw direction (i.e., left-hand rule) about the origin
 *                of the image.  The pixels are pushed increasingly
 *                downward (+y) as you move rightward (+x).
 */
shearOS(pixrD, pixrS, direction, angle)
Pixrect       *pixrS, *pixrD;
int           direction;
double        angle;
{
int           i, delHalf, sign, width, height;
int           xl, yl, del, incr;
double        delta;
static char   procName[] = "shearOS";

if (!isPrDefined(pixrS, procName))
        return 1;
    if (!isPrDefined(pixrD, procName))
        return 1;

/* set up */
    sign = Sign(angle);
    width = pixrS->pr_size.x;
    height = pixrS->pr_size.y;
    delta = Abs( 1. / angle);   /* float of # pixels per one bit shift */
    del = (int) delta;
    delHalf = (int) (delta/ 2.);
    clearPr(pixrD);

/* Do rasterops in horizontal segments */
    if (direction == HORIZ)
    {   /* horizontal shear */
        pr_rop(pixrD, 0, 0, width, delHalf, PIX_SRC, pixrS, 0, 0);
        yl = delHalf;
        incr = del;
        for (i = 1; yl < height; i++)
        {
            if (height < yl + del)  /* avoid wrap-around on last blt */
                incr = height - yl;
            pr_rop(pixrD, 0, yl, width, incr, PIX_SRC,
                pixrS, -sign*i, yl);
            yl += del;
        }
    }

/* Do rasterops in vertical segments */
    if (direction == VERT)
    {   /* vertical shear */
        pr_rop(pixrD, 0, 0, delHalf, height, PIX_SRC, pixrS, 0, 0);
        xl = delHalf;
        incr = del;
        for (i = 1; xl < width; i++)
        {
            if (width < xl + del)  /* avoid wrap-around on last blt */
                incr = width - xl;
            pr_rop(pixrD, xl, 0, incr, height, PIX_SRC,
                pixrS, xl, -sign*i);
            xl += del;
        }
    }
}

```
/*
 * shearOL(): Shears image about the origin, in a way that is appropriate
 *            for all angles, and especially large ones.
 *            The blocks of sheared pixels are all of approximately the
 *            same width, with truncation to the nearest pixel.
 *        The direction is either HORIZ or VERT; the angle is in radians.
 *        A + horizontal shear pushes pixels horizontally, in
 *            a ccw direction (i.e., right-hand rule) about the origin
 *            of the image.  The pixels are pushed increasingly
 *            rightward (+x) as you move downward (+y).
 *        A + vertical shear pushes pixels vertically, in
 *            a cw direction (i.e., left-hand rule) about the origin
 *            of the image.  The pixels are pushed increasingly
 *            downward (+y) as you move rightward (+x).
 */
shearOL(pixrD, pixrS, direction, angle)
Pixrect        *pixrS, *pixrD;
int            direction;
double         angle;
{
int            i, sign, width, height;
int            x1, y1, x2, y2, incr;
double         delta;
static char    procName[] = "shearOL";

if (!isPrDefined(pixrS, procName))
        return 1;
    if (!isPrDefined(pixrD, procName))
        return 1;

/* set up */
    sign = Sign(angle);
    width = pixrS->pr_size.x;
    height = pixrS->pr_size.y;
    delta = Abs(1. / angle);    /* float of # pixels per one bit shift */
/*    printf(" delta = %f8.4\n", delta);   */
    clearPr(pixrD);
    x1 = 0;
    y1 = 0;

/* Do rasterops in horizontal segments */
    if (direction == HORIZ)   /* horizontal shear */
        for (i = 1; y1 < height; i++)
        {
            y2 = (int) ((float)i * delta);
            if (y2 >= height)  /* last one */
                incr = height - y1;
            else
                incr = y2 - y1;
            pr_rop(pixrD, 0, y1, width, incr, PIX_SRC,
                pixrS, -sign*i, y1);
            y1 = y2;
        }

/* Do rasterops in vertical segments */
    if (direction == VERT)    /* vertical shear */
        for (i = 1; x1 < width; i++)
        {
            x2 = (int) ((float)i * delta);
            if (x2 >= width)  /* last one */
                incr = width - x1;
            else
                incr = x2 - x1;
```

```
            pr_rop(pixrD, x1, 0, incr, height, PIX_SRC,
                pixrS, x1, -sign*i);
            x1 = x2;
        }
}

/*
 * shearC():   Shears image about the image center.  Uses shearCS() for
 *             small angles, and shearCL() for large angles.
 *             The shear causes the transformation
 *                 x' = x + angle * y for x-shear
 *                 y' = y + angle * x for y-shear
 *             where the argument "angle" is in fact equal to the tangent
 *             of the shear angle.
 *             For small angles, the "angle" argument is nearly equal
 *               to its tangent.  Additionally, two such shears
 *               can be used together to approximate a small rotation.
 *             A + horizontal shear pushes pixels horizontally, in
 *               a ccw direction (i.e., right-hand rule) about the center
 *               of the image.  The pixels are pushed increasingly
 *               rightward (+x) as you move downward (+y).
 *             A + vertical shear pushes pixels vertically, in
 *               a cw direction (i.e., left-hand rule) about the center
 *               of the image.  The pixels are pushed increasingly
 *               downward (+y) as you move rightward (+x).
 *             To approximate a general rotation, the variable "angle" must be
 *               taken to be a function of the rotation angle.  Specifically,
 *               the magnitudes of the x shears are  tan(angle/2), and
 *               the magnitude of the y shear is sin(angle).
 */
shearC(pixrD, pixrS, direction, angle)
Pixrect      *pixrS, *pixrD;
int          direction;
double       angle;
{ if (Abs(angle) < SMALL_ANGLE)
        shearCS(pixrD, pixrS, direction, angle);
    else  /* large angle */
        shearCL(pixrD, pixrS, direction, angle);
}

/*
 * shearCS(): Shears image about the image center, in a way that is
 *              appropriate for small angles.  Each block of sheared
 *              pixels is of equal width except the first and last,
 *              which can be any width.
 *            The direction is either HORIZ or VERT; the angle is in radians.
 *            A + horizontal shear pushes pixels horizontally, in
 *              a ccw direction (i.e., right-hand rule) about the center
 *              of the image.  The pixels are pushed increasingly
 *              rightward (+x) as you move downward (+y).
 *            A + vertical shear pushes pixels vertically, in
 *              a cw direction (i.e., left-hand rule) about the center
 *              of the image.  The pixels are pushed increasingly
 *              downward (+y) as you move rightward (+x).
 */
shearCS(pixrD, pixrS, direction, angle)
Pixrect      *pixrS, *pixrD;
int          direction;
double       angle;
```

```
{
    int         i, nx, ny, delHalf, sign, width, height, width2, height2;
    int         x1, y1, del, incr, smallIncr;
    double      delta;
    static char procName[] = "shearCS";

if (!isPrDefined(pixrS, procName))
        return 1;
    if (!isPrDefined(pixrD, procName))
        return 1;

/* set up */
    sign = Sign(angle);
    width = pixrS->pr_size.x;
    height = pixrS->pr_size.y;
    width2 = width / 2;
    height2 = height / 2;
    nx = Abs( angle * width2);  /* go from -nx to + nx, around +nx */
    ny = Abs( angle * height2); /* ditto */
    if (nx == 0 || ny == 0)
    {
/*      printf(" Angle too small; no rotation attempted\n"); */
        opPrPr(pixrD, pixrS, COPY);
        return;
    }
    clearPr(pixrD);
    delta = Abs( 1. / angle);  /* float of # pixels per one bit shift */
    del = (int) delta;
    delHalf = (int) (delta/ 2.);

/* Do rasterops in horizontal segments */
    if (direction == HORIZ)
    {   /* horizontal shear */
        y1 = height2 - delHalf;
        pr_rop(pixrD, 0, y1, width, del, PIX_SRC, pixrS, 0, y1);
        incr = del;
        for (i = 1; y1 >= 0; i++)
        {
            y1 -= del;
            if (y1 < 0)   /* last one */
            {
                smallIncr = del + y1;  /* last unblitted block */
                pr_rop(pixrD, 0, 0, width, smallIncr, PIX_SRC,
                    pixrS, sign*i, 0);
                break;
            }
            else
                pr_rop(pixrD, 0, y1, width, incr, PIX_SRC,
                    pixrS, sign*i, y1);
        }
        y1 = height2 - delHalf;
        for (i = 1; y1 <= height - del; i++)
    {
        y1 += del;
        if (y1 + del >= height - 1)  /* last one */
        {
            smallIncr = (height - 1) - y1;  /* last unblitted block */
            pr_rop(pixrD, 0, y1, width, smallIncr, PIX_SRC,
                pixrS, -sign*i, y1);
            break;
        }
        else
            pr_rop(pixrD, 0, y1, width, incr, PIX_SRC,
                pixrS, -sign*i, y1);
```

```
            }
    }

/* Do rasterops in vertical segments */
    if (direction == VERT)
    {   /* vertical shear */
        xl = width2 - delHalf;
        pr_rop(pixrD, xl, 0, del, height, PIX_SRC, pixrS, xl, 0);
        incr = del;
        for (i = 1; xl >= 0; i++)
        {
            xl -= del;
            if (xl < 0)   /* last one */
            {
                smallIncr = del + xl;  /* last unblitted block */
                pr_rop(pixrD, 0, 0, smallIncr, height, PIX_SRC,
                    pixrS, 0, sign*i);
                break;
            }
            else
                pr_rop(pixrD, xl, 0, incr, height, PIX_SRC,
                    pixrS, xl, sign*i);
        }
        xl = width2 - delHalf;
        for (i = 1; xl <= width - del; i++)
        {
            xl += del;
            if (xl + del >= width - 1)   /* last one */
            {
                smallIncr = (width - 1) - xl;  /* last unblitted block */
                pr_rop(pixrD, xl, 0, smallIncr, height, PIX_SRC,
                    pixrS, xl, -sign*i);
                break;
            }
            else
                pr_rop(pixrD, xl, 0, incr, height, PIX_SRC,
                    pixrS, xl, -sign*i);
        }
    }
}

/*
 * shearCL(): Shears image about the image center, in a way that is
 *            appropriate for all angles, and especially large ones.
 *            The blocks of sheared pixels are all of approximately the
 *            same width, with truncation to the nearest pixel.
 *            The direction is either HORIZ or VERT; the angle is in radians.
 *            A + horizontal shear pushes pixels horizontally, in
 *               a ccw direction (i.e., right-hand rule) about the center
 *               of the image.  The pixels are pushed increasingly
 *               rightward (+x) as you move downward (+y).
 *            A + vertical shear pushes pixels vertically, in
 *               a cw direction (i.e., left-hand rule) about the center
 *               of the image.  The pixels are pushed increasingly
 *               downward (+y) as you move rightward (+x).
 */
shearCL(pixrD, pixrS, direction, angle)
Pixrect     *pixrS, *pixrD;
int         direction;
double      angle;
{
int         i, nx, ny, sign, width, height, width2, height2;
```

```
int           x1, y1, x2, y2, incr;
double        delta;
static char   procName[] = "shearCL";

if (!isPrDefined(pixrS, procName))
        return 1;
    if (!isPrDefined(pixrD, procName))
        return 1;

/* set up */
    sign = Sign(angle);
    width = pixrS->pr_size.x;
    height = pixrS->pr_size.y;
    width2 = width / 2;
    height2 = height / 2;
    nx = (int)Abs( angle * (float)width2);   /* half the shifts in hor. dir */
    ny = (int)Abs( angle * (float)height2);  /* half the shifts in vert. dir */
    delta = Abs(1. / angle);   /* float of # pixels per one bit shift */
/*    printf(" delta = %f8.4\n", delta);   */
    clearPr(pixrD);
    x1 = 0;
    y1 = 0;

/* Do rasterops in horizontal segments */
    if (direction == HORIZ)   /* horizontal shear */
        for (i = 1; y1 < height; i++)
        {
            y2 = (int) ((float)i * delta);
            if (y2 >= height)   /* last one */
               incr = height - y1;
              else
               incr = y2 - y1;
            pr_rop(pixrD, 0, y1, width, incr, PIX_SRC,
                    pixrS, sign*(ny - i), y1);
            y1 = y2;
        }

/* Do rasterops in vertical segments */
    if (direction == VERT)    /* vertical shear */
        for (i = 1; x1 < width; i++)
        {
            x2 = (int) ((float)i * delta);
            if (x2 >= width)   /* last one */
               incr = width - x1;
              else
               incr = x2 - x1;
            pr_rop(pixrD, x1, 0, incr, height, PIX_SRC,
                    pixrS, x1, sign*(ny - i));
            x1 = x2;
        }
}

/*
 *  rotateFast2O():  2-shear rotation about the image origin, which
 *           is in the upper left hand corner.  For small angles, this
 *           gives a close approximation to an actual rotation.  For
 *           large angles, the length/width ratio is noticeably changed,
 *           because the change is proportional to the square of the angle.
 *       If angle > 0, rotation is cw; if angle < 0, rotation is ccw.
 *       Rotation is by shearing image about the origin by an amount
 *           equal to the variable "angle":
 *               x' = x + angle * y        for x-shear
 *               y' = y + angle * x        for y-shear
 *           where "angle" is the tangent of the shear angle.
```

```
 *      For small angles, two such shears can be used together to
 *          approximate a small rotation through the angle "angle".
 */
rotateFast20(pixrD, pixrS, angle)
Pixrect         *pixrS, *pixrD;
double          angle;
{
static char     procName[] = "rotateFast20";

if (!isPrDefined(pixrS, procName))
        return 1;
    if (!isPrDefined(pixrD, procName))
        return 1;

shear0(pr7, pixrS, VERT, angle);
    shear0(pixrD, pr7, HORIZ, -angle);
}

/*
 *  rotateFast20S():  2-shear rotation about the image origin, that uses
 *          shearOS().
 */
rotateFast20S(pixrD, pixrS, angle)
Pixrect         *pixrS, *pixrD;
double          angle;
{
static char     procName[] = "rotateFast20S";

if (!isPrDefined(pixrS, procName))
        return 1;
    if (!isPrDefined(pixrD, procName))
        return 1;

shearOS(pr7, pixrS, VERT, angle);
    shearOS(pixrD, pr7, HORIZ, -angle);
}

/*
 *  rotateFast20L():  2-shear rotation about the image origin, that uses
 *          shearOL().
 */
rotateFast20L(pixrD, pixrS, angle)
Pixrect         *pixrS, *pixrD;
double          angle;
{
static char     procName[] = "rotateFast20L";

if (!isPrDefined(pixrS, procName))
        return 1;
    if (!isPrDefined(pixrD, procName))
        return 1;

shearOL(pr7, pixrS, VERT, angle);
    shearOL(pixrD, pr7, HORIZ, -angle);
}

/*
 *  rotateFast2C():  2-shear rotation  about the image center.
 *          For small angles, this gives a close approximation to
 *          an actual rotation. For large angles,
```

```
 *          the length/width ratio is noticably changed,
 *              because the change is proportional to the square of the angle.
 *          If angle > 0, rotation is cw; if angle < 0, rotation is ccw.
 *          Rotation is by shearing image about the origin by an amount
 *              equal to the variable "angle":
 *                  x' = x + angle * y       for y-shear
 *                  y' = y + angle * x       for y-shear
 *              where "angle" is the tangent of the shear angle.
 *          For small angles, two such shears can be used together to
 *              approximate a small rotation through the angle "angle".
 */
rotateFast2C(pixrD, pixrS, angle)
Pixrect         *pixrS, *pixrD;
double          angle;
{
static char     procName[] = "rotateFast2C";

if (!isPrDefined(pixrS, procName))
        return 1;
    if (!isPrDefined(pixrD, procName))
        return 1;

shearC(pr7, pixrS, VERT, angle);
    shearC(pixrD, pr7, HORIZ, -angle);
}

/*
 *  rotateFast2CS():  2-shear rotation about the image origin, that uses
 *          shearCS().
 */
rotateFast2CS(pixrD, pixrS, angle)
Pixrect         *pixrS, *pixrD;
double          angle;
{
static char     procName[] = "rotateFast2CS";
    if (!isPrDefined(pixrS, procName))
        return 1;
    if (!isPrDefined(pixrD, procName))
        return 1;

shearCS(pr7, pixrS, VERT, angle);
    shearCS(pixrD, pr7, HORIZ, -angle);
}

/*
 *  rotateFast2CL():  2-shear rotation about the image origin, that uses
 *          shearCL().
 */
rotateFast2CL(pixrD, pixrS, angle)
Pixrect         *pixrS, *pixrD;
double          angle;
{
static char     procName[] = "rotateFast2CL";

if (!isPrDefined(pixrS, procName))
        return 1;
    if (!isPrDefined(pixrD, procName))
        return 1;

shearCL(pr7, pixrS, VERT, angle);
    shearCL(pixrD, pr7, HORIZ, -angle);
}
```

```
/*
 *  rotateFast3O():  3-shear rotation (important for large angles)
 *          if cw, angle > 0; if ccw, angle < 0.
 *          Rotation is accomplished by a sequence of three shears about
 *              the origin of the image:
 *                  x' = x + tan(angle/2) * y      for first x-shear
 *                  y' = y + sin(angle) * x         for y-shear
 *                  x' = x + tan(angle/2) * y      for second x-shear
 *              where the variable "angle" is the rotation angle in radians.
 */
rotateFast3O(pixrD, pixrS, angle)
Pixrect         *pixrS, *pixrD;
double          angle;
{
double          shearAngle1, shearAngle2;
static char     procName[] = "rotateFast3";

if (!isPrDefined(pixrS, procName))
        return 1;
    if (!isPrDefined(pixrD, procName))
        return 1;

shearAngle1 = tan(angle / 2.);
    shearAngle2 = sin(angle);
    shearO(pr7, pixrS, HORIZ, -shearAngle1);
    shearO(pr8, pr7, VERT, shearAngle2);
    shearO(pixrD, pr8, HORIZ, -shearAngle1);
}
/*
 *  rotateFast3C():  3-shear rotation (important for large angles)
 *          If cw, angle > 0; if ccw, angle < 0.
 *          Rotation is accomplished by a sequence of three shears about
 *              the center of the image:
 *                  x' = x + tan(angle/2) * y      for first x-shear
 *                  y' = y + sin(angle) * x         for y-shear
 *                  x' = x + tan(angle/2) * y      for second x-shear
 *              where the variable "angle" is the rotation angle in radians.
 */
rotateFast3C(pixrD, pixrS, angle)
Pixrect         *pixrS, *pixrD;
double          angle;
{
double          shearAngle1, shearAngle2;
static char     procName[] = "rotateFast3C";

if (!isPrDefined(pixrS, procName))
        return 1;
    if (!isPrDefined(pixrD, procName))
        return 1;

shearAngle1 = tan(angle / 2.);
    shearAngle2 = sin(angle);
    shearC(pr7, pixrS, HORIZ, -shearAngle1);
    shearC(pr8, pr7, VERT, shearAngle2);
    shearC(pixrD, pr8, HORIZ, -shearAngle1);
}

/*
 *  rotateFast3CS():  3-shear rotation (important for large angles), that
 *          uses shearCS().
 */
```

```
rotateFast3CS(pixrD, pixrS, angle)
Pixrect         *pixrS, *pixrD;
double          angle;
{
double          shearAngle1, shearAngle2;
static char     procName[] = "rotateFast3CS";

if (!isPrDefined(pixrS, procName))
        return 1;
    if (!isPrDefined(pixrD, procName))
        return 1;

shearAngle1 = tan(angle / 2.);
    shearAngle2 = sin(angle);
    shearCS(pr7, pixrS, HORIZ, -shearAngle1);
    shearCS(pr8, pr7, VERT, shearAngle2);
    shearCS(pixrD, pr8, HORIZ, -shearAngle1);
}

/*
 *  rotateFast3CL():  3-shear rotation (important for large angles), that
 *          uses shearCL().
 */
rotateFast3CL(pixrD, pixrS, angle)
Pixrect         *pixrS, *pixrD;
double          angle;
{
double          shearAngle1, shearAngle2;
static char     procName[] = "rotateFast3CL";

if (!isPrDefined(pixrS, procName))
        return 1;
    if (!isPrDefined(pixrD, procName))
        return 1;

shearAngle1 = tan(angle / 2.);
    shearAngle2 = sin(angle);
    shearCL(pr7, pixrS, HORIZ, -shearAngle1);
    shearCL(pr8, pr7, VERT, shearAngle2);
    shearCL(pixrD, pr8, HORIZ, -shearAngle1);
}

/****************************************************************
 *      Skew detection/correction procedures
 ****************************************************************/

/*
 *  detectSkew():  detects and returns skew angle (in degrees).
 *          Operations proceed either at full size or reduced.
 *          By default, operations are on pr1.
 *      numRed1 gives the number of reductions (0 for full size,
 *          1 for 2x2 reduction, etc.) on the image with threshold
 *          level=2, before further actions (such as construction
 *          of partial bounding boxes) are taken.
 *      bbIters gives the number of bounding box fill8 iterations,
 *          for the cases where such bounding boxes are used.
 *      numRed2 gives the number of level=1 reductions on the
 *          reduced image or bounding box corners.
 *      On a 300/inch image, suggested values of bbIters are:
 *          numRed1 = 0:  bbIters = 5
 *          numRed1 = 1:  bbIters = 3
 *          numRed1 = 2:  bbIters = 1
```

```
*           numRed2 should not exceed (3 - numRed1), and in fact the
*               sum (numRed1 + numRed2) should probably not exceed 2.
*           whichPixels determines if various bounding box corners, or
*               the entire (usually reduced) image is used in the power sum.
*/
double
detectSkew(numRed1, bbIters, numRed2)
int                numRed1, bbIters, numRed2;
{
int                origFactor, h, i, nAngles;
int                *power, x, y;
double             *angle, conversion, bestAngle, skewQuadraticFit();
DATA               *powerData, *graphInit();

/* initialize */
    power = NULL;
    angle = NULL;
    origFactor = scaleFactor;
    conversion = 3.1415926535 / 180.;
    setAllSelectedCanvases(0);
    if (sumArray)
    {
    free (sumArray);
    sumArray = NULL;
}
makeSumPixelTab();

/* initialize power array, and initialize and
     * compute angle array */
nAngles = (int) (2. * MAX_SKEW_ANGLE/DEL_ANGLE + 1.);
if (power)
    free (power);
power = (int *) calloc(nAngles, sizeof(int));
if (power == NULL)
    printf(" Error in detectSkew: calloc failure for power\n");
if (angle)
    free (angle);
angle = (double *) calloc(nAngles, sizeof(double));
if (angle == NULL)
    printf(" Error in detectSkew: calloc failure for angle\n");
angle[0] = conversion * (-MAX_SKEW_ANGLE);
for (i = 1; i < nAngles; i++)
    angle[i] = angle[i-1] + conversion * DEL_ANGLE;

/* reduce pr1 */
if (numRed1)   /* not zero */
{
    togSelectedCanvases(1);
    for (i = 0, i < numRed1, i++)
        selectiveReduce(2);
    togSelectedCanvases(1);
}

/* depending on the value of whichPixels, put the appropriate
     * pixels from pr1 into pr3  */
if (whichPixels == ALL_PIXELS)
{
    opPrPr(pr3, pr1, COPY);
    opPrPw(pw3, pr3, COPY);   /* show it */
}
else
{
```

```c
    fill8(pr2, pr1, FIXED_ITERATIONS, bbIters);
    opPrPw(pw2, pr2, COPY);    /* show it */
    if (whichPixels == LL_CORNERS)
        corner(pr3, pr2, 0, 0, 1, 0);
      else if (whichPixels == LL_LR_CORNERS)
        corner(pr3, pr2, 0, 0, 1, 1);
      else if (whichPixels == UR_CORNERS)
        corner(pr3, pr2, 0, 1, 0, 0);
      else if (whichPixels == ALL_CORNERS)
        corner(pr3, pr2, 1, 1, 1, 1);
    opPrPw(pw3, pr3, COPY);    /* show it */
}

/* reduce pr3 before computing */
if (numRed2)  /* not zero */
{
    togSelectedCanvases(3);
    for (i = 0; i < numRed2; i++)
        selectiveReduce(1);
    togSelectedCanvases(3);
}

/* get the variance */
    for (i = 0; i < nAngles; i++)
    {
        shear0(pr6, pr3, VERT, angle[i]);
        opPrPw(pw6, pr6, COPY);  /* show it */
        power[i] = findPowerSum(pr6, 2);  /* use power of 2 */
    } if PLOT_POWER
        /* histogram the power data */
    powerData = graphInit();
    graphPutTitle(powerData, "Spectral Power vs Angle (in 10**-2 deg)");
    for (i = 0; i < nAngles; i++)
    {
        x = (int) ((100./conversion) * angle[i]);
        y = power[i];
        graphPutData(powerData, x, y);
    }
    graphMake(powerData);
endif PLOT_POWER /* compute skew angle */
    bestAngle = skewQuadraticFit(power, angle, nAngles);
    if (bestAngle -- EXCESS_SKEW)
    {
        sprintf(message, "Excess skew: greater than %5.1f deg.\n",
                MAX_SKEW_ANGLE);
        textsw_insert(mainTextSw, message, strlen(message));
        moveToSF(origFactor);
        return 0.;
    }
    else
    {
        sprintf(message, "Skew angle is %8.3f deg.\n", bestAngle/conversion);
        textsw_insert(mainTextSw, message, strlen(message));
    }

/* return to original scale and return */
    moveToSF(origFactor);
    return bestAngle;
}
```

```
/*
 * correctSkew(): specify destination and source pixrects, and the skew
 *                angle in radians.
 *                rotates source image; places in destination
 */
correctSkew(pixrD, pixrS, skewAngle)
Pixrect         *pixrD, *pixrS;
double          skewAngle;
{
static char     procName[] = "correctSkew";

if (!isPrDefined(pixrS, procName))
        return 1;
    if (!isPrDefined(pixrD, procName))
        return 1;

if (skewAngle < SMALL_ANGLE)
        rotateFast2C(pixrD, pixrS, skewAngle);
    else
        rotateFast3C(pixrD, pixrS, skewAngle);
    opPrPw(pw2, pixrD, COPY);   /* show it */
    rotateFast2O(pixrD, pixrS, skewAngle);
    opPrPw(pw3, pixrD, COPY);   /* show it */
}

/*
 * findPowerSum(): sums the n-th power of the sum
 *     of pixels in each scanline. Puts each scanline
 *     sum into the array sumRowPixels, which should be
 *     allocated outside. Likewise, the lookup table
 *     should be allocated outside.
 */
int
findPowerSum(pixr, n)
Pixrect         *pixr;
int             n;
{
int             h, i, powerSum;

/* row sum array initialization */
    h = pixr->pr_size.y;
    if (!sumArray)
        sumArray = (unsigned short int *) calloc(h,
                    sizeof(unsigned short int));
    makeSumPixelTab();  /* just in case! */ onPixelsInEachRow(pixr, sumArray);  /* fill the array */ powerSum = 0;
    for (i = 0; i < h; i++)
        powerSum += (int) pow((double) sumArray[i], (double) n);

return (powerSum);
}

/*
 * skewQuadraticFit(): does best quadratic fit around the maximum.
 *         If the maximum occurs at one of the end points, it returns
 *             an outrageously large value, EXCESS_SKEW.
 *         Otherwise, it returns the maximum of the quadratic fit.
 */
double
```

```
skewQuadraticFit(power, angle, nAngles)
int            *power, nAngles;
double         *angle;
{
double         bestAngle, x1, x2, x3, y1, y2, y3, denom;
int            i, maxValue, iMax, iFirst;

/* find the largest value of power */
    maxValue = 0;
    for (i = 0; i < nAngles; i++)
        if (power[i] > maxValue)
        {
            maxValue = power[i];
            iMax = i;
        }
    if (iMax == 0 || iMax == nAngles - 1)
        return (EXCESS_SKEW);
    iFirst = iMax - 1;

/* fit a quadratic, starting with iFirst */
    x1 = angle[iFirst];
    x2 = angle[iFirst + 1];
    x3 = angle[iFirst + 2];
    y1 = (double) power[iFirst];
    y2 = (double) power[iFirst + 1];
    y3 = (double) power[iFirst + 2];
    denom = 2. * (y1 - 2. * y2 + y3);
    if (denom == 0.)   /* special case: end points symmetric */
        bestAngle = x2;
    else
        bestAngle = (y1 * (x2 + x3) - 2. * y2 * (x1 + x3) + y3 * (x1 + x2)) /
            denom;
#if DEBUG
    printf(" x1 = %8.3f; x2 = %8.3f; x3 = %8.3f; bestAngle = %8.3f\n",
        x1, x2, x3, bestAngle);
    printf(" y1 = %14.0f; y2 = %14.0f; y3 = %14.0f\n", y1, y2, y3);
#endif DEBUG
    return (bestAngle);
}

/***********************************************************************
 * Copyright (c) 1988, Xerox Corporation.  All rights reserved.        *
 * Copyright protection claimed includes all forms and matters         *
 * of copyrightable material and information now allowed by            *
 * statutory or judicial law or hereafter granted, including           *
 * without limitation, material generated from the software            *
 * programs which are displayed on the screen such as  ons,            *
 * screen display looks, etc.                                          *
 ***********************************************************************/

/*
 * morph.h: defined constants and STREL
 */ include <stdio.h>
include <llama.h> define   UNION          1     /* [a] OR [b] */
define   INTERSECTION   2     /* [a] AND [b] */
#define   XOR            3
#define   SUBTRACT       4     /* [a] AND (NOT[b]) */
#define   COPY           5
#define   INVERT         6
```

```
#define  HIT              1
define  MISS             2 define  OP_HU            PIX_SRC | PIX_DST
define  OP_HI            PIX_SRC & PIX_DST
#define  OP_HC            PIX_SRC
#define  OP_MU            PIX_NOT(PIX_SRC) | PIX_DST
#define  OP_MI            PIX_NOT(PIX_SRC) & PIX_DST
#define  OP_MC            PIX_NOT(PIX_SRC)
define  OP_XOR           PIX_SRC ^ PIX_DST define  OFF_PIXELS       0
define  ON_PIXELS        1 define  OFF              0
define  ON               1 define  PIXELS           0
define  WORDS            1 define  HORIZ            1
define  VERT             2
define  BOTH             3 define  LEFT             0
define  RIGHT            1 define  UP               0
define  DOWN             1 define  FIRST            1
define  LAST             2 define  FIXED_ITERATIONS 1
define  TO_COMPLETION    2
#define  N_STREL          50
#define  N_HTL_FILT       50
define  N_HT_FILT        50 define  TO_ABLATION      1
define  TO_ONE_PIXEL     2
#define  FOUR_CONNECT     3
define  EIGHT_CONNECT    4 struct structEl
{
    int         nx, ny;
    int         cx, cy;
    short int   **data;
};
typedef struct structEl STREL;
```

/****************************************************************
 * Copyright (c) 1988, Xerox Corporation.  All rights reserved.  *
 * Copyright protection claimed includes all forms and matters   *
 * of copyrightable material and information now allowed by      *
 * statutory or judicial law or hereafter granted, including     *
 * without limitation, material generated from the software      *
 * programs which are displayed on the screen such as icons,     *
 * screen display looks, etc.                                    *
 ****************************************************************/

/*
 * alpaca.h--SunWindows include files and globals
 */

```c
#include <pixrect/pixrect_hs.h>
#include <sunwindow/window_hs.h>
#include <suntool/sunview.h>
#include <suntool/gfxsw.h>
#include <suntool/panel.h>
#include <suntool/canvas.h>
#include <suntool/text.h>
#include <suntool/scrollbar.h>

/***************************************
 *      Data Structures                *
 ***************************************/
struct Coords
{
    int             n;          /* number of points */
    int             *x, *y;     /* arrays of integers */
};
typedef struct Coords COORDS;

struct Boxes
{
    int             n;          /* number of boxes */
    struct Rectangle **rect;    /* array of pointers to RECTs */
};
typedef struct Boxes BOXES;

struct Polys
{
    int             n;          /* number of closed polygons */
    struct Poly     **poly;     /* pointer to array of pointers to POLYs,
                                 *  with each POLY representing the
                                 *  boundary of a polygon */
};
typedef struct Polys POLYS;

struct Poly
{
    struct Coords   *coords;    /* pointer to COORDS structure giving the data
                                 *   pts at "corners" of the polygon boundary */
    int             origScale;  /* original scale factor at which
                                 * polygon boundary "corners" are
                                 * was created */
    int             scale;      /* present scale factor, to which
                                 * polygon boundary "corners" are
                                 * have been transformed */ struct Rectangle *bbox;     /* minimal bounding box for polygon */
    int             x, y;       /* coordinates of one point within
                                 * (and not on) the polygon boundary */
};
typedef struct Poly POLY;

struct Holo
{
    int             nbits;      /* number of bits */
    int             nerrors;    /* number of errors */
    struct Coords   *coords;    /* data coordinates */
    unsigned char   *bitArray;  /* data array (as read) */
    unsigned char   *errorArray;/* array of read errors */
    unsigned char   *data;      /* packed as a string */
};
typedef struct Holo HOLO;
```

```
struct PrTile
{
    Pixrect         ***tile;        /* ptr to array of pixrects */
    int             nx, ny;         /* number of tiles in x and y directions */
    int             w, h;           /* size of each tile */
    int             halftones;      /* true or false */
    int             i, j;           /* index of best tile */
    Pixrect         *best;          /* pixrect of tile with largest
                                       number of transitions */
};
typedef struct PrTile PRTILE;

struct strelArray
{
    int             n;              /* number of strels */
    char            **name;         /* array of strel names */
    struct structEl **strels;       /* array of pointers to strels */
};
typedef struct strelArray STAR;

/************************************************
 *      Defined Constants                       *
 ************************************************/
#define NO_CHANGE       -1
#define NOT_FOUND       -1
define ERROR           -666 define NUM_ENTRIES     50
define NSCALES         6 define DEFAULT         0       /* for atomic pixwin ops */
define SAME            1       /*         "            */
#define DIFFERENT       2       /*         "            */

/************************************************
 *      Global Vars                             *
 ************************************************/
    /* environment globals */
EXTERN char         *Arch;              /* sun3 or sun4 */
EXTERN char         *BaseDirectory;     /* root of alpaca sources */
EXTERN char         *ImageDirectory;    /* default image directory */
EXTERN char         *SourceDirectory;   /* .strel sources, etc. */
    /* file names */
EXTERN char     *Hardcopy;
EXTERN char     *HardcopyRot;
EXTERN char     *Hardcopy2;
EXTERN char     *Hardcopy4;
EXTERN char     *HardcopyAlp;
EXTERN char     *HardcopyAlpRot;
EXTERN char     *HardcopyAlp2;
EXTERN char     *HardcopyAlp4;
EXTERN char     *Filename;      /* tail part of filename */

/* sunview globals */
EXTERN Frame    mainFrame;
EXTERN Textsw   mainTextSw;
EXTERN Panel    mainControlPanel;
EXTERN Canvas   canvas1, canvas2, canvas3, canvas4, canvas5, canvas6;

EXTERN Pixwin       *pw1, *pw2, *pw3, *pw4, *pw5, *pw6;
EXTERN Pixwin       *pW[7];
```

```
EXTERN struct pixrect  *pR0[6], *pR1[6], *pR2[6], *pR3[6],
                       *pR4[6], *pR5[6], *pR6[6], *pR7[6],
                       *pR8[6], *pR9[6], *pR10[6], *pR11[6],
                       *pR12[6], *pR13[6];
EXTERN struct pixrect  *pr0, *pr1, *pr2, *pr3, *pr4, *pr5, *pr6,
                       *pr7, *pr8, *pr9, *pr10, *pr11, *pr12, *pr13;
EXTERN struct pixrect  *pR[14];

EXTERN struct Coords    *Coords1, *Coords2, *Coords3, *Coords4,
                        *Coords5, *Coords6;
EXTERN struct Boxes     *Boxes1, *Boxes2, *Boxes3, *Boxes4, *Boxes5, *Boxes6;
EXTERN struct Polys     *Polys1, *Polys2, *Polys3, *Polys5, *Polys5, *Polys6;
EXTERN struct Holo      *Holo1, *Holo2, *Holo3, *Holo4, *Holo5, *Holo6;
EXTERN struct PrTile    *Prtile1, *Prtile2, *Prtile3, *Prtile4,
                        *Prtile5, *Prtile6;
EXTERN struct strelArray *Star1, *Star2, *Star3, *Star4, *Star5,
                         *Star6, *Star7, *Star8, *Star9, *Star10;

EXTERN Scrollbar        sbV1, sbH1, sbV2, sbH2, sbV3, sbH3;
EXTERN Scrollbar        sbV4, sbH4, sbV5, sbH5, sbV6, sbH6;

/* scale globals */
EXTERN int              scaleFactor;
EXTERN struct Image     **scaledImage;
EXTERN int              scaledWidth[NSCALES];
EXTERN int              scaledHeight[NSCALES];
EXTERN struct Image     *sourceImage;
EXTERN struct Image     *auxImage;
EXTERN struct Rectangle *readRect;

EXTERN Frame            writeFrame;
EXTERN Panel            writePanel;
EXTERN Canvas           writeCanvas;
EXTERN struct Rectangle *writeRect;
EXTERN struct Image     *writeImage;
EXTERN int              writeFileFormat;

EXTERN Frame            readFrame;
EXTERN Panel            readPanel;
EXTERN Canvas           chosenCanvas;
EXTERN Pixwin           *chosenPixwin;
EXTERN Pixrect          *chosenPixrect;
EXTERN int              selectedCanvases[7];

EXTERN struct structEl  *chosenStrel, *prevChosenStrel;
EXTERN struct structEl  *prev2ChosenStrel, *prev3ChosenStrel;
EXTERN struct structEl  *selectedStrels[7];
EXTERN struct structEl  *chosenFilt, *prevChosenFilt;
EXTERN int              activeChoose;

/* globals for interactive atomics */
EXTERN int              SourceDestPwMode;
EXTERN Pixwin           *SourcePixwin;
EXTERN Pixwin           *DestPixwin;

/* initialized to zero by default */
EXTERN int              totBorderLeftTop;
EXTERN int              totBorderRight;
EXTERN int              totBorderBottom;

/* globals used by morphological operators */
EXTERN int              thresholdLevel;
EXTERN int              numIterations;
```

```
EXTERN int              iterMode;
EXTERN int              thinConstraint;
EXTERN int              thinversion;
EXTERN int              thinDirection;
EXTERN int              thickConstraint;
EXTERN int              thickVersion;
EXTERN int              thickDirection;
EXTERN int              lineLength;

/****************************************************************
 * Copyright 1988, Xerox Corporation.  All rights reserved. *
 ****************************************************************/
/*
 * "$Log:      strelGlobals.h,v $
 * Revision 1.0  88/09/15  18:05:18  bloomber
 * Initial revision
 * "
 *
 */

/*
 * strelGlobals.h:  global names for structuring elements
 */ include <stdio.h>
include <llama.h>

EXTERN STREL    **strelArray;
EXTERN STREL    **HTLFiltArray, **HTFiltArray;

/* linear elements */
EXTERN STREL    *strel2h, *strel2hR, *strel3h, *strel4h, *strel5h;
EXTERN STREL    *strel6h, *strel7h, *strel8h, *strel9h;
EXTERN STREL    *strel2v, *strel2vB, *strel3v, *strel4v, *strel5v;
EXTERN STREL    *strel6v, *strel7v, *strel8v, *strel9v;
EXTERN STREL    *strel10h, *strel10v, *strel11h, *strel11v;
EXTERN STREL    *strel13h, *strel13v, *strel15h, *strel15v;
EXTERN STREL    *strel20h, *strel20v, *strel25h, *strel25v;
EXTERN STREL    *strel30h, *strel30v, *strel35h, *strel35v;
EXTERN STREL    *strel40h, *strel40v, *strel45h, *strel45v;
EXTERN STREL    *strel50h, *strel50v;

/* diagonal elements */
EXTERN STREL    *strel3dp, *strel3dn, *strel4dp, *strel4dn;
EXTERN STREL    *strel5dp, *strel5dn, *strel6dp, *strel6dn;
EXTERN STREL    *strel7dp, *strel7dn, *strel9dp, *strel9dn;
EXTERN STREL    *strel11dp, *strel11dn, *strel13dp, *strel13dn;
EXTERN STREL    *strel15dp, *strel15dn;
EXTERN STREL    *strel5hdp, *strel5hdn, *strel5vdp, *strel5vdn;
EXTERN STREL    *strel9hdp, *strel9hdn, *strel9vdp, *strel9vdn;
EXTERN STREL    *strel13hdp, *strel13hdn, *strel13vdp, *strel13vdn;

/* broken linear elements */
EXTERN STREL    *strelF10h, *strelF10v, *strelF15h, *strelF15v;
EXTERN STREL    *strelF20h, *strelF20v, *strelF25h, *strelF25v;
EXTERN STREL    *strelF30h, *strelF30v, *strelF35h, *strelF35v;
EXTERN STREL    *strelF40h, *strelF40v, *strelF45h, *strelF45v;
EXTERN STREL    *strelF50h, *strelF50v;

/* square elements */
EXTERN STREL    *strel1, *strel2, *strel3, *strel4, *strel5;
```

```
EXTERN STREL    *strel2dp, *strel2dm;

EXTERN STREL    *strel2ule, *strel2uld, *strel2ure, *strel2urd;
EXTERN STREL    *strel2lle, *strel2lld, *strel2lre, *strel2lrd;

/* use for b.b. corners */

EXTERN STREL    *strel2tl, *strel2tr, *strel2bl, *strel2br;
EXTERN STREL    *strel7tl, *strel7tr, *strel7bl, *strel7br;
EXTERN STREL    *strel8tl, *strel8tr, *strel8bl, *strel8br;
EXTERN STREL    *strel9tl, *strel9tr, *strel9bl, *strel9br;
EXTERN STREL    *strel11tl, *strel11tr, *strel11bl, *strel11br;

EXTERN STREL    *strel3ve, *strel4ve, *strel2vd;

EXTERN STREL    *strel3h1, *strel3h2, *strel3v1, *strel3v2;
EXTERN STREL    *strel4h1, *strel4h2, *strel4v1, *strel4v2;
EXTERN STREL    *strel5h1, *strel5h2, *strel5v1, *strel5v2;

EXTERN STREL    *strel3ht1, *strel3ht2;

/* use for separating characters */
EXTERN STREL    *strel5gap;

/* use for segmenting italic typefaces */
EXTERN STREL    *strelItal1, *strelItal2, *strelItal3, *strelItal4;
EXTERN STREL    *strelItal5, *strelItal6, *strelItal7, *strelItal8;

/* use for detecting inverted text */
EXTERN STREL    *strel180a, *strel180b, *strel180c, *strel180d;
EXTERN STREL    *strel180e, *strel180f, *strel180g, *strel180h;

/* use for thinning to ablation */
EXTERN STREL    *strel2hl, *strel2hr, *strel2vt, *strel2vb;

/* use for thinning to one pixel */
EXTERN STREL    *strel3hl, *strel3hr, *strel3vt, *strel3vb;

/* use for 4-connect thinning */
EXTERN STREL    *strel3la4, *strel3lb4, *strel3lc4, *strel3ld4;
EXTERN STREL    *strel3le4, *strel3lf4, *strel3lg4, *strel3lh4;
EXTERN STREL    *strel3ra4, *strel3rb4, *strel3rc4, *strel3rd4;
EXTERN STREL    *strel3re4, *strel3rf4, *strel3rg4, *strel3rh4;
EXTERN STREL    *strel3ta4, *strel3tb4, *strel3tc4, *strel3td4;
EXTERN STREL    *strel3te4, *strel3tf4, *strel3tg4, *strel3th4;
EXTERN STREL    *strel3ba4, *strel3bb4, *strel3bc4, *strel3bd4;
EXTERN STREL    *strel3be4, *strel3bf4, *strel3bg4, *strel3bh4;

/* use for 8-connect thinning */
EXTERN STREL    *strel3la8, *strel3lb8, *strel3lc8, *strel3ld8;
EXTERN STREL    *strel3le8, *strel3lf8, *strel3lg8, *strel3lh8;
EXTERN STREL    *strel3ra8, *strel3rb8, *strel3rc8, *strel3rd8;
EXTERN STREL    *strel3re8, *strel3rf8, *strel3rg8, *strel3rh8;
EXTERN STREL    *strel3ta8, *strel3tb8, *strel3tc8, *strel3td8;
EXTERN STREL    *strel3te8, *strel3tf8, *strel3tg8, *strel3th8;
EXTERN STREL    *strel3ba8, *strel3bb8, *strel3bc8, *strel3bd8;
EXTERN STREL    *strel3be8, *strel3bf8, *strel3bg8, *strel3bh8;

/* use for spiral thinning */
EXTERN STREL    *strel3Se, *strel3Sne, *strel3Sn, *strel3Snw;
EXTERN STREL    *strel3Sw, *strel3Ssw, *strel3Ss, *strel3Sse;
```

```
/* use for anti-aliasing */
EXTERN STREL    *strelHTR, *strelHTL, *strelHBR, *strelHBL;
EXTERN STREL    *strelVLT, *strelVLB, *strelVRT, *strelVRB;

EXTERN STREL    *strel3s1u1, *strel3s1l1, *strel3s1ur, *strel3s1lr;
EXTERN STREL    *strel3s2ul, *strel3s2ll, *strel3s2ur, *strel3s2lr;

/* use for reading slanted font digital data */
EXTERN STREL    *strel3Sp, *strel3Sn, *strel4Sp, *strel4Sn;
EXTERN STREL    *strel5Sp, *strel5Sn, *strel6Sp, *strel6Sn;
EXTERN STREL    *strel7Sp, *strel7Sn, *strel8Sp, *strel8Sn;

/* use for temporary SEs during program development */
EXTERN STREL    *strelT1, *strelT2, *strelT3, *strelT4, *strelT5;
EXTERN STREL    *strelT6, *strelT7, *strelT8, *strelT9, *strelT10;
EXTERN STREL    *strelT11, *strelT12, *strelT13, *strelT14, *strelT15;
EXTERN STREL    *strelT16, *strelT17, *strelT18, *strelT19, *strelT20;

/*************************
             *Halftone spatial filters *
             *************************/
/* Horizontal, 0 degrees */
EXTERN STREL    *filtH8p2c0d, *filtH8p3c0d;

/* Solid, 1 cycle, 0 degrees */
EXTERN STREL    *filtS4p1c0d, *filtS4p1c0dI;
EXTERN STREL    *filtS6p1c0d;
EXTERN STREL    *filtS8p1c0d;

/* Solid, 1.5 cycle, 0 degrees */
EXTERN STREL    *filtS8p15c0d;

/* Cruciform, 1 cycle, 8 pix/cycle, 30 degrees */
EXTERN STREL    *filtC8p1c30d;

/* Cruciform, 3 cycle, 8 pix/cycle */
EXTERN STREL    *filtC8p3c0d;

/* Cruciform, 2 cycle, 4 pix/cycle */
EXTERN STREL    *filtC4p2c0d, *filtC4p2c0dI;
EXTERN STREL    *filtC4p2c14d;
EXTERN STREL    *filtC4p2c27d;
EXTERN STREL    *filtC4p2c27dI;
EXTERN STREL    *filtC4p2c45d;

/* Cruciform, 2 cycle, 5 pix/cycle */
EXTERN STREL    *filtC5p2c0d;
EXTERN STREL    *filtC5p2c22d;
EXTERN STREL    *filtC5p2c37d;

/* Cruciform, 2 cycle, 6 pix/cycle */
EXTERN STREL    *filtC6p2c0d;
EXTERN STREL    *filtC6p2c18d;
EXTERN STREL    *filtC6p2c31d;
EXTERN STREL    *filtC6p2c45d;

/* Cruciform, 2 cycle, 7 pix/cycle */
EXTERN STREL    *filtC7p2c0d;
EXTERN STREL    *filtC7p2c27d;
EXTERN STREL    *filtC7p2c34d;
EXTERN STREL    *filtC7p2c45d;

/* Cruciform, 2 cycle, 8 pix/cycle */
EXTERN STREL    *filtC8p2c0d;
EXTERN STREL    *filtC8p2c23d;
```

```
EXTERN STREL    *filtC8p2c30d;
EXTERN STREL    *filtC8p2c45d;

/* Light, 1 cycle, period = 3 */
EXTERN STREL    *filtL3p1c18d;
EXTERN STREL    *filtL3p1c45d;

/* Light, 1 cycle, period = 4 */
EXTERN STREL    *filtL4p1c0d;
EXTERN STREL    *filtL4p1c27d;
EXTERN STREL    *filtL4p1c45d;

/* Light, 1 cycle, period = 5 */
EXTERN STREL    *filtL5p1c0d;
EXTERN STREL    *filtL5p1c11d;

/* Light, 1 cycle, period = 6 */
EXTERN STREL    *filtL6p1c0d;
EXTERN STREL    *filtL6p1c18d;
EXTERN STREL    *filtL6p1c31d;
EXTERN STREL    *filtL6p1c45d;

/* Light, 1 cycle, period = 7 */
EXTERN STREL    *filtL7p1c8d;
EXTERN STREL    *filtL7p1c34d;
EXTERN STREL    *filtL7p1c45d;

/* Light, 1 cycle, period = 8 */
EXTERN STREL    *filtL8p1c0d;
EXTERN STREL    *filtL8p1c14d;
EXTERN STREL    *filtL8p1c23d;
EXTERN STREL    *filtL8p1c45d;

/*************************
         *Textline spatial filters *
         *************************/
    /* 4 cycle, white */
EXTERN STREL    *filtV20p4cW, *filtV25p4cW, *filtV30p4cW;
EXTERN STREL    *filtV35p4cW, *filtV40p4cW;
    /* 3 cycle, black&white */
EXTERN STREL    *filtV20p3cBW, *filtV25p3cBW, *filtV30p3cBW;
EXTERN STREL    *filtV35p3cBW, *filtV40p3cBW;
    /* 2 cycle, black&white */
EXTERN STREL    *filtV20p2cBW, *filtV25p2cBW, *filtV30p2cBW;
EXTERN STREL    *filtV35p2cBW, *filtV40p2cBW;
    /* 2 cycle, black&white, center at top */
EXTERN STREL    *filtV20p2ctBW, *filtV25p2ctBW, *filtV30p2ctBW;
EXTERN STREL    *filtV35p2ctBW, *filtV40p2ctBW;
    /* 2 cycle, black&white, center at bottom */
EXTERN STREL    *filtV20p2cbBW, *filtV25p2cbBW, *filtV30p2cbBW;
EXTERN STREL    *filtV35p2cbBW, *filtV40p2cbBW;

/************************************************************
 *  Copyright 1988, Xerox Corporation.  All rights reserved. *
 ************************************************************/
/*
 * "$Log:     graphA.h,v $
 * Revision 1.0  88/09/15  18:04:24  bloomber
 * Initial revision
 * "
 *
 */
```

```c
/*
 * graphA.h
 */

/*******************************************
 * The following files must be included:   *
 *    #include <stdio.h>                    *
 *    #include <math.h>                     *
 *    #include <suntool/sunview.h>          *
 *    #include <suntool/panel.h>            *
 *    #include <suntool/textsw.h>           *
 *    #include <suntool/canvas.h>           *
 *    #include <suntool/scrollbar.h>        *
 *******************************************/ include <math.h> define   XAXIS              1
define   YAXIS              2
#define   POINTS             1
#define   CURVE              2
#define   HISTOGRAM          3
#define   GRAPH_ARRAY_SIZE   1500

/*****************************
 * globals for graph frame   *
 *****************************/
EXTERN Frame          graphFrame;
EXTERN Panel          graphMessagePanel;
EXTERN Panel          graphControlPanel;
EXTERN Canvas         graphCanvas;
EXTERN Pixwin         *graphPw;
EXTERN struct Data    *graphData;
EXTERN int            graphCanvasWidth, graphCanvasHeight;

EXTERN Frame          graphInputFrame;
EXTERN Panel          graphInputPanel;
EXTERN int            graphAutoScale;

/*****************************
 *     data structures       *
 *****************************/
struct Data
{
    int      x[GRAPH_ARRAY_SIZE], y[GRAPH_ARRAY_SIZE];
    int      n;      /* beginning of unused data */
    int      maxX, minX, maxY, minY;
    float    scaleX, scaleY;
    int      origX, origY;
    int      type;
    char     *title;
};
typedef struct Data DATA;
```

/*******************************************************************
 * Copyright (c) 1989, Xerox Corporation.  All rights reserved.    *
 * Copyright protection claimed includes all forms and matters     *
 * of copyrightable material and information now allowed by        *
 * statutory or judicial law or hereafter granted, including       *
 * without limitation, material generated from the software        *
 * programs which are displayed on the screen such as icons,       *
 * screen display looks, etc.                                      *
 *******************************************************************/

```
/*
 * morphOpsAlpl.c--morphological and logical procedures.
 *      basic:
 *                      dilate()    minkowsky add (dilate with hits only)
 *                      dilateB()   generalized dilate using hits and misses
 *                      dilateI()   minkowsky add by spatially inverted strel
 *                      erode()     generalized erode using hits and misses
 *                      erodeH()    erose using hits only
 *                      erodeI()    generalized erode by spatially inverted strel
 *                      openPr()    [pr9] erosion followed by dilation (strel)
 *                      openPrA()
 *                      closePr()   [pr9] dilateB followed by erodeH
 *                      closePrA()
 *                      erodeDilate() [pr9]
 *                      erodeDilateA()
 *                      dilateAdd()
 *                      dilateSepar() [pr9]  dilation by a separable strel
 *                      dilateSeparA()
 *                      erodeSepar() [pr9]   erosion by a separable strel
 *                      erodeSeparA()
 *                      openSepar() [pr9]   open by a separable strel
 *                      openSeparA()
 *                      closeSepar() [pr9]  close by a separable strel
 *                      closeSeparA()
 *                      clearPw()
 *                      clearPr()
 *                      opPrPr() [pr10]  six operations: union, intersect, xor,
 *                                      subtraction, copy, invert
 *                      opPrPrA()
 *                      opPrPw() [pr10]         ...
 *                      opPrPwA()               ...
 *                      opPwPr() [pr10]         ...
 *                      opPwPrA()               ...
 *                      bltOp()   basic rasterops between prs
 *                      logOp()   five operations between 2 pr; result to
 *                                      a third pr.
 *      composite:
 *                      edge() [pr7]        boundary pixels
 *                      edgeA()
 *                      line() [pr9]
 *                      lineA()
 *                      lineF() [pr9]       fast version of line
 *                      lineFA()
 *      iterative composites and script-like subroutines:
 *                      fill8() [pr7, pr8]
 *                      fill8A()
 *                      fill4() [pr7, pr8]
 *                      fill4A()
 *                      fillClip() [pr7, pr8]
 *                      corner() [pr7]
 *                      cornerA()
 */ include <stdio.h>
include <llama.h>
 nclude <imageReps.h>
 include "alp.h"
#include "morph.h"
#include "alpStrels.h"

#define    WARNING    1    /* if non-zero, warning messages issued when
                            * temporary pixrects are created.          */
```

```
/*
 *  dilate():   dilates a pixrect by hits in a structElem.
 *              Result to a pixrect.
 *              The coordinates (cx,cy) give the 'hot point' of the
 *                  structElem, with respect to the UL corner.
 *                  Alternatively, they give the reference point for the
 *                  full image blts.
 *              Note:  this is the usual version of dilation, that is
 *                  restricted to hits.  It ignores the misses.
 *              Note:  dilation is the same as Minkowsky addition.
 */
dilate(pixrD, pixrS, strel)
Pixrect        *pixrD, *pixrS;
STREL          *strel;
{
int            i, j, nx, ny, cx, cy, first;
static char    procName[] = "dilate";

if (!isPrDefined(pixrD, procName))
        return;
    if (!isPrDefined(pixrS, procName))
        return;

first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)   /* no blits yet */
            {
                if (strel->data[j][i] == 1)   /* copy image */
                {
                    bltOp(pixrD, pixrS, HIT, i - cx, j - cy, COPY);
                    first = FALSE;
                }
            }
            else if (strel->data[j][i] == 1)
                bltOp(pixrD, pixrS, HIT, i - cx, j - cy, UNION);
}

/*
 *  dilateB():  dilates a pixrect by hits/misses in a structElem.
 *              Result to a pixrect.
 *              The coordinates (cx,cy) give the 'hot point' of the
 *                  structElem, with respect to the UL corner.
 *                  Alternatively, they give the reference point for the
 *                  full image blts.
 *              Note:  this is an unorthodox version, that dilates by ORing
 *                  shifted bit-inverted images for misses!!  It is the
 *                  dual to the hit/miss generalized erode.
 */
dilateB(pixrD, pixrS, strel)
Pixrect        *pixrD, *pixrS;
STREL          *strel;
{
int            i, j, nx, ny, cx, cy, first;
static char    procName[] = "dilateB";

if (!isPrDefined(pixrD, procName))
        return;
    if (!isPrDefined(pixrS, procName))
        return;
```

```
    first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)  /* no blits yet */
            {
                if (strel->data[j][i] == 1)  /* copy image */
                {
                    bltOp(pixrD, pixrS, HIT, i - cx, j - cy, COPY);
                    first = FALSE;
                }
                else if (strel->data[j][i] == 2)  /* copy inverted image */
                {
                    bltOp(pixrD, pixrS, MISS, i - cx, j - cy, COPY);
                    first = FALSE;
                }
            }
            else if (strel->data[j][i] == 1)
                bltOp(pixrD, pixrS, HIT, i - cx, j - cy, UNION);
            else if (strel->data[j][i] == 2)
                bltOp(pixrD, pixrS, MISS, i - cx, j - cy, UNION);
}

/*
 * dilateI():  dilates a pixrect by a spatially inverted STREL.
 *             Result to a pixrect.
 *             Note: because dilation is Minkowsky addition,
 *               dilation by an inverted STREL is the same as Minkowsky
 *               addition by an inverted STREL.  The misses in the STREL
 *               are ignored.
 */
dilateI(pixrD, pixrS, strel)
Pixrect      *pixrD, *pixrS;
STREL        *strel;
{
int          i, j, nx, ny, cx, cy, first;
static char  procName[] = "dilateI";

if (!isPrDefined(pixrS, procName))
        return;
    if (!isPrDefined(pixrD, procName))
        return;

first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)  /* no blits yet */
            {
                if (strel->data[j][i] == 1)  /* copy image */
                {
                    bltOp(pixrD, pixrS, HIT, -i + cx, -j + cy, COPY);
                    first = FALSE;
                }
            }
            else if (strel->data[j][i] == 1)
                bltOp(pixrD, pixrS, HIT, -i + cx, -j + cy, UNION);
}
```

```
/*
 *  erode(): erodes a pixrect by a hit/miss STREL.
 *           Result to a pixrect.
 *           The coordinates (cx,cy) give the 'hot point' of the
 *              structElem, with respect to the UL corner.
 *              Alternatively, they give the reference point for the
 *              full image blts.
 *           Note: this is a hit/miss transform for general STRELs.
 */
erode(pixrD, pixrS, strel)
Pixrect      *pixrD, *pixrS;
STREL        *strel;
{
int          i, j, nx, ny, cx, cy, first;
static char  procName[] = "erode";

if (!isPrDefined(pixrS, procName))
        return;
    if (!isPrDefined(pixrD, procName))
        return;

first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)  /* no blits yet */
            {
                if (strel->data[j][i] == 1)  /* copy image */
                {
                    bltOp(pixrD, pixrS, HIT, -i + cx, -j + cy, COPY);
                    first = FALSE;
                }
                else if (strel->data[j][i] == 2)  /* copy inverted image */
                {
                    bltOp(pixrD, pixrS, MISS, -i + cx, -j + cy, COPY);
                    first = FALSE;
                }
            }
            else if (strel->data[j][i] == 1)
                bltOp(pixrD, pixrS, HIT, -i + cx, -j + cy, INTERSECTION);
            else if (strel->data[j][i] == 2)
                bltOp(pixrD, pixrS, MISS, -i + cx, -j + cy, INTERSECTION);
}

/*
 *  erodeH(): erodes a pixrect by the hits in a STREL.
 *            Result to a pixrect.
 *            The coordinates (cx,cy) give the 'hot point' of the
 *               structElem, with respect to the UL corner.
 *               Alternatively, they give the reference point for the
 *               full image blts.
 */
erodeH(pixrD, pixrS, strel)
Pixrect      *pixrD, *pixrS;
STREL        *strel;
{
int          i, j, nx, ny, cx, cy, first;
static char  procName[] = "erodeH";

if (!isPrDefined(pixrS, procName))
        return;
```

```c
    if (!isPrDefined(pixrD, procName))
        return;

first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)   /* no blits yet */
            {
                if (strel->data[j][i] == 1)   /* copy image */
                {
                    bltOp(pixrD, pixrS, HIT, -i + cx, -j + cy, COPY);
                    first = FALSE;
                }
            }
            else if (strel->data[j][i] == 1)
                bltOp(pixrD, pixrS, HIT, -i + cx, -j + cy, INTERSECTION);
}

/*
 *  erodeI():   erodes a pixrect by a spatially inverted STREL.
 *              Result to a pixrect.
 *              The coordinates (cx,cy) give the 'hot point' of the
 *              structElem, with respect to the UL corner.
 *              Alternatively, they give the reference point for the
 *              full image blts.
 *              Note:  because erosion is Minkowsky subtraction by the
 *              inverted STREL, erosion by an inverted STREL is just
 *              Minkowsky subtraction.  This operation, however, is
 *              the generalized erosion (hit/miss).
 */
e     eI(pixrD, pixrS, strel)
Pixrect    *pixrD, *pixrS;
STREL      *strel;
{
int         i, j, nx, ny, cx, cy, first;
static char procName[] = "erodeI";

if (!isPrDefined(pixrS, procName))
        return;
    if (!isPrDefined(pixrD, procName))
        return;

first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)   /* no blits yet */
            {
                if (strel->data[j][i] == 1)   /* copy image */
                {
                    bltOp(pixrD, pixrS, HIT, i - cx, j - cy, COPY);
                    first = FALSE;
                }
                else if (strel->data[j][i] == 2)   /* copy inverted image */
                {
                    bltOp(pixrD, pixrS, MISS, i - cx, j - cy, COPY);
                    first = FALSE;
```

```
            }
        }
        else if (strel->data[j][i] == 1)
            bltOp(pixrD, pixrS, HIT, i - cx, j - cy, INTERSECTION);
        else if (strel->data[j][i] == 2)
            bltOp(pixrD, pixrS, MISS, i - cx, j - cy, INTERSECTION);
}

/*
 *  openPr():  Erosion followed by dilation, using the same structElem.
 *             Input from pixrect; output to pixrect
 *             Input and output pixrects can be the same.
 *       N.B. "open()" is restricted name! (a system call)
 */
openPr(pixrD, pixrS, strel)
Pixrect      *pixrS, *pixrD;
STREL        *strel;
{
static char   procName[] = "openPr";
Pixrect      *prtemp;

if (!isPrDefined(pixrS, procName))
        return;
    if (!isPrDefined(pixrD, procName))
        return;

if (!pr9)
    {
#if WARNING
        printf(" Warning in open!   Creating a temporary pixrect!\n");
#endif WARNING
        prtemp = mem_create(pixrS->pr_size.x, pixrS->pr_size.y, 1);
        erode(prtemp, pixrS, strel);
        dilate(pixrD, prtemp, strel);
        pr_close(prtemp);
    }
    else
    {
        erode(pr9, pixrS, strel);
        dilate(pixrD, pr9, strel);
    }
}

/*
 *  openPrA():  Erosion followed by dilation, using the same structElem.
 *              Input from pixrect; output to pixrect
 *              Input and output pixrects can be the same.
 *              Special version for Alp, requiring spec. of intermediate pr.
 */
openPrA(pixrD, pixrS, pixrI, strel)
Pixrect      *pixrS, *pixrD, *pixrI;
STREL        *strel;
{
static char   procName[] = "openPrA";

if (!isPrDefined(pixrS, procName))
        return;
    if (!isPrDefined(pixrD, procName))
        return;
    if (!isPrDefined(pixrI, procName))
        return;
```

```
    erode(pixrI, pixrS, strel);
    dilate(pixrD, pixrI, strel);
}

/*
 *  closePr():  Dilation followed by erosion, using the same structElem.
 *              Input from a pixrect; output to a pixrect.
 *              Input and output pixrects can be the same.
 *              N.B.: "close()" is a restricted name! (a system call).
 */
closePr(pixrD, pixrS, strel)
Pixrect        *pixrD, *pixrS;
STREL          *strel;
{
Pixrect        *prtemp;
static char    procName[] = "closePr";

if (!isPrDefined(pixrS, procName))
        return;

if (!isPrDefined(pixrD, procName))
        return;

if (!pr9)
    {
#if WARNING
        printf(" Warning in closePr: Creating a temporary pixre   \n");
#endif WARNING
        prtemp = mem_create(pixrS->pr_size.x, pixrS->pr_size.y, 1);
        dilateB(prtemp, pixrS, strel);
        erodeH(pixrD, prtemp, strel);
        pr_close(prtemp);
    }
    else
    {
        dilateB(pr9, pixrS, strel);
        erodeH(pixrD, pr9, strel);
    }
}

/*
 *  closePrA():  Dilation followed by erosion, using the same STREL.
 *               Input from a pixrect; output to a pixrect.
 *               Input and output pixrects can be the same.
 *               Special version for Alp, requiring spec. of intermediate pr.
 */
closePrA(pixrD, pixrS, pixrI, strel)
Pixrect        *pixrD, *pixrS, *pixrI;
STREL          *strel;
{
static char    procName[] = "closePrA";

if (!isPrDefined(pixrS, procName))
        return;
    if (!isPrDefined(pixrD, procName))
        return;
    if (!isPrDefined(pixrI, procName))
        return;

dilateB(pixrI, pixrS, strel);
    erodeH(pixrD, pixrI, strel);
}
```

```
/*
 *   erodeDilate():    Erosion followed by dilation, using in general
 *                     different structuring elements. Result to pixrect.
 *                     Input and output pixrects can be the same.
 */
erodeDilate(pixrD, pixrS, strelE, strelD)
Pixrect     *pixrD, *pixrS;
STREL       *strelE, *strelD;
{
Pixrect     *prtemp;
static char procName[] = "erodeDilate";

if (!isPrDefined(pixrS, procName))
        return;
    if (!isPrDefined(pixrD, procName))
        return;

if (!pr9)
    {
#if WARNING
        printf(" Warning in erodeDilate: Creating a temporary pixrect!\n");
#endif WARNING
        prtemp = mem_create(pixrS->pr_size.x, pixrS->pr_size.y, 1);
        erode(prtemp, pixrS, strelE);
        dilate(pixrD, prtemp, strelD);
        pr_close(prtemp);
    }
    else
    {
        erode(pr9, pixrS, strelE);
        dilate(pixrD, pr9, strelD);
    }
}

/*
 *   erodeDilateA():   Erosion followed by dilation, using in general
 *                     different structuring elements. Result to pixrect.
 *                     Input and output pixrects can be the same.
 *              Special version for Alp, requiring spec. of intermediate pr.
 */
erodeDilateA(pixrD, pixrS, pixrI, strelE, strelD)
Pixrect     *pixrD, *pixrS, *pixrI;
STREL       *strelE, *strelD;
{
static char procName[] = "erodeDilateA";

if (!isPrDefined(pixrS, procName))
        return;
    if (!isPrDefined(pixrD, procName))
        return;
    if (!isPrDefined(pixrI, procName))
        return;

erode(pixrI, pixrS, strelE);
    dilate(pixrD, pixrI, strelD);
}

/*
 *   dilateAdd():  dilates a pixrect by a structElem. Then adds the
 *                 result to the destination pixrect. This differs from
 *                 the usual dilate(), which simply puts the dilated
 *                 result in the destination.
 */
```

```
dilateAdd(pixrD, pixrS, strel)
Pixrect      *pixrD, *pixrS;
STREL        *strel;
{
int          i, j, nx, ny, cx, cy;
static char  procName[] = "dilateAdd";

if (!isPrDefined(pixrS, procName))
        return;
    if (!isPrDefined(pixrD, procName))
        return;

nx = strel->nx;
    ny = strel->ny;
    cx = strel->cx;
    cy = strel->cy;
    for (j = 0; j < ny; j++)
        for (i = 0; i < nx; i++)
            if (strel->data[j][i] == 1)
                bltOp(pixrD, pixrS, HIT, i - cx, j - cy, UNION);
            else if (strel->data[j][i] == 2)
                bltOp(pixrD, pixrS, MISS, i - cx, j - cy, UNION);
}

/*
 *  dilateSepar():  dilates a pr by a separable strel; result to a pr.
 *                  the separable strel is decomposed into the two
 *                      linear strels: strel_1, strel_2
 *                  strel_1 is used before strel_2
 *                  Uses pr9 as temp. storage.
 *                  The source and destination pr can be the same.
 */
dilateSepar(pixrD, pixrS, strel_1, strel_2)
Pixrect      *pixrD, *pixrS;
STREL        *strel_1, *strel_2;
{
static char  procName[] = "dilateSepar";
Pixrect      *prtemp;

if (!isPrDefined(pixrS, procName))
        return;
    if (!isPrDefined(pixrD, procName))
        return;

if (!pr9)
    {
#if WARNING
        printf(" Warning in dilateSepar: Creating a temporary pixrect!\n");
#endif WARNING
        prtemp = mem_create(pixrS->pr_size.x, pixrS->pr_size.y, 1);
        dilate(prtemp, pixrS, strel_1);
        dilate(pixrD, prtemp, strel_2);
        pr_close(prtemp);
    }
    else
    {
        dilate(pr9, pixrS, strel_1);
        dilate(pixrD, pr9, strel_2);
    }

}

/*
```

```
*  dilateSeparA():  dilates a pr by a separable strel; result to a pr.
*                   the separable strel is decomposed into the two
*                       linear strels: strel_1, strel_2
*                   strel_1 is used before strel_2
*                The source and destination pr can be the same.
*              Special version for Alp, requiring spec. of intermediate pr.
*/
dilateSeparA(pixrD, pixrS, pixrI, strel_1, strel_2)
Pixrect     *pixrD, *pixrS, *pixrI;
STREL       *strel_1, *strel_2;
{
static char   procName[] = "dilateSeparA";

if (!isPrDefined(pixrS, procName))
        return;
    if (!isPrDefined(pixrD, procName))
        return;
    if (!isPrDefined(pixrI, procName))
        return;

dilate(pixrI, pixrS, strel_1);
    dilate(pixrD, pixrI, strel_2);
}

/*
*  erodeSepar():  Erodes a pr by a separable strel; result to a pr.
*                 the separable strel is decomposed into the two
*                     linear strels: strel_1, strel_2
*                 strel_1 is used before strel_2
*                 Uses pr9 as temp. storage.
*                The source and destination pr can be the same.
*/
erodeSepar(pixrD, pixrS, strel_1, strel_2)
Pixrect     *pixrD, *pixrS;
STREL       *strel_1, *strel_2;
{
static char   procName[] = "erodeSepar";
Pixrect       *prtemp;

if (!isPrDefined(pixrS, procName))
        return;
    if (!isPrDefined(pixrD, procName))
        return;

if (!pr9)
    {
#if WARNING
        printf(" Warning in erodeSepar: Creating a temporary pixrect!\n");
#endif WARNING
        prtemp = mem_create(pixrS->pr_size.x, pixrS->pr_size.y, 1);
        erode(prtemp, pixrS, strel_1);
        erode(pixrD, prtemp, strel_2);
        pr_close(prtemp);
    }
    else
    {
        erode(pr9, pixrS, strel_1);
        erode(pixrD, pr9, strel_2);
    }
}

/*
*  erodeSeparA():  Erodes a pr by a separable strel; result to a pr.
```

```
 *              the separable strel is decomposed into the two
 *                  linear strels: strel_1, strel_2
 *              strel_1 is used before strel_2
 *              The source and destination pr can be the same.
 *              Special version for Alp, requiring spec. of intermediate pr.
 */
erodeSeparA(pixrD, pixrS, pixrI, strel_1, strel_2)
Pixrect     *pixrD, *pixrS, *pixrI;
STREL       *strel_1, *strel_2;
{
static char    procName[] = "erodeSeparA";

if (!isPrDefined(pixrS, procName))
        return;
    if (!isPrDefined(pixrD, procName))
        return;
    if (!isPrDefined(pixrI, procName))
        return;

erode(pixrI, pixrS, strel_1);
    erode(pixrD, pixrI, strel_2);
}

/*
 *  openSepar():  Open a pr with separable struct elems; result to a pr.
 *              use strel_1 first; then strel_2.
 *              The source and destination pr can be the same.
 *              Uses pr9 implicitly for temp. storage.
 */
openSepar(pixrD, pixrS, strel_1, strel_2)
Pixrect     *pixrD, *pixrS;
STREL       *strel_1, *strel_2;
{
static char    procName[] = "openSepar";

if (!isPrDefined(pixrS, procName))
        return;
    if (!isPrDefined(pixrD, procName))
        return;

erodeSepar(pixrD, pixrS, strel_1, strel_2);
    dilateSepar(pixrD, pixrD, strel_1, strel_2);
}

/*
 *  openSeparA():  Open a pr with separable struct elems; result to a pr.
 *              Use strel_1 first; then strel_2.
 *              The source and destination pr can be the same.
 *              Special version for Alp, requiring spec. of intermediate pr.
 */
openSeparA(pixrD, pixrS, pixrI, strel_1, strel_2)
Pixrect     *pixrD, *pixrS, *pixrI;
STREL       *strel_1, *strel_2;
{
static char    procName[] = "openSeparA";

if (!isPrDefined(pixrS, procName))
        return;
    if (!isPrDefined(pixrD, procName))
        return;
    if (!isPrDefined(pixrI, procName))
        return;
```

```
    erodeSeparA(pixrD, pixrS, pixrI, strel_1, strel_2);
    dilateSeparA(pixrD, pixrD, pixrI, strel_1, strel_2);
}

/*
 * closeSepar(): Close a pr with separable struct elems; result to a pr.
 *               Use strel_1 first; then strel_2.
 *               The source and destination pr can be the same.
 *               Uses pr9 implicitly for temp. storage.
 */
closeSepar(pixrD, pixrS, strel_1, strel_2)
Pixrect      *pixrD, *pixrS;
STREL        *strel_1, *strel_2;
{
static char  procName[] = "closeSepar";

if (!isPrDefined(pixrS, procName))
        return;
    if (!isPrDefined(pixrD, procName))
        return;

dilateSepar(pixrD, pixrS, strel_1, strel_2);
    erodeSepar(pixrD, pixrD, strel_1, strel_2);
}

/*
 * closeSeparA(): Close a pr with separable struct elems; result to a pr.
 *               Use strel_1 first; then strel_2.
 *               The source and destination pr can be the same.
 *               Special version for Alp, requiring spec. of intermediate pr.
 */
closeSeparA(pixrD, pixrS, pixrI, strel_1, strel_2)
Pixrect      *pixrD, *pixrS, *pixrI;
STREL        *strel_1, *strel_2;
{
static char  procName[] = "closeSeparA";

if (!isPrDefined(pixrS, procName))
        return;
    if (!isPrDefined(pixrD, procName))
        return;
    if (!isPrDefined(pixrI, procName))
        return;

dilateSeparA(pixrD, pixrS, pixrI, strel_1, strel_2);
    erodeSeparA(pixrD, pixrD, pixrI, strel_1, strel_2);
} clearPw(pixw)
Pixwin       *pixw;
{
    initRectDisplay();  /* to clear out any rect around */
    pw_writebackground(pixw, 0, 0, scaledWidth[0], scaledHeight[0], PIX_CLR);
} clearPr(pixr)
Pixrect      *pixr;
{
    pr_rop(pixr, 0, 0, pixr->pr_size.x, pixr->pr_size.y,
           PIX_CLR, NULL, 0, 0);
}
```

```
/*
 *  opPrPr():  Does one of six operations between a source pixrect and
 *             a destination pixrect, and puts the result in the
 *             destination pixrect.
 *             For set subtraction, the source (second) set is subtracted from
 *                the destination (first) set.
 *             N.B.  uses pr10 for set SUBTRACTion.
 */
opPrPr(pixrD, pixrS, op)
Pixrect      *pixrD, *pixrS;
int          op;
{
int          w, h;
static char  procName[] = "opPrPr";

if (!isPrDefined(pixrS, procName))
        return;
    if (!isPrDefined(pixrD, procName))
        return;

w = pixrS->pr_size.x;
    h = pixrS->pr_size.y;
    if (op == UNION)
        pr_rop(pixrD, 0, 0, w, h, OP_HU, pixrS, 0, 0);
    else if (op == INTERSECTION)
        pr_rop(pixrD, 0, 0, w, h, OP_HI, pixrS, 0, 0);
    else if (op == XOR)
        pr_rop(pixrD, 0, 0, w, h, OP_XOR, pixrS, 0, 0);
    else if (op == SUBTRACT)
    {   /* pixrD setminus pixrS */
        if (!pr10)
        {
            printf(" Error in opPrPr: pr10 not defined\n");
            return;
        }
        pr_rop(pr10, 0, 0, w, h, OP_MC, pixrS, 0, 0);
        pr_rop(pixrD, 0, 0, w, h, OP_HI, pr10, 0, 0);
    }
    else if ((op == COPY) && (pixrS != pixrD))
        pr_rop(pixrD, 0, 0, w, h, OP_HC, pixrS, 0, 0);
    else if (op == INVERT)
        pr_rop(pixrD, 0, 0, w, h, OP_MC, pixrS, 0, 0);
    else
        printf(" Warning in opPrPr: No operation performed\n");
}

/*
 *  opPrPrA():  Does one of six operations between a source pixrect and
 *              a destination pixrect, and puts the result in the
 *              destination pixrect.
 *              For set subtraction, the source (second) set is subtracted from
 *                 the destination (first) set.
 *              Special version for Alp, requiring specification of
 *                 of intermediate pixrect for set subtraction.
 */
opPrPrA(pixrD, pixrS, pixrI, op)
Pixrect      *pixrD, *pixrS, *pixrI;
int          op;
{
int          w, h;
static char  procName[] = "opPrPrA";

if (!isPrDefined(pixrS, procName))
        return;
    if (!isPrDefined(pixrD, procName))
        return;
```

```
    if (!isPrDefined(pixrI, procName))
        return;

w = pixrS->pr_size.x;
    h = pixrS->pr_size.y;
    if (op == UNION)
        pr_rop(pixrD, 0, 0, w, h, OP_HU, pixrS, 0, 0);
    else if (op == INTERSECTION)
        pr_rop(pixrD, 0, 0, w, h, OP_HI, pixrS, 0, 0);
    else if (op == XOR)
        pr_rop(pixrD, 0, 0, w, h, OP_XOR, pixrS, 0, 0);
    else if (op == SUBTRACT)
    {   /* pixrD setminus pixrS */
        pr_rop(pixrI, 0, 0, w, h, OP_MC, pixrS, 0, 0);
        pr_rop(pixrD, 0, 0, w, h, OP_HI, pixrI, 0, 0);
    }
    else if ((op == COPY) && (pixrS != pixrD))
        pr_rop(pixrD, 0, 0, w, h, OP_HC, pixrS, 0, 0);
    else if (op == INVERT)
        pr_rop(pixrD, 0, 0, w, h, OP_MC, pixrS, 0, 0);
    else
        printf(" Warning in opPrPrA: no operation performed\n");
}

/*
 * opPrPw():   N.B.  uses pr10 for set SUBTRACTion.
 */
opPrPw(pixwD, pixrS, op)
Pixwin      *pixwD;
Pixrect     *pixrS;
int         op;
{
int         w, h;
static char procName[] = "opPrPw";

if (!isPrDefined(pixrS, procName))
        return;

w = pixrS->pr_size.x;
h = pixrS->pr_size.y;
if (isPrTemp(pixrS) == FALSE)
{   /* only save if not temporary pixrect!! */
    displayedPrNum = getPrNum(pixrS);
    displayedPr = pixrS;
}
if (op == UNION)
    pw_rop(pixwD, 0, 0, w, h, OP_HU, pixrS, 0, 0);
else if (op == INTERSECTION)
    pw_rop(pixwD, 0, 0, w, h, OP_HI, pixrS, 0, 0);
else if (op == XOR)
    pw_rop(pixwD, 0, 0, w, h, OP_XOR, pixrS, 0, 0);
else if (op == SUBTRACT)
{   /* pixwD setminus pixrS */
    if (!pr10)
    {
        printf(" Error in opPrPw: pr10 not defined\n");
        return;
    }
    pr_rop(pr10, 0, 0, w, h, OP_MC, pixrS, 0, 0);
    pw_rop(pixwD, 0, 0, w, h, OP_HI, pr10, 0, 0);
}
else if (op == COPY)
```

```
        pw_rop(pixwD, 0, 0, w, h, OP_HC, pixrS, 0, 0);
    else if (op == INVERT)
        pw_rop(pixwD, 0, 0, w, h, OP_MC, pixrS, 0, 0);
    else
        printf(" Warning in opPrPw:  no operation performed\n");
}

/*
 *  opPrPwA():   Special version for Alp, requiring specification of
 *               of intermediate pixrect for set subtraction.
 */
opPrPwA(pixwD, pixrS, pixrI, op)
Pixwin        *pixwD;
Pixrect       *pixrS, *pixrI;
int           op;
{
int           w, h;
static char   procName[] = "opPrPwA";

if (!isPrDefined(pixrS, procName))
        return;
    if (!isPrDefined(pixrI, procName))
        return;

w = pixrS->pr_size.x;
    h = pixrS->pr_size.y;
    if (isPrTemp(pixrS) == FALSE)
    {   /* only save if not temporary pixrect!! */
        displayedPrNum = getPrNum(pixrS);
        displayedPr = pixrS;
    }
    if (op == UNION)
        pw_rop(pixwD, 0, 0, w, h, OP_HU, pixrS, 0, 0);
    else if (op == INTERSECTION)
        pw_rop(pixwD, 0, 0, w, h, OP_HI, pixrS, 0, 0);
    else if (op == XOR)
        pw_rop(pixwD, 0, 0, w, h, OP_XOR, pixrS, 0, 0);
    else if (op == SUBTRACT)
    {   /* pixwD setminus pixrS */
        pr_rop(pixrI, 0, 0, w, h, OP_MC, pixrS, 0, 0);
        pw_rop(pixwD, 0, 0, w, h, OP_HI, pixrI, 0, 0);
    }
    else if (op == COPY)
        pw_rop(pixwD, 0, 0, w, h, OP_HC, pixrS, 0, 0);
    else if (op == INVERT)
        pw_rop(pixwD, 0, 0, w, h, OP_MC, pixrS, 0, 0);
    else
        printf(" Warning in opPrPwA: no operation performed\n");
}

/*
 *  opPwPr():  N.B. uses pr10 for set SUBTRACTion
 */
opPwPr(pixrD, pixwS, op)
Pixrect       *pixrD;
Pixwin        *pixwS;
int           op;
{
int           w, h;
static char   procName[] = "opPwPr";

if (!isPrDefined(pixrD, procName))
        return;
```

```
    w = pixrD->pr_size.x;
    h = pixrD->pr_size.y;
    if (op == UNION)
        pw_read(pixrD, 0, 0, w, h, OP_HU, pixwS, 0, 0);
    else if (op == INTERSECTION)
        pw_read(pixrD, 0, 0, w, h, OP_HI, pixwS, 0, 0);
    else if (op == XOR)
        pw_read(pixrD, 0, 0, w, h, OP_XOR, pixwS, 0, 0);
    else if (op == SUBTRACT)
    {   /* pixrD setminus pixwS */
        if (!prI0)
        {
            printf(" Error in opPwPr: prI0 not defined\n");
            return;
        }
        pw_read(prI0, 0, 0, w, h, OP_MC, pixwS, 0, 0);
        pr_rop(pixrD, 0, 0, w, h, OP_HI, prI0, 0, 0);
    }
    else if (op == COPY)
        pw_read(pixrD, 0, 0, w, h, OP_HC, pixwS, 0, 0);
    else if (op == INVERT)
        pw_read(pixrD, 0, 0, w, h, OP_MC, pixwS, 0, 0);
    else
        printf(" Error in opPwPr:  unknown op\n");
}

/*
 *  opPwPrA():   Special version for Alp, requiring specification of
 *                  of intermediate pixrect for set subtraction.
 */
opPwPrA(pixrD, pixwS, pixrI, op)
Pixrect       *pixrD, *pixrI;
Pixwin        *pixwS;
int           op;
{
int           w, h;
static char   procName[] = "opPwPr";

if (!isPrDefined(pixrD, procName))
        return;
    if (!isPrDefined(pixrI, procName))
        return;

w = pixrD->pr_size.x;
    h = pixrD->pr_size.y;
    if (op == UNION)
        pw_read(pixrD, 0, 0, w, h, OP_HU, pixwS, 0, 0);
    else if (op == INTERSECTION)
        pw_read(pixrD, 0, 0, w, h, OP_HI, pixwS, 0, 0);
    else if (op == XOR)
        pw_read(pixrD, 0, 0, w, h, OP_XOR, pixwS, 0, 0);
    else if (op == SUBTRACT)
    {   /* pixrD setminus pixwS */
        pw_read(pixrI, 0, 0, w, h, OP_MC, pixwS, 0, 0);
        pr_rop(pixrD, 0, 0, w, h, OP_HI, pixrI, 0, 0);
    }
    else if (op == COPY)
        pw_read(pixrD, 0, 0, w, h, OP_HC, pixwS, 0, 0);
    else if (op == INVERT)
        pw_read(pixrD, 0, 0, w, h, OP_MC, pixwS, 0, 0);
    else
        printf(" Error in opPwPrA:  unknown op\n");
}
```

```
/*
 * bltOp(): performs appropriate blt between pixrects.
 */
bltOp(pixrD, pixrS, value, i, j, type)
Pixrect         *pixrS, *pixrD;
int             value, i, j, type;
{
int             w, h;
static char     procName[] = "bltOp";

if (!isPrDefined(pixrS, procName))
        return;
    if (!isPrDefined(pixrD, procName))
        return;

w = pixrS->pr_size.x;
    h = pixrS->pr_size.y;
    if (value == HIT)
    {
        if (type == UNION)
            pr_rop(pixrD, i, j, w, h, OP_HU, pixrS, 0, 0);
        else if (type == INTERSECTION)
            pr_rop(pixrD, i, j, w, h, OP_HI, pixrS, 0, 0);
        else if (type == COPY)
            pr_rop(pixrD, i, j, w, h, OP_HC, pixrS, 0, 0);

else
        {
            printf(" Error in bltOp: unknown operation type\n");
            return;
        }
    }
    else if (value == MISS)
    {
        if (type == UNION)
            pr_rop(pixrD, i, j, w, h, OP_MU, pixrS, 0, 0);
        else if (type == INTERSECTION)
            pr_rop(pixrD, i, j, w, h, OP_MI, pixrS, 0, 0);
        else if (type == COPY)
            pr_rop(pixrD, i, j, w, h, OP_MC, pixrS, 0, 0);
        else
        {
            printf(" Error in bltOp: unknown operation type\n");
            return;
        }
    }
    else
    {
        printf(" Error in bltOp: unknown operation value\n");
        return;
    }
}

/*
 * logOp(): performs appropriate logical operation between pixrects.
 */
logOp(pixrD, pixrS1, pixrS2, op)
Pixrect         *pixrD, *pixrS1, *pixrS2;
int             op;
{
int             w, h;
static char     procName[] = "logOp";
```

```
    if (!isPrDefined(pixrS1, procName))
        return;
    if (!isPrDefined(pixrS2, procName))
        return;
    if (!isPrDefined(pixrD, procName))
        return;

w = pixrS1->pr_size.x;
    h = pixrS1->pr_size.y;
    if (op == UNION)
    {   /* 'OR' the bitmaps */
        pr_rop(pixrD, 0, 0, w, h, PIX_SRC, pixrS1, 0, 0);
        pr_rop(pixrD, 0, 0, w, h, OP_HU, pixrS2, 0, 0);
    }
    else if (op == INTERSECTION)
    {   /* 'AND' the bitmaps */
        pr_rop(pixrD, 0, 0, w, h, PIX_SRC, pixrS1, 0, 0);
        pr_rop(pixrD, 0, 0, w, h, OP_HI, pixrS2, 0, 0);
    }
    else if (op == XOR)
    {   /* 'XOR' the bitmaps */
        pr_rop(pixrD, 0, 0, w, h, PIX_SRC, pixrS1, 0, 0);
        pr_rop(pixrD, 0, 0, w, h, OP_XOR, pixrS2, 0, 0);
    }
    else
    {
        printf(" Error in logOp: unknown type of operation\n");
        return;
    }
}

/*
 * edge():   Returns the boundary (edge) pixels.
 *           Type specifies whether the off-pixels or the on-pixels
 *              at the boundary are displayed.
 *           Uses pr7 explicitly.
 */
edge(pixrD, pixrS, strel, type)
Pixrect     *pixrD, *pixrS;
STREL       *strel;
int         type;
{
Pixrect     *prtemp;
static char procName[] = "edge";

if (!isPrDefined(pixrS, procName))
        return;
    if (!isPrDefined(pixrD, procName))
        return;

/* use 'dilate' to get boundary pixels constituting
     * the off-pixels at the background;
     * use 'erode' to get boundary pixels within
     * the on-pixels at the boundary */
    if (!pr7)
    {
#if WARNING
        printf(" Warning in edge: Creating a temporary pixrect!\n");
#endif WARNING
        prtemp = mem_create(pixrS->pr_size.x, pixrS->pr_size.y, 1);
        if (type == OFF_PIXELS)
            dilate(prtemp, pixrS, strel);
```

```
    else if (type == ON_PIXELS)
        erode(prtemp, pixrS, strel);
    else
    {
        printf(" Error in edge: unknown type of edge pixels!\n");
        pr_close(prtemp);
        return;
    }
    pr_close(prtemp);
}
else
{
    if (type == OFF_PIXELS)
        dilate(pr7, pixrS, strel);
    else if (type == ON_PIXELS)
        erode(pr7, pixrS, strel);
    else
    {
        printf(" Error in edge: unknown type of edge pixels!\n");

return;
        }
    }

/* XOR with source */
    logOp(pixrD, pixrS, pr7, XOR);
}

/*
 *  edgeA():    Returns the boundary (edge) pixels.
 *              Type specifies whether the off-pixels or the on-pixels
 *                 at the boundary are displayed.
 *              Special version for Alp, that requires specification of
 *                 intermediate pixrect.
 */
edgeA(pixrD, pixrS, pixrI, strel, type)
Pixrect      *pixrD, *pixrS, *pixrI;
STREL        *strel;
int          type;
{
static char   procName[] = "edgeA";

if (!isPrDefined(pixrS, procName))
        return;
    if (!isPrDefined(pixrD, procName))
        return;
    if (!isPrDefined(pixrI, procName))
        return;

/* use 'dilate' to get boundary pixels constituting
         *   the off-pixels at the background;
         * use 'erode' to get boundary pixels within
         *   the on-pixels at the boundary */
    if (type == OFF_PIXELS)
        dilate(pixrI, pixrS, strel);
    else if (type == ON_PIXELS)
        erode(pixrI, pixrS, strel);
    else
    {
        printf(" Error in edgeA: unknown type of edge pixels!\n");
        return;
    }
```

```c
    /* XOR with source */
    logOp(pixrD, pixrS, pixrI, XOR);
}

/*
 * line(): Returns either the horizontal or vertical lines
 *                of given min. length
 *         Robust version, without subsampling of line.
 *         N.B.: openPr uses pr9.
 */
line(pixrD, pixrS, orient, length)
Pixrect        *pixrD, *pixrS;
int             orient, length;
{
STREL          *strel;

static char    procName[] = "line";

if (!isPrDefined(pixrS, procName))
        return;
    if (!isPrDefined(pixrD, procName))
        return;

if (orient == HORIZ)
    {
        if (length <= 10) strel = strel10h;
        else if (length <= 15) strel = strel15h;
        else if (length <= 20) strel = strel20h;
        else if (length <= 25) strel = strel25h;
        else if (length <= 30) strel = strel30h;
        else if (length <= 35) strel = strel35h;
        else if (length <= 40) strel = strel40h;
        else if (length <= 45) strel = strel45h;
        else if (length <= 50) strel = strel50h;
        else
        {
            printf(" Error in line: length too long!\n");
            return;
        }
    }
    else if (orient == VERT)
    {
        if (length <= 10) strel = strel10v;
        else if (length <= 15) strel = strel15v;
        else if (length <= 20) strel = strel20v;
        else if (length <= 25) strel = strel25v;
        else if (length <= 30) strel = strel30v;
        else if (length <= 35) strel = strel35v;
        else if (length <= 40) strel = strel40v;
        else if (length <= 45) strel = strel45v;
        else if (length <= 50) strel = strel50v;
        else
        {
            printf(" Error in line: length too long!\n");
            return;
        }
    }
    else
    {
        printf(" Error in line: unknown orientation!\n");
        return;
    } openPr(pixrD, pixrS, strel);
}
```

```
/*
 * lineA():  Returns either the horizontal or vertical lines
 *                  of given min. length
 *           Robust version, without subsampling of line.
 *           Special version for Alp, that requires specification of
 *                  intermediate pixrect for openPrA.
 */
lineA(pixrD, pixrS, pixrI, orient, length)
Pixrect       *pixrD, *pixrS, *pixrI;
int           orient, length;
{
STREL         *strel;
static char   procName[] = "lineA";

if (!isPrDefined(pixrS, procName))
        return;
    if (!isPrDefined(pixrD, procName))
        return;
    if (!isPrDefined(pixrI, procName))
        return;

if (orient == HORIZ)
    {
        if (length <= 10) strel = strel10h;
        else if (length <= 15) strel = strel15h;
        else if (length <= 20) strel = strel20h;
        else if (length <= 25) strel = strel25h;
        else if (length <= 30) strel = strel30h;
        else if (length <= 35) strel = strel35h;
        else if (length <= 40) strel = strel40h;
        else if (length <= 45) strel = strel45h;
        else if (length <= 50) strel = strel50h;
        else
        {
            printf(" Error in lineA: length too long!\n");
            return;
        }
    }
    else if (orient == VERT)
    {
        if (length <= 10) strel = strel10v;
        else if (length <= 15) strel = strel15v;
        else if (length <= 20) strel = strel20v;
        else if (length <= 25) strel = strel25v;
        else if (length <= 30) strel = strel30v;
        else if (length <= 35) strel = strel35v;
        else if (length <= 40) strel = strel40v;
        else if (length <= 45) strel = strel45v;
        else if (length <= 50) strel = strel50v;
        else
        {
            printf(" Error in lineA: length too long!\n");
            return;
        }
    }
    else
    {
        printf(" Error in lineA: unknown orientation!\n");
        return;
    } openPrA(pixrD, pixrS, pixrI, strel);
}
```

```
/*
 *  lineF():  Returns either the horizontal or vertical lines
 *                 of given min. length
 *            Fast version, with subsampling of line.
 *            N.B.:  openPr uses pr9.
 */
lineF(pixrD, pixrS, orient, length)
Pixrect    *pixrD, *pixrS;
int        orient, length;
{
STREL         *strel;
static char   procName[] = "lineF";

if (!isPrDefined(pixrS, procName))
        return;
    if (!isPrDefined(pixrD, procName))
        return;

if (orient == HORIZ)
    {
        if (length <= 10) strel = strelF10h;
        else if (length <= 15) strel = strelF15h;
        else if (length <= 20) strel = strelF20h;
        else if (length <= 25) strel = strelF25h;
        else if (length <= 30) strel = strelF30h;
        else if (length <= 35) strel = strelF35h;
        else if (length <= 40) strel = strelF40h;
        else if (length <= 45) strel = strelF45h;
        else if (length <= 50) strel = strelF50h;
        else
        {
            printf(" Error in lineF: length too long!\n");
            return;
        }
    }
    else if (orient == VERT)
    {
        if (length <= 10) strel = strelF10v;
        else if (length <= 15) strel = strelF15v;
        else if (length <= 20) strel = strelF20v;
        else if (length <= 25) strel = strelF25v;
        else if (length <= 30) strel = strelF30v;
        else if (length <= 35) strel = strelF35v;
        else if (length <= 40) strel = strelF40v;
        else if (length <= 45) strel = strelF45v;
        else if (length <= 50) strel = strelF50v;
        else
        {
            printf(" Error in lineF: length too long!\n");
            return;
        }
    }
    else
    {
        printf(" Error in lineF: unknown orientation!\n");
        return;
    } openPr(pixrD, pixrS, strel);
}

/*
 *  lineFA():  Returns either the horizontal or vertical lines
```

```
 *              of given min. length
 *          Fast version, with subsampling of line.
 *          Special version for Alp, that requires specification of
 *              intermediate pixrect for openPrA.
 */
lineFA(pixrD, pixrS, pixrI, orient, length)
Pixrect     *pixrD, *pixrS, *pixrI;
int         orient, length;
{
STREL       *strel;
static char procName[] = "lineFA";

if (!isPrDefined(pixrS, procName))
        return;
    if (!isPrDefined(pixrD, procName))
        return;
    if (!isPrDefined(pixrI, procName))
        return;

if (orient == HORIZ)
    {
        if (length <= 10) strel = strelF10h;
        else if (length <= 15) strel = strelF15h;
        else if (length <= 20) strel = strelF20h;
        else if (length <= 25) strel = strelF25h;
        else if (length <= 30) strel = strelF30h;
        else if (length <= 35) strel = strelF35h;
        else if (length <= 40) strel = strelF40h;
        else if (length <= 45) strel = strelF45h;
        else if (length <= 50) strel = strelF50h;
        else
        {
            printf(" Error in lineFA: length too long!\n");
            return;
        }
    }
    else if (orient == VERT)
    {
        if (length <= 10) strel = strelF10v;
        else if (length <= 15) strel = strelF15v;
        else if (length <= 20) strel = strelF20v;
        else if (length <= 25) strel = strelF25v;
        else if (length <= 30) strel = strelF30v;
        else if (length <= 35) strel = strelF35v;
        else if (length <= 40) strel = strelF40v;
        else if (length <= 45) strel = strelF45v;
        else if (length <= 50) strel = strelF50v;
        else
        {
            printf(" Error in lineFA: length too long!\n");
            return;
        }
    }
    else
    {
        printf(" Error in lineFA: unknown orientation!\n");
        return;
    } openPrA(pixrD, pixrS, pixrI, strel);
```

}

```
/*
 *  fill8():   Fast fill with 8-adjacency into a pixrect.
 *     N.B.:   Uses pr7 and pr8, or creates temp pixrects
 *                 if they don't exist.
 *             Uses dilateAdd.
 *             termFlag determines whether the routine terminates
 *                 upon completion.  The parameter iter gives the
 *                 maximum number of iterations permitted.
 */
fill8(pixrD, pixrS, termFlag, iter)
Pixrect      *pixrD, *pixrS;
int           termFlag, iter;
{
int           i;
Pixrect      *prtemp1, *prtemp2;
static char   procName[] = "fill8";

if (!isPrDefined(pixrS, procName))
        return;
    if (!isPrDefined(pixrD, procName))
        return;

if (!pr7 || !pr8)
    {
#if WARNING
        printf(" Warning in fill8: Creating two temporary pixrects.\n");
#endif WARNING
        prtemp1 = mem_create(pixrS->pr_size.x, pixrS->pr_size.y, 1);
        prtemp2 = mem_create(pixrS->pr_size.x, pixrS->pr_size.y, 1);
        opPrPr(pixrD, pixrS, COPY);
        opPrPr(prtemp2, pixrS, COPY);        /* for comparison after
                                                 first iteration    */
        for (i = 0; i < iter; i++)
        {
            erode(prtemp1, pixrD, strel2dp);
            dilateAdd(pixrD, prtemp1, strel2dm);
            erode(prtemp1, pixrD, strel2dm);
            dilateAdd(pixrD, prtemp1, strel2dp);
            if (termFlag == TO_COMPLETION)
            {
                if (equalPrD(pixrD, prtemp2))
                    break;
                opPrPr(prtemp2, pixrD, COPY);       /* for comparison after
                                                        next iteration */
            }
        }
        pr_close(prtemp1);
        pr_close(prtemp2);
    }
    else
    {
        opPrPr(pixrD, pixrS, COPY);
        opPrPr(pr8, pixrS, COPY);  /* for comparison after first iteration;
                                    * only useful if termFlag == TO_COMPLETION */
        for (i = 0; i < iter; i++)
        {
            erode(pr7, pixrD, strel2dp);
            dilateAdd(pixrD, pr7, strel2dm);
            erode(pr7, pixrD, strel2dm);
            dilateAdd(pixrD, pr7, strel2dp);
            if (termFlag == TO_COMPLETION)
            {
```

```
                if (equalPrD(pixrD, pr8))
                    break;
                opPrPr(pr8, pixrD, COPY);    /* for comparison after
                                                next iteration */
            }
        }
    }
}

/*
 *  fill8A():    Fast fill with 8-adjacency into a pixrect.
 *               Version that requires specification of 2 pixrects for
 *                  intermediate computation.
 *               Uses dilateAdd.
 *               termFlag determines whether the routine terminates
 *                  upon completion.  The parameter iter gives the
 *                  maximum number of iterations permitted.
 */
fill8A(pixrD, pixrS, pixrI1, pixrI2, termFlag, iter)
Pixrect     *pixrD, *pixrS, *pixrI1, *pixrI2;
int         termFlag, iter;
{
int         i;
static char procName[] = "fill8A";

if (!isPrDefined(pixrS, procName))
        return;
    if (!isPrDefined(pixrD, procName))
        return;
    if (!isPrDefined(pixrI1, procName))
        return;
    if (!isPrDefined(pixrI2, procName))
        return;

opPrPr(pixrD, pixrS, COPY);
    opPrPr(pixrI2, pixrS, COPY);   /* for comparison after first iteration;
                          * only useful if termFlag == TO_COMPLETION */
    for (i = 0; i < iter; i++)
    {
        erode(pixrI1, pixrD, strel2dp);
        dilateAdd(pixrD, pixrI1, strel2dm);
        erode(pixrI1, pixrD, strel2dm);
        dilateAdd(pixrD, pixrI1, strel2dp);
        if (termFlag == TO_COMPLETION)
        {
            if (equalPrD(pixrD, pixrI2))
                break;
            opPrPr(pixrI2, pixrD, COPY);   /* for comparison after next iteration */
        }
    }
}

*  fill4():     Fast fill with 4-adjacency into a pixrect.
 *      N.B.:    Uses pr7 and pr8.
 *               Uses dilateAdd.
 *               termFlag determines whether the routine terminates
 *                  upon completion.  The parameter iter gives the
 *                  maximum number of iterations permitted.
 */
fill4(pixrD, pixrS, termFlag, iter)
Pixrect     *pixrD, *pixrS;
int         termFlag, iter;
{
```

```
int             i;
Pixrect         *prtemp1, *prtemp2;
static char     procName[] = "fill4";

if (!isPrDefined(pixrS, procName))
        return;
    if (!isPrDefined(pixrD, procName))
        return;

if (!pr7 || !pr8)
    {
#if WARNING
        printf(" Warning in fill4: Creating two temporary pixrects.\n");
#endif WARNING
        prtemp1 = mem_create(pixrS->pr_size.x, pixrS->pr_size.y, 1);
        prtemp2 = mem_create(pixrS->pr_size.x, pixrS->pr_size.y, 1);
        cpPrPr(pixrD, pixrS, COPY);
        opPrPr(prtemp2, pixrS, COPY);       /* for comparison after
                                                first iteration; */
        for (i = 0; i < iter; i++)
        {
            erode(prtemp1, pixrD, strel2ule);
            dilateAdd(pixrD, prtemp1, strel2uld);
            erode(prtemp1, pixrD, strel2ure);
            dilateAdd(pixrD, prtemp1, strel2urd);
            erode(prtemp1, pixrD, strel2lle);
            dilateAdd(pixrD, prtemp1, strel2lld);
            erode(prtemp1, pixrD, strel2lre);
            dilateAdd(pixrD, prtemp1, strel2lrd);
            if (termFlag == TO_COMPLETION)
            {
                if (equalPr(pixrD, prtemp2))
                    break;
                opPrPr(prtemp2, pixrD, COPY);       /* for comparison after
                                                        next iteration */
            }
        }
        pr_close(prtemp1);
        pr_close(prtemp2);
    }
    else
    {
        opPrPr(pixrD, pixrS, COPY);
        opPrPr(pr8, pixrS, COPY);       /* for comparison after
                                            first iteration; */
                                /* only useful if termFlag == TO_COMPLETION */
        for (i = 0; i < iter; i++)
        {
            erode(pr7, pixrD, strel2ule);

dilateAdd(pixrD, pr7, strel2uld);
            erode(pr7, pixrD, strel2ure);
            dilateAdd(pixrD, pr7, strel2urd);
            erode(pr7, pixrD, strel2lle);
            dilateAdd(pixrD, pr7, strel2lld);
            erode(pr7, pixrD, strel2lre);
            dilateAdd(pixrD, pr7, strel2lrd);
            if (termFlag == TO_COMPLETION)
            {
                if (equalPr(pixrD, pr8))
                    break;
```

```
                opPrPr(pr8, pixrD, COPY);        /* for comparison after
                                                    next iteration */
            }
        }
    }
}

/*
 *  fill4A():   Fast fill with 4-adjacency into a pixrect.
 *              Version that requires specification of 2 pixrects for
 *                  intermediate computation.
 *              Uses dilateAdd.
 *              termFlag determines whether the routine terminates
 *                  upon completion.  The parameter iter gives the
 *                  maximum number of iterations permitted.
 */
fill4A(pixrD, pixrS, pixrI1, pixrI2, termFlag, iter)
Pixrect      *pixrD, *pixrS, *pixrI1, *pixrI2;
int          termFlag, iter;
{
int          i;
static char  procName[] = "fill4";

if (!isPrDefined(pixrS, procName))
        return;
    if (!isPrDefined(pixrD, procName))
        return;
    if (!isPrDefined(pixrI1, procName))
        return;
    if (!isPrDefined(pixrI2, procName))
        return;

opPrPr(pixrD, pixrS, COPY);
    opPrPr(pixrI2, pixrS, COPY);    /* for comparison after first iteration;
                                     * only useful if termFlag == TO_COMPLETION */
    for (i = 0; i < iter; i++)
    {
        erode(pixrI1, pixrD, strel2ule);
        dilateAdd(pixrD, pixrI1, strel2uld);
        erode(pixrI1, pixrD, strel2ure);
        dilateAdd(pixrD, pixrI1, strel2urd);
        erode(pixrI1, pixrD, strel2lle);
        dilateAdd(pixrD, pixrI1, strel2lld);
        erode(pixrI1, pixrD, strel2lre);
        dilateAdd(pixrD, pixrI1, strel2lrd);
        if (termFlag == TO_COMPLETION)
        {
            if (equalPr(pixrD, pixrI2))
                break;
            opPrPr(pixrI2, pixrD, COPY);  /* for comparison after next iteration */
        }
    }
}

/*
 *  fillClip():  Fills pixrD on the pixrS seed, using strel3, and
 *                  clipping to pixrC on each iteration.
 *               pixrD holds the results after each iteration;
 *               pr7 and pr8 are used as temporary storage;
 *                  pr8 holds the previous results;
 */
```

```
fillClip(pixrD, pixrS, pixrC, termFlag, iter)
Pixrect     *pixrD, *pixrS, *pixrC;
int         termFlag, iter;
{
Pixrect     *mem_create(), *prtemp1, *prtemp2;
int         i;
static char procName[] = "fillClip";

if (!isPrDefined(pixrS, procName))
        return;
    if (!isPrDefined(pixrC, procName))
        return;
    if (!isPrDefined(pixrD, procName))
        return;

if (!pr7 && (termFlag == TO_COMPLETION))   /* need 2 temp pixrects */
    {
#if WARNING
        printf(" Warning in fillClip: Creating two temporary pixrects!\n");
#endif WARNING
        prtemp1 = mem_create(pixrS->pr_size.x, pixrS->pr_size.y, 1);
        prtemp2 = mem_create(pixrS->pr_size.x, pixrS->pr_size.y, 1);
        opPrPr(pixrD, pixrS, COPY);
        opPrPr(prtemp2, pixrS, COPY);    /* for comparison after
                                            first iteration; */
        for (i = 0; i < iter; i++)
        {
            dilate(prtemp1, pixrD, strel3);   /* dilate */
            logOp(pixrD, prtemp1, pixrC, INTERSECTION);  /* clip */
            if (termFlag == TO_COMPLETION)
            {
                if (equalPr(pixrD, prtemp2))
                    break;
                opPrPr(prtemp2, pixrD, COPY);  /* for comparison after
                                                  next iteration */
            }
        }
        pr_close(prtemp1);
        pr_close(prtemp2);
    }
    else if (!pr7 && (termFlag == FIXED_ITERATIONS))  /* need only 1 temp pr */
    {
#if WARNING
        printf(" Warning in fillClip: Creating a temporary pixrect!\n");
#endif WARNING
        prtemp1 = mem_create(pixrS->pr_size.x, pixrS->pr_size.y, 1);
        opPrPr(pixrD, pixrS, COPY);
        for (i = 0; i < iter; i++)
        {
            dilate(prtemp1, pixrD, strel3);   /* dilate */
            logOp(pixrD, prtemp1, pixrC, INTERSECTION);  /* clip */
        }
        pr_close(prtemp1);
    }
    else if (pr7 && !pr8 && (termFlag == TO_COMPLETION))
    {   /* need only 1 temp pixrect */
#if WARNING
        printf(" Warning in fillClip: Creating a temporary pixrect!\n");
#endif WARNING
        prtemp1 = mem_create(pixrS->pr_size.x, pixrS->pr_size.y, 1);
        opPrPr(pixrD, pixrS, COPY);
        opPrPr(prtemp1, pixrS, COPY);    /* for comparison after
                                            first iteration; */
        for (i = 0; i < iter; i++)
        {
```

```
            dilate(pr7, pixrD, strel3);   /* dilate */
            logOp(pixrD, pr7, pixrC, INTERSECTION);   /* clip */
            if (termFlag == TO_COMPLETION)
            {
                if (equalPr(pixrD, prtempl))
                    break;
                opPrPr(prtempl, pixrD, COPY);   /* for comparison after
                                                   next iteration */
            }
        }
        pr_close(prtempl);
    }
    else     /* don't need any temporary pixrects */
    {
        opPrPr(pixrD, pixrS, COPY);
        opPrPr(pr8, pixrS, COPY);    /* for comparison after
                                        first iteration; */
        for (i = 0; i < iter; i++)
        {
            dilate(pr7, pixrD, strel3);   /* dilate */
            logOp(pixrD, pr7, pixrC, INTERSECTION);   /* clip */
            if (termFlag == TO_COMPLETION)
            {
                if (equalPr(pixrD, pr8))
                    break;
                opPrPr(pr8, pixrD, COPY);   /* for comparison after
                                               next iteration */
            }
        }
    }
}

/*
 *  corner():  extracts designated bounding box corners.
 *             N.B.  Uses pr7; creates a temporary pr if necessary.
 */
corner(pixrD, pixrS, topLeft, topRight, bottomLeft, bottomRight)
Pixrect       *pixrD, *pixrS;
int           topLeft, topRight, bottomLeft, bottomRight;
{
Pixrect       *prtemp;
static char   procName[] = "corner";

if (!isPrDefined(pixrS, procName))
        return;
    if (!isPrDefined(pixrD, procName))
        return;

clearPr(pixrD);

if (!pr7)
    {
#if WARNING
        printf(" Warning in corner: Creating a temporary pixrect!\n");
#endif WARNING
        prtemp = mem_create(pixrS->pr_size.x, pixrS->pr_size.y, 1);
        if (topLeft)
        {
            erode(prtemp, pixrS, strel2tl);
            opPrPr(pixrD, prtemp, UNION);
        }
        if (topRight)
        {
```

```
        erode(prtemp, pixrS, strel2tr);
        opPrPr(pixrD, prtemp, UNION);
    }
    if (bottomLeft)
    {
        erode(prtemp, pixrS, strel2bl);
        opPrPr(pixrD, prtemp, UNION);
    }
    if (bottomRight)
    {
        erode(prtemp, pixrS, strel2br);
        opPrPr(pixrD, prtemp, UNION);
    }
    pr_close(prtemp);
}
else
{
    if (topLeft)
    {
        erode(pr7, pixrS, strel2tl);
        opPrPr(pixrD, pr7, UNION);
    }
    if (topRight)
    {
        erode(pr7, pixrS, strel2tr);
        opPrPr(pixrD, pr7, UNION);
    }
    if (bottomLeft)
    {
        erode(pr7, pixrS, strel2bl);
        opPrPr(pixrD, pr7, UNION);
    }
    if (bottomRight)
    {
        erode(pr7, pixrS, strel2br);
        opPrPr(pixrD, pr7, UNION);
        }
    }
}

/*
 * cornerA():  extracts designated bounding box corners.
 *             This version requires specification of a pixrect for
 *             internal computation.
 */
cornerA(pixrD, pixrS, pixrI, topLeft, topRight, bottomLeft, bottomRight)
Pixrect    *pixrD, *pixrS, *pixrI;
int        topLeft, topRight, bottomLeft, bottomRight;
{
static char    procName[] = "corner";

if (!isPrDefined(pixrS, procName))
        return;
    if (!isPrDefined(pixrD, procName))
        return;
    if (!isPrDefined(pixrI, procName))
        return;

clearPr(pixrD);

if (topLeft)
    {
```

```
            erode(pixrI, pixrS, strel2tl);
            opPrPr(pixrD, pixrI, UNION);
        }
        if (topRight)
        {
            erode(pixrI, pixrS, strel2tr);
            opPrPr(pixrD, pixrI, UNION);
        }
        if (bottomLeft)
        {
            erode(pixrI, pixrS, strel2bl);
            opPrPr(pixrD, pixrI, UNION);
        }
        if (bottomRight)
        {
            erode(pixrI, pixrS, strel2br);
            opPrPr(pixrD, pixrI, UNION);
        }
} strel2h->data[0][0] = 1;
strel2h->data[0][1] = 1;

/* horizontal strel of length 2: (1 lc) */
strel2hR = (STREL *) calloc (1, sizeof (STREL));
strel2hR->nx = 2;
strel2hR->ny = 1;
strel2hR->cx = 1;
strel2hR->cy = 0;
strel2hR->data = matrix(strel2hR->nx, strel2hR->ny);
strel2hR->data[0][0] = 1;
strel2hR->data[0][1] = 1;

/* vertical strel of length 2: v(lc 1) */
strel2v = (STREL *) calloc (1, sizeof (STREL));
strel2v->nx = 1;
strel2v->ny = 2;
strel2v->cx = strel2v->cy = 0;
strel2v->data = matrix(strel2v->nx, strel2v->ny);
strel2v->data[0][0] = 1;
strel2v->data[1][0] = 1;

/* vertical strel of length 2: v(1 lc) */
strel2vB = (STREL *) calloc (1, sizeof (STREL));
strel2vB->nx = 1;
strel2vB->ny = 2;
strel2vB->cx = 0;
strel2vB->cy = 1;
strel2vB->data = matrix(strel2vB->nx, strel2vB->ny);
strel2vB->data[0][0] = 1;
strel2vB->data[1][0] = 1;

/* horizontal strel of length 3: (1 lc 1) */
strel3h = (STREL *) calloc (1, sizeof (STREL));
strel3h->nx = 3;
strel3h->ny = 1;
strel3h->cx = 1;   /* center pixel */
strel3h->cy = 0;
strel3h->data = matrix(strel3h->nx, strel3h->ny);
for (i = 0; i < 3; i++)
    strel3h->data[0][i] = 1;

/* vertical strel of length 3: v(1 lc 1) */
strel3v = (STREL *) calloc (1, sizeof (STREL));
```

```
strel3v->nx = 1;
strel3v->ny = 3;
strel3v->cx = 0;
strel3v->cy = 1;
strel3v->data = matrix(strel3v->nx, strel3v->ny);
for (i = 0; i < 3; i++)
    strel3v->data[i][0] = 1;

/* horizontal strel of length 4: (1 1c 1 1) */
strel4h = (STREL *) calloc (1, sizeof (STREL));
strel4h->nx = 4;
strel4h->ny = 1;
strel4h->cx = 1;   /* near center pixel */
strel4h->cy = 0;
strel4h->data = matrix(strel4h->nx, strel4h->ny);
for (i = 0; i < 4; i++)
```

```
/************************************************************
 *   Copyright (c) 1988, Xerox Corporation.  All rights reserved. *
 *   Copyright protection claimed includes all forms and matters  *
 *   of copyrightable material and information now allowed by     *
 *   statutory or judicial law or hereafter granted, including    *
 *   without limitation, material generated from the software     *
 *   programs which are displayed on the screen such as icons,    *
 *   screen display looks, etc.                                   *
 ************************************************************/

/*
 *   strel1.c--includes subroutines
 *                   strel1Inits()
 *                       --strel2h, strel2hR, strel2v, strel3h, strel3v,
 *                       --strel4h, strel4v, strel5h, strel5v,
 *                       --strel6h, strel6v, strel7h, strel7v,
 *                       --strel8h, strel8v, strel9h, strel9v,
 *                       --strel10h, strel10v, strel11h, strel11v;
 *                       --strel13h, strel13v, strel15h, strel15v;
 *                       --strel20h, strel20v, strel25h, strel25v;
 *                       --strel30h, strel30v, strel35h, strel35v;
 *                       --strel40h, strel40v, strel45h, strel45v;
 *                       --strel50h, strel50v;
 *                           ...some diagonal strels...
 *                       --strel3dp, strel3dn, strel4dp, strel4dn;
 *                       --strel5dp, strel5dn, strel6dp, strel6dn;
 *                       --strel7dp, strel7dn, strel9dp, strel9dn;
 *                       --strel11dp, strel11dn, strel13dp, strel13dn;
 *                       --strel15dp, strel15dn;
 *                       --strel5hdp, strel5hdn, strel5vdp, strel5vdn;
 *                       --strel9hdp, strel9hdn, strel9vdp, strel9vdn;
 *                       --strel13hdp, strel13hdn, strel13vdp, strel13vdn;
 *                           ...use for solid block matches...
 *                       --strel1, strel2, strel3, strel4, strel5;
 *                       --strel2dp, strel2dm;
 *                       --strel2tl, strel2tr, strel2bl, strel2br;
 *                       --strel3ve, strel4ve, strel2vd;
 *                       --strel3ht1, strel3ht2;
 *                       --strel3h1, strel3h2, strel3v1, strel3v2;
 *                       --strel4h1, strel4h2, strel4v1, strel4v2;
 *                       --strel5h1, strel5h2, strel5v1, strel5v2;
 *                   matrix()
 */
```

```c
#include <stdio.h>
include <llama.h>
#include "morph.h"
#include "strelGlobals.h"

strelIInits()
{
int        i, j;
short int  **matrix();

/* horizontal strel of length 2: (lc 1) */
    strel2h = (STREL *) calloc (1, sizeof (STREL));
    strel2h->nx = 2;
    strel2h->ny = 1;
    strel2h->cx = strel2h->cy = 0;
    strel2h->data = matrix(strel2h->nx, strel2h->ny);
    strel4h->data[0][i] = 1;

/* vertical strel of length 4: v(1 lc 1 1) */
    strel4v = (STREL *) calloc (1, sizeof (STREL));
    strel4v->nx = 1;
    strel4v->ny = 4;
    strel4v->cx = 0;
    strel4v->cy = 1;
    strel4v->data = matrix(strel4v->nx, strel4v->ny);
    for (i = 0; i < 4; i++)
        strel4v->data[i][0] = 1;

/* horizontal strel of length 5: (1 1 lc 1 1) */
    strel5h = (STREL *) calloc (1, sizeof (STREL));
    strel5h->nx = 5;
    strel5h->ny = 1;
    strel5h->cx = 2;   /* center pixel */
    strel5h->cy = 0;
    strel5h->data = matrix(strel5h->nx, strel5h->ny);
    for (i = 0; i < 5; i++)
        strel5h->data[0][i] = 1;

/* vertical strel of length 5: v(1 1 lc 1 1) */
    strel5v = (STREL *) calloc (1, sizeof (STREL));
    strel5v->nx = 1;
    strel5v->ny = 5;
    strel5v->cx = 0;
    strel5v->cy = 2;
    strel5v->data = matrix(strel5v->nx, strel5v->ny);
    for (i = 0; i < 5; i++)
        strel5v->data[i][0] = 1;

/* horizontal strel of length 6: (1 1 lc 1 1 1) */
    strel6h = (STREL *) calloc (1, sizeof (STREL));
    strel6h->nx = 6;
    strel6h->ny = 1;
    strel6h->cx = 2;   /* near center pixel */
    strel6h->cy = 0;
    strel6h->data = matrix(strel6h->nx, strel6h->ny);
    for (i = 0; i < 6; i++)
        strel6h->data[0][i] = 1;

/* vertical strel of length 6: v(1 1 lc 1 1 1) */
    strel6v = (STREL *) calloc (1, sizeof (STREL));
    strel6v->nx = 1;
    strel6v->ny = 6;
    strel6v->cx = 0;
    strel6v->cy = 2;
```

```
strel6v->data = matrix(strel6v->nx, strel6v->ny);
for (i = 0; i < 6; i++)
    strel6v->data[i][0] = 1;

/* horizontal strel of length 7: (1 1 1 1c 1 1 1) */
strel7h = (STREL *) calloc (1, sizeof (STREL));
strel7h->nx = 7;
strel7h->ny = 1;
strel7h->cx = 3;   /* center pixel */
strel7h->cy = 0;
strel7h->data = matrix(strel7h->nx, strel7h->ny);
for (i = 0; i < 7; i++)
    strel7h->data[0][i] = 1;

/* vertical strel of length 7: v(1 1 1 1c 1 1 1) */
strel7v = (STREL *) calloc (1, sizeof (STREL));
strel7v->nx = 1;
strel7v->ny = 7;
strel7v->cx = 0;
strel7v->cy = 3;
strel7v->data = matrix(strel7v->nx, strel7v->ny);
for (i = 0; i < 7; i++)
    strel7v->data[i][0] = 1;

/* horizontal strel of length 8: (1 1 1 1c 1 1 1 1) */
strel8h = (STREL *) calloc (1, sizeof (STREL));
strel8h->nx = 8;
strel8h->ny = 1;
strel8h->cx = 3;   /* near center pixel */
strel8h->cy = 0;
strel8h->data = matrix(strel8h->nx, strel8h->ny);
for (i = 0; i < 8; i++)
    strel8h->data[0][i] = 1;

/* vertical strel of length 8: v(1 1 1 1c 1 1 1 1) */
strel8v = (STREL *) calloc (1, sizeof (STREL));
strel8v->nx = 1;
strel8v->ny = 8;
strel8v->cx = 0;
strel8v->cy = 3;
strel8v->data = matrix(strel8v->nx, strel8v->ny);
for (i = 0; i < 8; i++)
    strel8v->data[i][0] = 1;

/* horizontal strel of length 9: (1 1 1 1 1c 1 1 1 1) */
strel9h = (STREL *) calloc (1, sizeof (STREL));
strel9h->nx = 9;
strel9h->ny = 1;
strel9h->cx = 4;   /* center pixel */
strel9h->cy = 0;
strel9h->data = matrix(strel9h->nx, strel9h->ny);
for (i = 0; i < 9; i++)
    strel9h->data[0][i] = 1;

/* vertical strel of length 9: v(1 1 1 1 1c 1 1 1 1) */
strel9v = (STREL *) calloc (1, sizeof (STREL));
strel9v->nx = 1;
strel9v->ny = 9;
strel9v->cx = 0;
strel9v->cy = 4;
strel9v->data = matrix(strel9v->nx, strel9v->ny);
for (i = 0; i < 9; i++)
    strel9v->data[i][0] = 1;
```

```c
    /* horizontal strel of length 10: ((4:1) lc (5:1)) */
strel10h = (STREL *) calloc (1, sizeof (STREL));
strel10h->nx = 10;
strel10h->ny = 1;
strel10h->cx = 4;   /* near center pixel */
strel10h->cy = 0;
strel10h->data = matrix(strel10h->nx, strel10h->ny);
for (i = 0; i < 10; i++)
    strel10h->data[0][i] = 1;

/* vertical strel of length 10: v((4:1) lc (5:1)) */
strel10v = (STREL *) calloc (1, sizeof (STREL));
strel10v->nx = 1;
strel10v->ny = 10;
strel10v->cx = 0;
strel10v->cy = 4;   /* near center pixel */
strel10v->data = matrix(strel10v->nx, strel10v->ny);
for (i = 0; i < 10; i++)
    strel10v->data[i][0] = 1;

/* horizontal strel of length 11: h((5:1) lc (5:1)) */
strel11h = (STREL *) calloc (1, sizeof (STREL));
strel11h->nx = 11;
strel11h->ny = 1;
strel11h->cx = 5;   /* center pixel */
strel11h->cy = 0;
strel11h->data = matrix(strel11h->nx, strel11h->ny);
for (i = 0; i < 11; i++)
    strel11h->data[0][i] = 1;

/* vertical strel of length 11: v((5:1) lc (5:1)) */
strel11v = (STREL *) calloc (1, sizeof (STREL));
strel11v->nx = 1;
strel11v->ny = 11;
strel11v->cx = 0;
strel11v->cy = 5;
strel11v->data = matrix(strel11v->nx, strel11v->ny);
for (i = 0; i < 11; i++)
    strel11v->data[i][0] = 1;

/* horizontal strel of length 13: h((6:1) lc (6:1)) */
strel13h = (STREL *) calloc (1, sizeof (STREL));
strel13h->nx = 13;
strel13h->ny = 1;
strel13h->cx = 6;   /* center pixel */
strel13h->cy = 0;
strel13h->data = matrix(strel13h->nx, strel13h->ny);
for (i = 0; i < 13; i++)
    strel13h->data[0][i] = 1;

/* vertical strel of length 13: v((6:1) lc (6:1)) */
strel13v = (STREL *) calloc (1, sizeof (STREL));
strel13v->nx = 1;
strel13v->ny = 13;
strel13v->cx = 0;
strel13v->cy = 6;
strel13v->data = matrix(strel13v->nx, strel13v->ny);
for (i = 0; i < 13; i++)
    strel13v->data[i][0] = 1;

/* horizontal strel of length 15: ((7:1) lc (7:1)) */
strel15h = (STREL *) calloc (1, sizeof (STREL));
strel15h->nx = 15;
strel15h->ny = 1;
```

```c
strel15h->cx = 7;   /* center on pixel */
strel15h->cy = 0;
strel15h->data = matrix(strel15h->nx, strel15h->ny);
for (i = 0; i < 15; i++)
    strel15h->data[0][i] = 1;

/* vertical strel of length 15: v((7:1) lc (7:1)) */
strel15v = (STREL *) calloc (1, sizeof (STREL));
strel15v->nx = 1;
strel15v->ny = 15;
strel15v->cx = 0;
strel15v->cy = 7;   /* center on center pixel */
strel15v->data = matrix(strel15v->nx, strel15v->ny);
for (i = 0; i < 15; i++)
    strel15v->data[i][0] = 1;

/* horizontal strel of length 20: ((9:1) lc (10:1))  */
strel20h = (STREL *) calloc (1, sizeof (STREL));
strel20h->nx = 20;
strel20h->ny = 1;
strel20h->cx = 9;   /* near center pixel */
strel20h->cy = 0;
strel20h->data = matrix(strel20h->nx, strel20h->ny);
for (i = 0; i < 20; i++)
    strel20h->data[0][i] = 1;

/* vertical strel of length 20: v((9:1) lc (10:1))  */
strel20v = (STREL *) calloc (1, sizeof (STREL));
strel20v->nx = 1;
strel20v->ny = 20;
strel20v->cx = 0;
strel20v->cy = 9;   /* near center pixel */
strel20v->data = matrix(strel20v->nx, strel20v->ny);
for (i = 0; i < 20; i++)
    strel20v->data[i][0] = 1;

/* horizontal strel of length 25: ((12:1) lc (12:1))  */
strel25h = (STREL *) calloc (1, sizeof (STREL));
strel25h->nx = 25;
strel25h->ny = 1;
strel25h->cx = 12;  /* center pixel */
strel25h->cy = 0;
strel25h->data = matrix(strel25h->nx, strel25h->ny);
for (i = 0; i < 25; i++)
    strel25h->data[0][i] = 1;

/* vertical strel of length 25: v((12:1) lc (12:1))  */
strel25v = (STREL *) calloc (1, sizeof (STREL));
strel25v->nx = 1;
strel25v->ny = 25;
strel25v->cx = 0;
strel25v->cy = 12;  /* on center pixel */
strel25v->data = matrix(strel25v->nx, strel25v->ny);
for (i = 0; i < 25; i++)
    strel25v->data[i][0] = 1;

/* horizontal strel of length 30: ((14:1) lc (15:1)) */
strel30h = (STREL *) calloc (1, sizeof (STREL));
strel30h->nx = 30;
strel30h->ny = 1;
strel30h->cx = 14;  /* center pixel */
strel30h->cy = 0;
strel30h->data = matrix(strel30h->nx, strel30h->ny);
for (i = 0; i < 30; i++)
```

```
    strel30h->data[0][i] = 1;

/* vertical strel of length 30: v((14:1) lc (15:1))  */
strel30v = (STREL *) calloc (1, sizeof (STREL));
strel30v->nx = 1;
strel30v->ny = 30;
strel30v->cx = 0;
strel30v->cy = 14;   /* on center pixel */
strel30v->data = matrix(strel30v->nx, strel30v->ny);
for (i = 0; i < 30; i++)
    strel30v->data[i][0] = 1;

/* horizontal strel of length 35: ((17:1) lc (17:1))  */
strel35h = (STREL *) calloc (1, sizeof (STREL));
strel35h->nx = 35;
strel35h->ny = 1;
strel35h->cx = 17;   /* center pixel */
strel35h->cy = 0;
strel35h->data = matrix(strel35h->nx, strel35h->ny);
for (i = 0; i < 35; i++)
    strel35h->data[0][i] = 1;

/* vertical strel of length 35: v((17:1) lc (17:1))  */
strel35v = (STREL *) calloc (1, sizeof (STREL));
strel35v->nx = 1;
strel35v->ny = 35;
strel35v->cx = 0;
strel35v->cy = 17;   /* on center pixel */
strel35v->data = matrix(strel35v->nx, strel35v->ny);
for (i = 0; i < 35; i++)
    strel35v->data[i][0] = 1;

/* horizontal strel of length 40: ((19:1) lc (20:1))  */
strel40h = (STREL *) calloc (1, sizeof (STREL));
strel40h->nx = 40;
strel40h->ny = 1;
strel40h->cx = 19;   /* center pixel */
strel40h->cy = 0;
strel40h->data = matrix(strel40h->nx, strel40h->ny);
for (i = 0; i < 40; i++)
    strel40h->data[0][i] = 1;

/* vertical strel of length 40: v((19:1) lc (20:1))  */
strel40v = (STREL *) calloc (1, sizeof (STREL));
strel40v->nx = 1;
strel40v->ny = 40;
strel40v->cx = 0;
strel40v->cy = 19;   /* on center pixel */
strel40v->data = matrix(strel40v->nx, strel40v->ny);
for (i = 0; i < 40; i++)
    strel40v->data[i][0] = 1;

/* horizontal strel of length 45: ((22:1) lc (22:1))  */
strel45h = (STREL *) calloc (1, sizeof (STREL));
strel45h->nx = 45;
strel45h->ny = 1;
strel45h->cx = 22;   /* center pixel */
strel45h->cy = 0;
strel45h->data = matrix(strel45h->nx, strel45h->ny);
for (i = 0; i < 45; i++)
    strel45h->data[0][i] = 1;

/* vertical strel of length 45: v((22:1) lc (22:1))  */
strel45v = (STREL *) calloc (1, sizeof (STREL));
strel45v->nx = 1;
```

```
strel45v->ny = 45;
strel45v->cx = 0;
strel45v->cy = 22;   /* on center pixel */
strel45v->data = matrix(strel45v->nx, strel45v->ny);
for (i = 0; i < 45; i++)
    strel45v->data[i][0] = 1;

/* horizontal strel of length 50: ((24:1) lc (25:1)) */
strel50h = (STREL *) calloc (1, sizeof (STREL));
strel50h->nx = 50;
strel50h->ny = 1;
strel50h->cx = 24;   /* center pixel */
strel50h->cy = 0;
strel50h->data = matrix(strel50h->nx, strel50h->ny);
for (i = 0; i < 50; i++)
    strel50h->data[0][i] = 1;

/* vertical strel of length 50: v((24:1) lc (25:1)) */
strel50v = (STREL *) calloc (1, sizeof (STREL));
strel50v->nx = 1;
strel50v->ny = 50;
strel50v->cx = 0;
strel50v->cy = 24;   /* on center pixel */
strel50v->data = matrix(strel50v->nx, strel50v->ny);
for (i = 0; i < 50; i++)
    strel50v->data[i][0] = 1;

/* diagonal strel, length 3, positive slope. */
strel3dp = (STREL *) calloc (1, sizeof (STREL));
strel3dp->nx = strel3dp->ny = 3;
strel3dp->cx = strel3dp->cy = 1;
strel3dp->data = matrix(strel3dp->nx, strel3dp->ny);
for (i = 0; i < 3; i++)
{
    j = 2 - i;
    strel3dp->data[i][j] = 1;
}

/* diagonal strel, length 3, negative slope. */
strel3dn = (STREL *) calloc (1, sizeof (STREL));
strel3dn->nx = strel3dn->ny = 3;
strel3dn->cx = strel3dn->cy = 1;
strel3dn->data = matrix(strel3dn->nx, strel3dn->ny);
for (i = 0; i < 3; i++)
    strel3dn->data[i][i] = 1;

/* diagonal strel, length 4, positive slope. */
strel4dp = (STREL *) calloc (1, sizeof (STREL));
strel4dp->nx = strel4dp->ny = 4;
strel4dp->cx = strel4dp->cy = 1;
strel4dp->data = matrix(strel4dp->nx, strel4dp->ny);
for (i = 0; i < 4; i++)
{
    j = 3 - i;
    strel4dp->data[i][j] = 1;
}

/* diagonal strel, length 4, negative slope. */
strel4dn = (STREL *) calloc (1, sizeof (STREL));
strel4dn->nx = strel4dn->ny = 4;
strel4dn->cx = strel4dn->cy = 1;
strel4dn->data = matrix(strel4dn->nx, strel4dn->ny);
for (i = 0; i < 4; i++)
    strel4dn->data[i][i] = 1;
```

```
    /* diagonal strel, length 5, positive slope. */
strel5dp = (STREL *) calloc (1, sizeof (STREL));
strel5dp->nx = strel5dp->ny = 5;
strel5dp->cx = strel5dp->cy = 2;
strel5dp->data = matrix(strel5dp->nx, strel5dp->ny);
for (i = 0; i < 5; i++)
{
    j = 4 - i;
    strel5dp->data[i][j] = 1;
}

/* diagonal strel, length 5, negative slope. */
strel5dn = (STREL *) calloc (1, sizeof (STREL));
strel5dn->nx = strel5dn->ny = 5;
strel5dn->cx = strel5dn->cy = 2;
strel5dn->data = matrix(strel5dn->nx, strel5dn->ny);
for (i = 0; i < 5; i++)
    strel5dn->data[i][i] = 1;

/* diagonal strel, length 6, positive slope. */
strel6dp = (STREL *) calloc (1, sizeof (STREL));
strel6dp->nx = strel6dp->ny = 6;
strel6dp->cx = strel6dp->cy = 2;
strel6dp->data = matrix(strel6dp->nx, strel6dp->ny);
for (i = 0; i < 6; i++)
{
    j = 5 - i;
    strel6dp->data[i][j] = 1;
}

/* diagonal strel, length 6, negative slope. */
strel6dn = (STREL *) calloc (1, sizeof (STREL));
strel6dn->nx = strel6dn->ny = 6;
strel6dn->cx = strel6dn->cy = 2;
strel6dn->data = matrix(strel6dn->nx, strel6dn->ny);
for (i = 0; i < 6; i++)
    strel6dn->data[i][j] = 1;

/* diagonal strel, length 7, positive slope. */
strel7dp = (STREL *) calloc (1, sizeof (STREL));
strel7dp->nx = strel7dp->ny = 7;
strel7dp->cx = strel7dp->cy = 3;
strel7dp->data = matrix(strel7dp->nx, strel7dp->ny);
for (i = 0; i < 7; i++)
{
    j = 6 - i;
    strel7dp->data[i][j] = 1;
}

/* diagonal strel, length 7, negative slope. */
strel7dn = (STREL *) calloc (1, sizeof (STREL));
strel7dn->nx = strel7dn->ny = 7;
strel7dn->cx = strel7dn->cy = 3;
strel7dn->data = matrix(strel7dn->nx, strel7dn->ny);
for (i = 0; i < 7; i++)
    strel7dn->data[i][i] = 1;

/* diagonal strel, length 9, positive slope. */
strel9dp = (STREL *) calloc (1, sizeof (STREL));
strel9dp->nx = strel9dp->ny = 9;
strel9dp->cx = strel9dp->cy = 4;
strel9dp->data = matrix(strel9dp->nx, strel9dp->ny);
for (i = 0; i < 9; i++)
{
```

```c
        j = 8 - i;
        strel9dp->data[i][j] = 1;
}

/* diagonal strel, length 9, negative slope. */
strel9dn = (STREL *) calloc (1, sizeof (STREL));
strel9dn->nx = strel9dn->ny = 9;
strel9dn->cx = strel9dn->cy = 4;
strel9dn->data = matrix(strel9dn->nx, strel9dn->ny);
for (i = 0; i < 9; i++)
    strel9dn->data[i][i] = 1;

/* diagonal strel, length 11, positive slope. */
strel11dp = (STREL *) calloc (1, sizeof (STREL));
strel11dp->nx = strel11dp->ny = 11;
strel11dp->cx = strel11dp->cy = 5;
strel11dp->data = matrix(strel11dp->nx, strel11dp->ny);
for (i = 0; i < 11; i++)
{
    j = 10 - i;
    strel11dp->data[i][j] = 1;
}

/* diagonal strel, length 11, negative slope. */
strel11dn = (STREL *) calloc (1, sizeof (STREL));
strel11dn->nx = strel11dn->ny = 11;
strel11dn->cx = strel11dn->cy = 5;
strel11dn->data = matrix(strel11dn->nx, strel11dn->ny);
for (i = 0; i < 11; i++)
    strel11dn->data[i][i] = 1;

/* diagonal strel, length 13, positive slope. */
strel13dp = (STREL *) calloc (1, sizeof (STREL));
strel13dp->nx = strel13dp->ny = 13;
strel13dp->cx = strel13dp->cy = 6;
strel13dp->data = matrix(strel13dp->nx, strel13dp->ny);
for (i = 0; i < 13; i++)
{
    j = 12 - i;
    strel13dp->data[i][j] = 1;
}

/* diagonal strel, length 13, negative slope. */
strel13dn = (STREL *) calloc (1, sizeof (STREL));
strel13dn->nx = strel13dn->ny = 13;
strel13dn->cx = strel13dn->cy = 6;
strel13dn->data = matrix(strel13dn->nx, strel13dn->ny);
for (i = 0; i < 13; i++)
    strel13dn->data[i][i] = 1;

/* diagonal strel, length 15, positive slope. */
strel15dp = (STREL *) calloc (1, sizeof (STREL));
strel15dp->nx = strel15dp->ny = 15;
strel15dp->cx = strel15dp->cy = 7;
strel15dp->data = matrix(strel15dp->nx, strel15dp->ny);
for (i = 0; i < 15; i++)
{
    j = 14 - i;
    strel15dp->data[i][j] = 1;
}

/* diagonal strel, length 15, negative slope. */
strel15dn = (STREL *) calloc (1, sizeof (STREL));
strel15dn->nx = strel15dn->ny = 15;
strel15dn->cx = strel15dn->cy = 7;
```

```
strel15dn->data = matrix(strel15dn->nx, strel15dn->ny);
for (i = 0; i < 15; i++)
    strel15dn->data[i][i] = 1;

/* +27 degree diagonal strel, max. dimension 5 */
strel5hdp = (STREL *) calloc (1, sizeof (STREL));
strel5hdp->nx = 5;
strel5hdp->ny = 3;
strel5hdp->cx = 2;
strel5hdp->cy = 1;
strel5hdp->data = matrix(strel5hdp->nx, strel5hdp->ny);
for (j = 0; j < 5; j++)
{
    i = 2 - j/2;
    strel5hdp->data[i][j] = 1;
}

/* -27 degree diagonal strel, max. dimension 5 */
strel5hdn = (STREL *) calloc (1, sizeof (STREL));
strel5hdn->nx = 5;
strel5hdn->ny = 3;
strel5hdn->cx = 2;
strel5hdn->cy = 1;
strel5hdn->data = matrix(strel5hdn->nx, strel5hdn->ny);
for (j = 0; j < 5; j++)
{
    i = j/2;
    strel5hdn->data[i][j] = 1;
}

/* +63 degree diagonal strel, max. dimension 5 */
strel5vdp = (STREL *) calloc (1, sizeof (STREL));
strel5vdp->nx = 3;
strel5vdp->ny = 5;
strel5vdp->cx = 1;
strel5vdp->cy = 2;
strel5vdp->data = matrix(strel5vdp->nx, strel5vdp->ny);
for (i = 0; i < 5; i++)
{
    j = 2 - (i+1)/2;
    strel5vdp->data[i][j] = 1;
}

/* -63 degree diagonal strel, max. dimension 5 */
strel5vdn = (STREL *) calloc (1, sizeof (STREL));
strel5vdn->nx = 3;
strel5vdn->ny = 5;
strel5vdn->cx = 1;
strel5vdn->cy = 2;
strel5vdn->data = matrix(strel5vdn->nx, strel5vdn->ny);
for (i = 0; i < 5; i++)
{
    j = (i+1)/2;
    strel5vdn->data[i][j] = 1;
}

/* +27 degree diagonal strel, max. dimension 9 */
strel9hdp = (STREL *) calloc (1, sizeof (STREL));
strel9hdp->nx = 9;
strel9hdp->ny = 5;
strel9hdp->cx = 4;
strel9hdp->cy = 2;
strel9hdp->data = matrix(strel9hdp->nx, strel9hdp->ny);
for (j = 0; j < 9; j++)
{
```

```c
    i = 4 - j/2;
    strel9hdp->data[i][j] = 1;
}

/* -27 degree diagonal strel, max. dimension 9 */
strel9hdn = (STREL *) calloc (1, sizeof (STREL));
strel9hdn->nx = 9;
strel9hdn->ny = 5;
strel9hdn->cx = 4;
strel9hdn->cy = 2;
strel9hdn->data = matrix(strel9hdn->nx, strel9hdn->ny);
for (j = 0; j < 9; j++)
{
    i = j/2;
    strel9hdn->data[i][j] = 1;
}

/* +63 degree diagonal strel, max. dimension 9 */
strel9vdp = (STREL *) calloc (1, sizeof (STREL));
strel9vdp->nx = 5;
strel9vdp->ny = 9;
strel9vdp->cx = 2;
strel9vdp->cy = 4;
strel9vdp->data = matrix(strel9vdp->nx, strel9vdp->ny);
for (i = 0; i < 9; i++)
{
    j = 4 - (i+1)/2;
    strel9vdp->data[i][j] = 1;
}

/* -63 degree diagonal strel, max. dimension 9 */
strel9vdn = (STREL *) calloc (1, sizeof (STREL));
strel9vdn->nx = 5;
strel9vdn->ny = 9;
strel9vdn->cx = 2;
strel9vdn->cy = 4;
strel9vdn->data = matrix(strel9vdn->nx, strel9vdn->ny);
for (i = 0; i < 9; i++)
{
    j = (i+1)/2;
    strel9vdn->data[i][j] = 1;
}

/* +27 degree diagonal strel, max. dimension 13 */
strel13hdp = (STREL *) calloc (1, sizeof (STREL));
strel13hdp->nx = 13;
strel13hdp->ny = 7;
strel13hdp->cx = 6;
strel13hdp->cy = 3;
strel13hdp->data = matrix(strel13hdp->nx, strel13hdp->ny);
for (j = 0; j < 13; j++)
{
    i = 6 - j/2;
    strel13hdp->data[i][j] = 1;
}

/* -27 degree diagonal strel, max. dimension 13 */
strel13hdn = (STREL *) calloc (1, sizeof (STREL));
strel13hdn->nx = 13;
strel13hdn->ny = 7;
strel13hdn->cx = 6;
strel13hdn->cy = 3;
strel13hdn->data = matrix(strel13hdn->nx, strel13hdn->ny);
for (j = 0; j < 13; j++)
{
```

```
    i = j/2;
    strel13hdn->data[i][j] = 1;
}

/* +63 degree diagonal strel, max. dimension 13 */
strel13vdp = (STREL *) calloc (1, sizeof (STREL));
strel13vdp->nx = 7;
strel13vdp->ny = 13;
strel13vdp->cx = 3;
strel13vdp->cy = 6;
strel13vdp->data = matrix(strel13vdp->nx, strel13vdp->ny);
for (i = 0; i < 13; i++)
{
    j = 6 - (i+1)/2;
    strel13vdp->data[i][j] = 1;
}

/* -63 degree diagonal strel, max. dimension 13 */
strel13vdn = (STREL *) calloc (1, sizeof (STREL));
strel13vdn->nx = 7;
strel13vdn->ny = 13;
strel13vdn->cx = 3;
strel13vdn->cy = 6;
strel13vdn->data = matrix(strel13vdn->nx, strel13vdn->ny);
for (i = 0; i < 13; i++)
{
    j = (i+1)/2;
    strel13vdn->data[i][j] = 1;
}

/* pattern: 1c */
strel1 = (STREL *) calloc (1, sizeof (STREL));
strel1->nx = strel1->ny = 1;
strel1->cx = strel1->cy = 0;
strel1->data = matrix(strel1->nx, strel1->ny);
strel1->data[0][0] = 1;

/* pattern: 1c  1
                 1  1      */
strel2 = (STREL *) calloc (1, sizeof (STREL));
strel2->nx = strel2->ny = 2;
strel2->cx = strel2->cy = 0;
strel2->data = matrix(strel2->nx, strel2->ny);
strel2->data[0][0] = 1;
strel2->data[0][1] = 1;
strel2->data[1][0] = 1;
strel2->data[1][1] = 1;

/* pattern:  1  1  1
                 1  1c 1
                 1  1  1  */
strel3 = (STREL *) calloc (1, sizeof (STREL));
strel3->nx = strel3->ny = 3;
strel3->cx = strel3->cy = 1;
strel3->data = matrix(strel3->nx, strel3->ny);
for (j = 0; j < 3; j++)
    for (i = 0; i < 3; i++)
        strel3->data[j][i] = 1;

/* pattern:  1  1  1  1
                 1  1c 1  1
                 1  1  1  1
                 1  1  1  1  */
strel4 = (STREL *) calloc (1, sizeof (STREL));
```

```c
strel4->nx = strel4->ny = 4;
strel4->cx = strel4->cy = 1;
strel4->data = matrix(strel4->nx, strel4->ny);
for (j = 0; j < 4; j++)
    for (i = 0; i < 4; i++)
        strel4->data[j][i] = 1;

/* pattern:  1  1  1  1  1
             1  1  1  1  1
             1  1  1c 1  1
             1  1  1  1  1
             1  1  1  1  1   */
strel5 = (STREL *) calloc (1, sizeof (STREL));
strel5->nx = strel5->ny = 5;
strel5->cx = strel5->cy = 2;
strel5->data = matrix(strel5->nx, strel5->ny);
for (j = 0; j < 5; j++)
    for (i = 0; i < 5; i++)
        strel5->data[j][i] = 1;

/* pattern:  0c 1
             1  0    */
strel2dp = (STREL *) calloc (1, sizeof (STREL));
strel2dp->nx = strel2dp->ny = 2;
strel2dp->cx = strel2dp->cy = 0;
strel2dp->data = matrix(strel2dp->nx, strel2dp->ny);
strel2dp->data[0][1] = 1;
strel2dp->data[1][0] = 1;

/* pattern:  1c 0
             0  1    */
strel2dm = (STREL *) calloc (1, sizeof (STREL));
strel2dm->nx = strel2dm->ny = 2;
strel2dm->cx = strel2dm->cy = 0;
strel2dm->data = matrix(strel2dm->nx, strel2dm->ny);
strel2dm->data[0][0] = 1;
strel2dm->data[1][1] = 1;

/* pattern:  0c 1
             1  1    */
strel2ule = (STREL *) calloc (1, sizeof (STREL));
strel2ule->nx = strel2ule->ny = 2;
strel2ule->cx = strel2ule->cy = 0;
strel2ule->data = matrix(strel2ule->nx, strel2ule->ny);
strel2ule->data[0][1] = 1;
strel2ule->data[1][0] = 1;
strel2ule->data[1][1] = 1;

/* pattern:  1c 0
             0  0    */
strel2uld = (STREL *) calloc (1, sizeof (STREL));
strel2uld->nx = strel2uld->ny = 2;
strel2uld->cx = strel2uld->cy = 0;
strel2uld->data = matrix(strel2uld->nx, strel2uld->ny);
strel2uld->data[0][0] = 1;

/* pattern:  1c 0
             1  1    */
strel2ure = (STREL *) calloc (1, sizeof (STREL));
strel2ure->nx = strel2ure->ny = 2;
strel2ure->cx = strel2ure->cy = 0;
strel2ure->data = matrix(strel2ure->nx, strel2ure->ny);
strel2ure->data[0][0] = 1;
strel2ure->data[1][0] = 1;
strel2ure->data[1][1] = 1;
```

```
    /* pattern:  0c  1
                  0  0     */
strel2urd = (STREL *) calloc (1, sizeof (STREL));
strel2urd->nx = strel2urd->ny = 2;
strel2urd->cx = strel2urd->cy = 0;
strel2urd->data = matrix(strel2urd->nx, strel2urd->ny);
strel2urd->data[0][1] = 1;

/* pattern:  1c  1
                  0  1     */
strel2lle = (STREL *) calloc (1, sizeof (STREL));
strel2lle->nx = strel2lle->ny = 2;
strel2lle->cx = strel2lle->cy = 0;
strel2lle->data = matrix(strel2lle->nx, strel2lle->ny);
strel2lle->data[0][0] = 1;
strel2lle->data[0][1] = 1;
strel2lle->data[1][1] = 1;

/* pattern:  0c  0
                  1  0     */
strel2lld = (STREL *) calloc (1, sizeof (STREL));
strel2lld->nx = strel2lld->ny = 2;
strel2lld->cx = strel2lld->cy = 0;
strel2lld->data = matrix(strel2lld->nx, strel2lld->ny);
strel2lld->data[1][0] = 1;

/* pattern:  1c  1
                  1  0     */
strel2lre = (STREL *) calloc (1, sizeof (STREL));
strel2lre->nx = strel2lre->ny = 2;
strel2lre->cx = strel2lre->cy = 0;
strel2lre->data = matrix(strel2lre->nx, strel2lre->ny);
strel2lre->data[0][0] = 1;
strel2lre->data[0][1] = 1;
strel2lre->data[1][0] = 1;

/* pattern:  0c  0
                  0  1     */
strel2lrd = (STREL *) calloc (1, sizeof (STREL));
strel2lrd->nx = strel2lrd->ny = 2;
strel2lrd->cx = strel2lrd->cy = 0;
strel2lrd->data = matrix(strel2lrd->nx, strel2lrd->ny);
strel2lrd->data[1][1] = 1;

/* pattern match for top left b.b. corner:  2  2
     *                                          2  1c  */
strel2tl = (STREL *) calloc (1, sizeof (STREL));
strel2tl->nx = 2;
strel2tl->ny = 2;
strel2tl->cx = 1;
strel2tl->cy = 1;
strel2tl->data = matrix(strel2tl->nx, strel2tl->ny);
strel2tl->data[0][0] = 2;
strel2tl->data[0][1] = 2;
strel2tl->data[1][0] = 2;
strel2tl->data[1][1] = 1;

/* pattern match for top right b.b. corner:  2  2
     *                                           1c 2  */
strel2tr = (STREL *) calloc (1, sizeof (STREL));
strel2tr->nx = 2;
strel2tr->ny = 2;
```

```
strel2tr->cx = 0;
strel2tr->cy = 1;
strel2tr->data = matrix(strel2tr->nx, strel2tr->ny);
strel2tr->data[0][0] = 2;
strel2tr->data[0][1] = 2;
strel2tr->data[1][0] = 1;
strel2tr->data[1][1] = 2;

/* pattern match for bottom left b.b. corner:  2 1c
     *                                             2 2   */
strel2bl = (STREL *) calloc (1, sizeof (STREL));
strel2bl->nx = 2;
strel2bl->ny = 2;
strel2bl->cx = 1;
strel2bl->cy = 0;
strel2bl->data = matrix(strel2bl->nx, strel2bl->ny);
strel2bl->data[0][0] = 2;
strel2bl->data[0][1] = 1;
strel2bl->data[1][0] = 2;
strel2bl->data[1][1] = 2;

/* pattern match for bottom right b.b. corner:  1c 2
     *                                              2  2   */
strel2br = (STREL *) calloc (1, sizeof (STREL));
strel2br->nx = 2;
strel2br->ny = 2;
strel2br->cx = 0;
strel2br->cy = 0;
strel2br->data = matrix(strel2br->nx, strel2br->ny);
strel2br->data[0][0] = 1;
strel2br->data[0][1] = 2;
strel2br->data[1][0] = 2;
strel2br->data[1][1] = 2;

/* pattern match for vertical runs of length 1.  v: 2 1c 2    */
strel3ve = (STREL *) calloc (1, sizeof (STREL));
strel3ve->nx = 1;
strel3ve->ny = 3;
strel3ve->cx = 0;
strel3ve->cy = 1;   /* center pixel in column */
strel3ve->data = matrix(strel3ve->nx, strel3ve->ny);
strel3ve->data[0][0] = 2;
strel3ve->data[1][0] = 1;
strel3ve->data[2][0] = 2;

/* pattern match for vertical runs of length 2.  v: 2 1c 1 2    */
strel4ve = (STREL *) calloc (1, sizeof (STREL));
strel4ve->nx = 1;
strel4ve->ny = 4;
strel4ve->cx = 0;
strel4ve->cy = 1;   /* first on pixel down */
strel4ve->data = matrix(strel4ve->nx, strel4ve->ny);
strel4ve->data[0][0] = 2;
strel4ve->data[1][0] = 1;
strel4ve->data[2][0] = 1;
strel4ve->data[3][0] = 2;

/* use with strel4ve to dilate both pixels: */
strel2vd = (STREL *) malloc (sizeof (STREL));
strel2vd->nx = 1;
strel2vd->ny = 2;
strel2vd->cx = 0;   /* dilate 1 --> 1
                              0     1   */
```

```c
strel2vd->cy = 0;
strel2vd->data = matrix(strel2vd->nx, strel2vd->ny);
strel2vd->data[0][0] = 1;
strel2vd->data[1][0] = 1;

/* pattern match for run of length 1:    2c 1 2   */
strel3h1 = (STREL *) calloc (1, sizeof (STREL));
strel3h1->nx = 3;
strel3h1->ny = 1;
strel3h1->cx = 0;   /* center at left pixel */
strel3h1->cy = 0;
strel3h1->data = matrix(strel3h1->nx, strel3h1->ny);
strel3h1->data[0][0] = 2;
strel3h1->data[0][1] = 1;
strel3h1->data[0][2] = 2;
    /* pattern match for white run of length 1:   1 2 1c   */
strel3h2 = (STREL *) calloc (1, sizeof (STREL));
strel3h2->nx = 3;
strel3h2->ny = 1;
strel3h2->cx = 2;   /* center at right pixel */
strel3h2->cy = 0;
strel3h2->data = matrix(strel3h2->nx, strel3h2->ny);
strel3h2->data[0][0] = 1;
strel3h2->data[0][1] = 2;
strel3h2->data[0][2] = 1;

/* pattern match for vertical run of length 1:  v:2c 1 2   */
strel3v1 = (STREL *) calloc (1, sizeof (STREL));
strel3v1->nx = 1;
strel3v1->ny = 3;
strel3v1->cx = 0;
strel3v1->cy = 0;   /* center at top pixel */
strel3v1->data = matrix(strel3v1->nx, strel3v1->ny);
strel3v1->data[0][0] = 2;
strel3v1->data[1][0] = 1;
strel3v1->data[2][0] = 2;

/* pattern match for vertical white run of length 1:  v:1 2 1c   */
strel3v2 = (STREL *) calloc (1, sizeof (STREL));
strel3v2->nx = 1;
strel3v2->ny = 3;
strel3v2->cx = 0;
strel3v2->cy = 2;   /* center at bottom pixel */
strel3v2->data = matrix(strel3v2->nx, strel3v2->ny);
strel3v2->data[0][0] = 1;
strel3v2->data[1][0] = 2;
strel3v2->data[2][0] = 1;

/* pattern match for run of length 2:    2c 1 1 2   */
strel4h1 = (STREL *) calloc (1, sizeof (STREL));
strel4h1->nx = 4;
strel4h1->ny = 1;
strel4h1->cx = 0;   /* center at left pixel */
strel4h1->cy = 0;
strel4h1->data = matrix(strel4h1->nx, strel4h1->ny);
strel4h1->data[0][0] = 2;
strel4h1->data[0][1] = 1;
strel4h1->data[0][2] = 1;
strel4h1->data[0][3] = 2;

/* pattern match for white run of length 2:   1 2 2 1c   */
strel4h2 = (STREL *) calloc (1, sizeof (STREL));
strel4h2->nx = 4;
strel4h2->ny = 1;
```

```
strel4h2->cx = 3;  /* center at right pixel */
strel4h2->cy = 0;
strel4h2->data = matrix(strel4h2->nx, strel4h2->ny);
strel4h2->data[0][0] = 1;
strel4h2->data[0][1] = 2;
strel4h2->data[0][2] = 2;
strel4h2->data[0][3] = 1;

/* pattern match for vertical run of length 2:  v:2c 1 1 2   */
strel4v1 = (STREL *) calloc (1, sizeof (STREL));
strel4v1->nx = 1;
strel4v1->ny = 4;
strel4v1->cx = 0;
strel4v1->cy = 0;  /* center at top pixel */
strel4v1->data = matrix(strel4v1->nx, strel4v1->ny);
strel4v1->data[0][0] = 2;
strel4v1->data[1][0] = 1;
strel4v1->data[2][0] = 1;
strel4v1->data[3][0] = 2;

/* pattern match for vertical white run of length 2:  v:1 2 2 1c   */
strel4v2 = (STREL *) calloc (1, sizeof (STREL));
strel4v2->nx = 1;
strel4v2->ny = 4;
strel4v2->cx = 0;
strel4v2->cy = 3;  /* center at bottom pixel */
strel4v2->data = matrix(strel4v2->nx, strel4v2->ny);
strel4v2->data[0][0] = 1;
strel4v2->data[1][0] = 2;
strel4v2->data[2][0] = 2;
strel4v2->data[3][0] = 1;

/* pattern match for run of length 3:   2c 1 1 1 2   */
strel5h1 = (STREL *) calloc (1, sizeof (STREL));
strel5h1->nx = 5;
strel5h1->ny = 1;
strel5h1->cx = 0;  /* center at left pixel */
strel5h1->cy = 0;
strel5h1->data = matrix(strel5h1->nx, strel5h1->ny);
strel5h1->data[0][0] = 2;
strel5h1->data[0][1] = 1;
strel5h1->data[0][2] = 1;
strel5h1->data[0][3] = 1;
strel5h1->data[0][4] = 2;

/* pattern match for white run of length 3:   1 2 2 2 1c   */
strel5h2 = (STREL *) calloc (1, sizeof (STREL));
strel5h2->nx = 5;
strel5h2->ny = 1;
strel5h2->cx = 4;  /* center at right pixel */
strel5h2->cy = 0;
strel5h2->data = matrix(strel5h2->nx, strel5h2->ny);
strel5h2->data[0][0] = 1;
strel5h2->data[0][1] = 2;
strel5h2->data[0][2] = 2;
strel5h2->data[0][3] = 2;
strel5h2->data[0][4] = 1;

/* pattern match for vertical run of length 3:  v:2c 1 1 1 2   */
strel5v1 = (STREL *) calloc (1, sizeof (STREL));
strel5v1->nx = 1;
strel5v1->ny = 5;
strel5v1->cx = 0;
```

```c
strel5v1->cy = 0;  /* center at top pixel */
strel5v1->data = matrix(strel5v1->nx, strel5v1->ny);
strel5v1->data[0][0] = 2;
strel5v1->data[1][0] = 1;
strel5v1->data[2][0] = 1;
strel5v1->data[3][0] = 1;
strel5v1->data[4][0] = 2;
    /* pattern match for vertical white run of length 3: v:1 2 2 2 1c */
strel5v2 = (STREL *) calloc (1, sizeof (STREL));
strel5v2->nx = 1;
strel5v2->ny = 5;
strel5v2->cx = 0;
strel5v2->cy = 4;  /* center at bottom pixel */
strel5v2->data = matrix(strel5v2->nx, strel5v2->ny);
strel5v2->data[0][0] = 1;
strel5v2->data[1][0] = 2;
strel5v2->data[2][0] = 2;
strel5v2->data[3][0] = 2;
strel5v2->data[4][0] = 1;

/* pattern match for single pixel with 4-adj white surround:
            0    2    0
            2    1c   2
            0    2    0       */
strel3ht1 = (STREL *) calloc (1, sizeof (STREL));
strel3ht1->nx = 3;
strel3ht1->ny = 3;
strel3ht1->cx = 1;  /* center pixel in center */
strel3ht1->cy = 1;
strel3ht1->data = matrix(strel3ht1->nx, strel3ht1->ny);
strel3ht1->data[1][1] = 1;
strel3ht1->data[0][1] = 2;
strel3ht1->data[1][0] = 2;
strel3ht1->data[1][2] = 2;
strel3ht1->data[2][1] = 2;

/* pattern match for two pixels with near 4-adj white surround:
            0    2    0
            2    1c   1
            0    2    0       */
strel3ht2 = (STREL *) calloc (1, sizeof (STREL));
strel3ht2->nx = 3;
strel3ht2->ny = 3;
strel3ht2->cx = 1;  /* center pixel in center */
strel3ht2->cy = 1;
strel3ht2->data = matrix(strel3ht2->nx, strel3ht2->ny);
strel3ht2->data[1][1] = 1;
strel3ht2->data[1][2] = 1;
strel3ht2->data[0][1] = 2;
strel3ht2->data[1][0] = 2;
strel3ht2->data[2][1] = 2;

/* horizontal gapped strel of length 5: (1 1 2c 1 1) */
strel5gap = (STREL *) calloc (1, sizeof (STREL));
strel5gap->nx = 5;
strel5gap->ny = 1;
strel5gap->cx = 2;  /* center pixel */
strel5gap->cy = 0;
strel5gap->data = matrix(strel5gap->nx, strel5gap->ny);
for (i = 0; i < 5; i++)
    strel5gap->data[0][i] = 1;
strel5gap->data[0][2] = 2;

}
```

```
*  matrix():  returns a matrix (pointer to array of pointers)
*             at starting address m that
*                  (1) has allocation for ny rows of nx short ints in each row,
*                  (2) "knows" that each row is of width nx.
*/
short int **
matrix(nx, ny)
int          nx, ny;
{
short int    **m;
int          j;

/* m is a pointer to an array of ny pointers */
  m = (short int **) calloc (ny, sizeof(short int *));
     /* each of which points to an array of nx short ints */
  for (j = 0; j < ny; j++)
     m[j] = (short int *) calloc (nx, sizeof(short int));
  return (m);
}
```

```
/****************************************************************
 * Copyright (c) 1988, Xerox Corporation.  All rights reserved.  *
 * Copyright protection claimed includes all forms and matters   *
 * of copyrightable material and information now allowed by      *
 * statutory or judicial law or hereafter granted, including     *
 * without limitation, material generated from the software      *
 * programs which are displayed on the screen such as icons,     *
 * screen display looks, etc.                                    *
 ****************************************************************/

/*
 *   strelHT.c--includes subroutines
 *                 strelHTInits()
 *
 *          Horizontal Filters:
 *                 --filtH8p2c0d, filtH8p3c0d;
 *
 ****************************************************************
 *          Solid Filters:
 *                 --filtS4p1c0d, filtS4p1c0dI;    0 degrees...
 *                 --filtS6p1c0d, filtS8p1c0d;
 *                 --filtS8p15c0d; (1.5 cycles)
 *
 ****************************************************************
 *          Cruciform Filters:
 *                 --filtC4p2c0d, filtC4p2c0dI;
 *                 --filtC4p2c14d;
 *                 --filtC4p2c27d, filtC4p2c27dI;
 *                 --filtC4p2c45d;
 *
 *                 --filtC5p2c0d;
 *                 --filtC5p2c22d;
 *                 --filtC5p2c37d;
 *
 *                 --filtC6p2c0d;
 *                 --filtC6p2c18d;
 *                 --filtC6p2c31d;
 *                 --filtC6p2c45d;
 *
 *                 --filtC7p2c0d;
 *                 --filtC7p2c27d;
 *                 --filtC7p2c34d;
 *                 --filtC7p2c45d;
 *
 *                 --filtC8p2c0d;
 *                 --filtC8p2c23d;
 *                 --filtC8p2c30d;
 *                 --filtC8p2c45d;
 *
 ****************************************************************
 *          Wide Bandpass Filters:
 *                 --filtL3p1c18d;
 *                 --filtL3p1c45d;
 *
 *                 --filtL4p1c0d;
 *                 --filtL4p1c27d;
 *                 --filtL4p1c45d;
 *
 *                 --filtL5p1c11d;
 *
```

```
*                       --filtL6p1c0d;
*                       --filtL6p1c18d;
*                       --filtL6p1c31d;
*                       --filtL6p1c45d;
*
*                       --filtL7p1c8d;
*                       --filtL7p1c34d;
*                       --filtL7p1c45d;
*
*                       --filtL8p1c0d;
*                       --filtL8p1c14d;
*                       --filtL8p1c23d;
*                       --filtL8p1c45d;
*               matrix()
*/ include <stdio.h>
include <llama.h>
#include "morph.h"
#include "strelGlobals.h"

strelHTInits()
{
int         i, j;
short int   **matrix();

/*------------------------------------
 *      horizontal filters
 *-----------------------------------*/

/* pattern match for 2 cycles of halftone frequency 8 pix/cycle:
     *      10002000100020001 */
    filtH8p2c0d = (STREL *) calloc (1, sizeof (STREL));
    filtH8p2c0d->nx = 17;
    filtH8p2c0d->ny = 1;
    filtH8p2c0d->cx = 8;   /* center at center pixel */
    filtH8p2c0d->cy = 0;
    filtH8p2c0d->data = matrix(filtH8p2c0d->nx, filtH8p2c0d->ny);
    filtH8p2c0d->data[0][0] = 1;
    filtH8p2c0d->data[0][4] = 2;
    filtH8p2c0d->data[0][8] = 1;
    filtH8p2c0d->data[0][12] = 2;
    filtH8p2c0d->data[0][16] = 1;

/* pattern match for 3 cycles of halftone frequency 8 pix/cycle:
     *      1000200010002000100020001 */
    filtH8p3c0d = (STREL *) calloc (1, sizeof (STREL));
    filtH8p3c0d->nx = 25;
    filtH8p3c0d->ny = 1;
    filtH8p3c0d->cx = 12;  /* center at center pixel */
    filtH8p3c0d->cy = 0;
    filtH8p3c0d->data = matrix(filtH8p3c0d->nx, filtH8p3c0d->ny);
    filtH8p3c0d->data[0][0] = 1;
    filtH8p3c0d->data[0][4] = 2;
    filtH8p3c0d->data[0][8] = 1;
    filtH8p3c0d->data[0][12] = 2;
    filtH8p3c0d->data[0][16] = 1;
    filtH8p3c0d->data[0][20] = 2;
    filtH8p3c0d->data[0][24] = 1;

/*************************************
```

```
*       3 cycles in 2-d
************************************/
        /* pattern match for 3 cycles in 2 dimensions of halftone frequency
         *      8 pix/cycle:
         *      0000000000001000000000000
         *              0000000 (3)
         *      0000000000002000000000000
         *              0000000 (3)
         *      0000000000001000000000000
         *              0000000 (3)
         *      1000200010002000100020001
         *              0000000 (3)
         *      0000000000001000000000000
         *              0000000 (3)
         *      0000000000002000000000000
         *              0000000 (3)
         *      0000000000001000000000000     */
    filtC8p3c0d = (STREL *) calloc (1, sizeof (STREL));
    filtC8p3c0d->nx = 25;
    filtC8p3c0d->ny = 25;
    filtC8p3c0d->cx = 12;   /* center at center pixel */
    filtC8p3c0d->cy = 12;
    filtC8p3c0d->data = matrix(filtC8p3c0d->nx, filtC8p3c0d->ny);
    filtC8p3c0d->data[12][0] = 1;
    filtC8p3c0d->data[12][4] = 2;
    filtC8p3c0d->data[12][8] = 1;
    filtC8p3c0d->data[12][12] = 2;
    filtC8p3c0d->data[12][16] = 1;
    filtC8p3c0d->data[12][20] = 2;
    filtC8p3c0d->data[12][24] = 1;
    filtC8p3c0d->data[0][12] = 1;
    filtC8p3c0d->data[4][12] = 2;
    filtC8p3c0d->data[8][12] = 1;
    filtC8p3c0d->data[16][12] = 1;
    filtC8p3c0d->data[20][12] = 2;
    filtC8p3c0d->data[24][12] = 1;

/***************************************
 *      Solid 1 and 1.5-cycle filters
 ***************************************/
        /* pattern match for 1 cycle, 2-d solid filter, halftone frequency
         *      4 pix/cycle:
         *      10201
         *      00000
         *      20202
         *      00000
         *      10201   */
    filtS4p1c0d = (STREL *) calloc (1, sizeof (STREL));
    filtS4p1c0d->nx = 5;
    filtS4p1c0d->ny = 5;
    filtS4p1c0d->cx = 2;   /* center at center pixel */
    filtS4p1c0d->cy = 2;
    filtS4p1c0d->data = matrix(filtS4p1c0d->nx, filtS4p1c0d->ny);
    filtS4p1c0d->data[0][0] = 1;
    filtS4p1c0d->data[0][2] = 2;
    filtS4p1c0d->data[0][4] = 1;
    filtS4p1c0d->data[2][0] = 2;
    filtS4p1c0d->data[2][2] = 2;
    filtS4p1c0d->data[2][4] = 2;
```

```
filtS4plc0d->data[4][0] = 1;
filtS4plc0d->data[4][2] = 2;
filtS4plc0d->data[4][4] = 1;

/* pattern match for 1 cycle, 2-d solid filter, halftone frequency
     *  4 pix/cycle, inverted phase:
     *     20102
     *     00000
     *     10101
     *     00000
     *     20102    */
filtS4plc0dI = (STREL *) calloc (1, sizeof (STREL));
filtS4plc0dI->nx = 5;
filtS4plc0dI->ny = 5;
filtS4plc0dI->cx = 2;   /* center at center pixel */
filtS4plc0dI->cy = 2;
filtS4plc0dI->data = matrix(filtS4plc0dI->nx, filtS4plc0dI->ny);
filtS4plc0dI->data[0][0] = 2;
filtS4plc0dI->data[0][2] = 1;
filtS4plc0dI->data[0][4] = 2;
filtS4plc0dI->data[2][0] = 1;
filtS4plc0dI->data[2][2] = 1;
filtS4plc0dI->data[2][4] = 1;
filtS4plc0dI->data[4][0] = 2;
filtS4plc0dI->data[4][2] = 1;
filtS4plc0dI->data[4][4] = 2;

/* pattern match for 1 cycle, 2-d solid filter, halftone frequency
     *  6 pix/cycle:
     *     1002001
     *      00000 (2)
     *     2001002
     *      00000 (2)
     *     1002001   */
filtS6plc0d = (STREL *) calloc (1, sizeof (STREL));
filtS6plc0d->nx = 7;
filtS6plc0d->ny = 7;
filtS6plc0d->cx = 3;   /* center at center pixel */
filtS6plc0d->cy = 3;
filtS6plc0d->data = matrix(filtS6plc0d->nx, filtS6plc0d->ny);
filtS6plc0d->data[0][0] = 1;
filtS6plc0d->data[0][3] = 2;
filtS6plc0d->data[0][6] = 1;
filtS6plc0d->data[3][0] = 2;
filtS6plc0d->data[3][3] = 1;
filtS6plc0d->data[3][6] = 2;
filtS6plc0d->data[6][0] = 1;
filtS6plc0d->data[6][3] = 2;
filtS6plc0d->data[6][6] = 1;

/* pattern match for 1 cycle, 2-d solid filter, halftone frequency
     *  8 pix/cycle:
     *     100020001
     *       00000 (3)
     *     200010002
     *       00000 (3)
     *     100020001   */
filtS8plc0d = (STREL *) calloc (1, sizeof (STREL));
filtS8plc0d->nx = 9;
filtS8plc0d->ny = 9;
```

```
filtS8p1c0d->cx = 4;    /* center at center pixel */
filtS8p1c0d->cy = 4;
filtS8p1c0d->data = matrix(filtS8p1c0d->nx, filtS8p1c0d->ny);
filtS8p1c0d->data[0][0] = 1;
filtS8p1c0d->data[0][4] = 2;
filtS8p1c0d->data[0][8] = 1;
filtS8p1c0d->data[4][0] = 2;
filtS8p1c0d->data[4][4] = 1;
filtS8p1c0d->data[4][8] = 2;
filtS8p1c0d->data[8][0] = 1;
filtS8p1c0d->data[8][4] = 2;
filtS8p1c0d->data[8][8] = 1;

/* pattern match for 1.5 cycles, 2-d solid filter, halftone frequency
     *  8 pix/cycle:
     *     2000100020001
     *         00000 (3)
     *     1000200010002
     *         00000 (3)
     *     2000100020001
     *         00000 (3)
     *     1000200010002    */
filtS8p15c0d = (STREL *) calloc (1, sizeof (STREL));
filtS8p15c0d->nx = 13;
filtS8p15c0d->ny = 13;
filtS8p15c0d->cx = 6;    /* center at center pixel */
filtS8p15c0d->cy = 6;
filtS8p15c0d->data = matrix(filtS8p15c0d->nx, filtS8p15c0d->ny);
filtS8p15c0d->data[0][0] = 0;
filtS8p15c0d->data[0][4] = 1;
filtS8p15c0d->data[0][8] = 2;
filtS8p15c0d->data[0][12] = 0;
filtS8p15c0d->data[4][0] = 1;
filtS8p15c0d->data[4][4] = 2;
filtS8p15c0d->data[4][8] = 1;
filtS8p15c0d->data[4][12] = 2;
filtS8p15c0d->data[8][0] = 2;
filtS8p15c0d->data[8][4] = 1;
filtS8p15c0d->data[8][8] = 2;
filtS8p15c0d->data[8][12] = 1;
filtS8p15c0d->data[12][0] = 0;
filtS8p15c0d->data[12][4] = 2;
filtS8p15c0d->data[12][8] = 1;
filtS8p15c0d->data[12][12] = 0;

/***************************************
 *    Cruciform 2-cycle filters
 ***************************************/
    /* pattern match for 2 cycles in 2 dimensions of halftone frequency
     *  4 pix/cycle:
     *     000010000
     *     000000000
     *     000020000
     *     000000000
     *     102010201
     *     000000000
     *     000020000
     *     000000000
```

```
 *    000010000   */
filtC4p2c0d = (STREL *) calloc (1, sizeof (STREL));
filtC4p2c0d->nx = 9;
filtC4p2c0d->ny = 9;
filtC4p2c0d->cx = 4;   /* center at center pixel */
filtC4p2c0d->cy = 4;
filtC4p2c0d->data = matrix(filtC4p2c0d->nx, filtC4p2c0d->ny);
filtC4p2c0d->data[4][0] = 1;
filtC4p2c0d->data[4][2] = 2;
filtC4p2c0d->data[4][4] = 1;
filtC4p2c0d->data[4][6] = 2;
filtC4p2c0d->data[4][8] = 1;
filtC4p2c0d->data[0][4] = 1;
filtC4p2c0d->data[2][4] = 2;
filtC4p2c0d->data[6][4] = 2;
filtC4p2c0d->data[8][4] = 1;

/* pattern match for 2 cycles in 2 dimensions of halftone frequency
     *  4 pix/cycle; inverted phase:
     *    000020000
     *    000000000
     *    000010000
     *    000000000
     *    201020102
     *    000000000
     *    000010000
     *    000000000
     *    000020000   */
filtC4p2c0dI = (STREL *) calloc (1, sizeof (STREL));
filtC4p2c0dI->nx = 9;
filtC4p2c0dI->ny = 9;
filtC4p2c0dI->cx = 4;   /* center at center pixel */
filtC4p2c0dI->cy = 4;
filtC4p2c0dI->data = matrix(filtC4p2c0dI->nx, filtC4p2c0dI->ny);
filtC4p2c0dI->data[4][0] = 2;
filtC4p2c0dI->data[4][2] = 1;
filtC4p2c0dI->data[4][4] = 2;
filtC4p2c0dI->data[4][6] = 1;
filtC4p2c0dI->data[4][8] = 2;
filtC4p2c0dI->data[0][4] = 2;
filtC4p2c0dI->data[2][4] = 1;
filtC4p2c0dI->data[6][4] = 1;
filtC4p2c0dI->data[8][4] = 2;

/* pattern match for 2 cycles in 2 dimensions of halftone frequency
     *  4 pix/cycle, 14-degree rotation:
     *    000100000
     *    000000000
     *    000200000
     *    000000201
     *    000010000
     *    102000000
     *    000002000
     *    000000000
     *    000001000   */
filtC4p2c14d = (STREL *) calloc (1, sizeof (STREL));
filtC4p2c14d->nx = 9;
filtC4p2c14d->ny = 9;
filtC4p2c14d->cx = 4;   /* center at center pixel */
filtC4p2c14d->cy = 4;
```

```c
filtC4p2c14d->data = matrix(filtC4p2c14d->nx, filtC4p2c14d->ny);
filtC4p2c14d->data[0][3] = 1;
filtC4p2c14d->data[2][3] = 2;
filtC4p2c14d->data[3][6] = 2;
filtC4p2c14d->data[3][8] = 1;
filtC4p2c14d->data[4][4] = 1;
filtC4p2c14d->data[5][0] = 1;
filtC4p2c14d->data[5][2] = 2;
filtC4p2c14d->data[6][5] = 2;
filtC4p2c14d->data[8][5] = 1;

/* pattern match for 2 cycles in 2 dimensions of halftone frequency
     *  4 pix/cycle, 27-degree rotation:
     *     001000000
     *     000000000
     *     000200001
     *     000000200
     *     000010000
     *     002000000
     *     100002000
     *     000000000
     *     000000100   */
filtC4p2c27d = (STREL *) calloc (1, sizeof (STREL));
filtC4p2c27d->nx = 9;
filtC4p2c27d->ny = 9;
filtC4p2c27d->cx = 4;   /* center at center pixel */
filtC4p2c27d->cy = 4;
filtC4p2c27d->data = matrix(filtC4p2c27d->nx, filtC4p2c27d->ny);
filtC4p2c27d->data[2][0] = 1;
filtC4p2c27d->data[3][2] = 2;
filtC4p2c27d->data[4][4] = 1;
filtC4p2c27d->data[5][6] = 2;
filtC4p2c27d->data[6][8] = 1;
filtC4p2c27d->data[0][6] = 1;
filtC4p2c27d->data[2][5] = 2;
filtC4p2c27d->data[6][3] = 2;
filtC4p2c27d->data[8][2] = 1;

/* pattern match for 2 cycles in 2 dimensions of halftone frequency
     *  4 pix/cycle, 27-degree rotation, inverted phase:
     *     002000000
     *     000000000
     *     000100002
     *     000000100
     *     000020000
     *     001000000
     *     200001000
     *     000000000
     *     000000200   */
filtC4p2c27dI = (STREL *) calloc (1, sizeof (STREL));
filtC4p2c27dI->nx = 9;
filtC4p2c27dI->ny = 9;
filtC4p2c27dI->cx = 4;   /* center at center pixel */
filtC4p2c27dI->cy = 4;
filtC4p2c27dI->data = matrix(filtC4p2c27dI->nx, filtC4p2c27dI->ny);
filtC4p2c27dI->data[2][0] = 2;
filtC4p2c27dI->data[3][2] = 1;
filtC4p2c27dI->data[4][4] = 2;
filtC4p2c27dI->data[5][6] = 1;
filtC4p2c27dI->data[6][8] = 2;
```

```
filtC4p2c27dI->data[0][6] = 2;
filtC4p2c27dI->data[2][5] = 1;
filtC4p2c27dI->data[6][3] = 1;
filtC4p2c27dI->data[8][2] = 2;

/* pattern match for 2 cycles in 2 dimensions of halftone frequency
     *  4 pix/cycle, 45-degree rotation:
     *     1000001
     *     0020000
     *     0000020
     *     0001000
     *     0200000
     *     0000200
     *     1000001   */
filtC4p2c45d = (STREL *) calloc (1, sizeof (STREL));
filtC4p2c45d->nx = 7;
filtC4p2c45d->ny = 7;
filtC4p2c45d->cx = 3;   /* center at center pixel */
filtC4p2c45d->cy = 3;
filtC4p2c45d->data = matrix(filtC4p2c45d->nx, filtC4p2c45d->ny);
filtC4p2c45d->data[0][0] = 1;
filtC4p2c45d->data[0][6] = 1;
filtC4p2c45d->data[1][2] = 2;
filtC4p2c45d->data[2][5] = 2;
filtC4p2c45d->data[3][3] = 1;
filtC4p2c45d->data[4][1] = 2;
filtC4p2c45d->data[5][4] = 2;
filtC4p2c45d->data[6][0] = 1;
filtC4p2c45d->data[6][6] = 1;

/* pattern match for 2 cycles in 2 dimensions of halftone frequency
     *  5 pix/cycle:
     *     00000100000
     *     00000000000
     *     00000200000
     *     00000000000
     *     00000000000
     *     10200102001
     *     00000000000
     *     00000200000
     *     00000000000
     *     00000000000
     *     00000100000   */
filtC5p2c0d = (STREL *) calloc (1, sizeof (STREL));
filtC5p2c0d->nx = 11;
filtC5p2c0d->ny = 11;
filtC5p2c0d->cx = 5;   /* center at center pixel */
filtC5p2c0d->cy = 5;
filtC5p2c0d->data = matrix(filtC5p2c0d->nx, filtC5p2c0d->ny);
filtC5p2c0d->data[5][0] = 1;
filtC5p2c0d->data[5][2] = 2;
filtC5p2c0d->data[5][5] = 1;
filtC5p2c0d->data[5][7] = 2;
filtC5p2c0d->data[5][10] = 1;
filtC5p2c0d->data[0][5] = 1;
filtC5p2c0d->data[2][5] = 2;
filtC5p2c0d->data[7][5] = 2;
filtC5p2c0d->data[10][5] = 1;

/* pattern match for 2 cycles in 2 dimensions of halftone frequency
```

```
/* 5 pix/cycle, 22-degree rotation:
 *     00010000000
 *     00000000000
 *     00002000000
 *     00000000001
 *     00000000200
 *     00000100000
 *     00200000000
 *     10000000000
 *     00000020000
 *     00000000000
 *     00000001000   */
filtC5p2c22d = (STREL *) calloc (1, sizeof (STREL));
filtC5p2c22d->nx = 11;
filtC5p2c22d->ny = 11;
filtC5p2c22d->cx = 5;   /* center at center pixel */
filtC5p2c22d->cy = 5;
filtC5p2c22d->data = matrix(filtC5p2c22d->nx, filtC5p2c22d->ny);
filtC5p2c22d->data[0][3] = 1;
filtC5p2c22d->data[2][4] = 2;
filtC5p2c22d->data[3][10] = 1;
filtC5p2c22d->data[4][8] = 2;
filtC5p2c22d->data[5][5] = 1;
filtC5p2c22d->data[6][2] = 2;
filtC5p2c22d->data[7][0] = 1;
filtC5p2c22d->data[8][6] = 2;
filtC5p2c22d->data[10][7] = 1;

/* pattern match for 2 cycles in 2 dimensions of halftone frequency
 * 5 pix/cycle, 37-degree rotation:
 *     010000000
 *     000000001
 *     002000200
 *     000000000
 *     000010000
 *     000000000
 *     002000200
 *     100000000
 *     000000010    */
filtC5p2c37d = (STREL *) calloc (1, sizeof (STREL));
filtC5p2c37d->nx = 9;
filtC5p2c37d->ny = 9;
filtC5p2c37d->cx = 4;   /* center at center pixel */
filtC5p2c37d->cy = 4;
filtC5p2c37d->data = matrix(filtC5p2c37d->nx, filtC5p2c37d->ny);
filtC5p2c37d->data[0][1] = 1;
filtC5p2c37d->data[1][8] = 1;
filtC5p2c37d->data[2][2] = 2;
filtC5p2c37d->data[2][6] = 2;
filtC5p2c37d->data[4][4] = 1;
filtC5p2c37d->data[6][2] = 2;
filtC5p2c37d->data[6][6] = 2;
filtC5p2c37d->data[7][0] = 1;
filtC5p2c37d->data[8][7] = 1;

/* pattern match for 2 cycles in 2 dimensions of halftone frequency
 * 6 pix/cycle:
 *     0000001000000
 *         00000 (2)
 *     0000002000000
```

```
    *       00000 (2)
    *       1002001002001
    *       00000 (2)
    *       0000002000000
    *       00000 (2)
    *       0000001000000   */
filtC6p2c0d = (STREL *) calloc (1, sizeof (STREL));
filtC6p2c0d->nx = 13;
filtC6p2c0d->ny = 13;
filtC6p2c0d->cx = 6;   /* center at center pixel */
filtC6p2c0d->cy = 6;
filtC6p2c0d->data = matrix(filtC6p2c0d->nx, filtC6p2c0d->ny);
filtC6p2c0d->data[6][0] = 1;
filtC6p2c0d->data[6][3] = 2;
filtC6p2c0d->data[6][6] = 1;
filtC6p2c0d->data[6][9] = 2;
filtC6p2c0d->data[6][12] = 1;
filtC6p2c0d->data[0][6] = 1;
filtC6p2c0d->data[3][6] = 2;
filtC6p2c0d->data[9][6] = 2;
filtC6p2c0d->data[12][6] = 1;

/* pattern match for 2 cycles in 2 dimensions of halftone frequency
     * 6 pix/cycle, 18-degree rotation:
     *      0000100000000
     *      0000000000000
     *      0000000000000
     *      0000020000000
     *      0000000000001
     *      0000000002000
     *      0000001000000
     *      0002000000000
     *      1000000000000
     *      0000000200000
     *      0000000000000
     *      0000000000000
     *      0000000010000   */
filtC6p2c18d = (STREL *) calloc (1, sizeof (STREL));
filtC6p2c18d->nx = 13;
filtC6p2c18d->ny = 13;
filtC6p2c18d->cx = 6;   /* center at center pixel */
filtC6p2c18d->cy = 6;
filtC6p2c18d->data = matrix(filtC6p2c18d->nx, filtC6p2c18d->ny);
filtC6p2c18d->data[0][4] = 1;
filtC6p2c18d->data[3][5] = 2;
filtC6p2c18d->data[4][12] = 1;
filtC6p2c18d->data[5][9] = 2;
filtC6p2c18d->data[6][6] = 1;
filtC6p2c18d->data[7][3] = 2;
filtC6p2c18d->data[8][0] = 1;
filtC6p2c18d->data[9][7] = 2;
filtC6p2c18d->data[12][8] = 1;

/* pattern match for 2 cycles in 2 dimensions of halftone frequency
     * 6 pix/cycle, 31-degree rotation:
     *      00100000000
     *      00000000000
     *      00002000001
     *      00000000000
     *      00000000200
```

```
*     00000100000
*     00200000000
*     00000000000
*     10000020000
*     00000000000
*     00000000100  */
filtC6p2c31d = (STREL *) calloc (1, sizeof (STREL));
filtC6p2c31d->nx = 11;
filtC6p2c31d->ny = 11;
filtC6p2c31d->cx = 5;   /* center at center pixel */
filtC6p2c31d->cy = 5;
filtC6p2c31d->data = matrix(filtC6p2c31d->nx, filtC6p2c31d->ny);
filtC6p2c31d->data[0][2] = 1;
filtC6p2c31d->data[2][4] = 2;
filtC6p2c31d->data[2][10] = 1;
filtC6p2c31d->data[4][8] = 2;
filtC6p2c31d->data[5][5] = 1;
filtC6p2c31d->data[6][2] = 2;
filtC6p2c31d->data[8][0] = 1;
filtC6p2c31d->data[8][6] = 2;
filtC6p2c31d->data[10][8] = 1;

/* pattern match for 2 cycles in 2 dimensions of halftone frequency
     * 6 pix/cycle, 45-degree rotation:
     *     100000001
     *     000000000
     *     002000200
     *     000000000
     *     000010000
     *     000000000
     *     002000200
     *     000000000
     *     100000001    */
filtC6p2c45d = (STREL *) calloc (1, sizeof (STREL));
filtC6p2c45d->nx = 9;
filtC6p2c45d->ny = 9;
filtC6p2c45d->cx = 4;   /* center at center pixel */
filtC6p2c45d->cy = 4;
filtC6p2c45d->data = matrix(filtC6p2c45d->nx, filtC6p2c45d->ny);
filtC6p2c45d->data[0][0] = 1;
filtC6p2c45d->data[0][8] = 1;
filtC6p2c45d->data[2][2] = 2;
filtC6p2c45d->data[2][6] = 2;
filtC6p2c45d->data[4][4] = 1;
filtC6p2c45d->data[6][2] = 2;
filtC6p2c45d->data[6][6] = 2;
filtC6p2c45d->data[8][0] = 1;
filtC6p2c45d->data[8][8] = 1;

/* pattern match for 2 cycles in 2 dimensions of halftone frequency
     * 7 pix/cycle:
     *     000000010000000
     *         00000 (2)
     *     000000020000000
     *         00000 (3)
     *     100200010020001
     *         00000 (2)
     *     000000020000000
     *         00000 (3)
     *     000000010000000    */
```

```
filtC7p2c0d = (STREL *) calloc (1, sizeof (STREL));
filtC7p2c0d->nx = 15;
filtC7p2c0d->ny = 15;
filtC7p2c0d->cx = 7;  /* center at center pixel */
filtC7p2c0d->cy = 7;
filtC7p2c0d->data = matrix(filtC7p2c0d->nx, filtC7p2c0d->ny);
filtC7p2c0d->data[7][0] = 1;
filtC7p2c0d->data[7][3] = 2;
filtC7p2c0d->data[7][7] = 1;
filtC7p2c0d->data[7][10] = 2;
filtC7p2c0d->data[7][14] = 1;
filtC7p2c0d->data[0][7] = 1;
filtC7p2c0d->data[3][7] = 2;
filtC7p2c0d->data[10][7] = 2;
filtC7p2c0d->data[14][7] = 1;

/* pattern match for 2 cycles in 2 dimensions of halftone frequency
     *   7 pix/cycle at 27-degrees rotation:
     *     0001000000000
     *     0000000000000
     *     0000000000000
     *     0000020000001
     *     0000000000000
     *     0000000002000
     *     0000001000000
     *     0002000000000
     *     0000000000000
     *     1000000200000
     *     0000000000000
     *     0000000000000
     *     0000000001000   */
filtC7p2c27d = (STREL *) calloc (1, sizeof (STREL));
filtC7p2c27d->nx = 13;
filtC7p2c27d->ny = 13;
filtC7p2c27d->cx = 6;  /* center at center pixel */
filtC7p2c27d->cy = 6;
filtC7p2c27d->data = matrix(filtC7p2c27d->nx, filtC7p2c27d->ny);
filtC7p2c27d->data[0][3] = 1;
filtC7p2c27d->data[3][5] = 2;
filtC7p2c27d->data[3][12] = 1;
filtC7p2c27d->data[5][9] = 2;
filtC7p2c27d->data[6][6] = 1;
filtC7p2c27d->data[7][3] = 2;
filtC7p2c27d->data[9][0] = 1;
filtC7p2c27d->data[9][7] = 2;
filtC7p2c27d->data[12][9] = 1;

/* pattern match for 2 cycles in 2 dimensions of halftone frequency
     *   7 pix/cycle at 34-degrees rotation:
     *     0010000000000
     *     0000000000000
     *     0000000000001
     *     0000200000000
     *     0000000002000
     *     0000000000000
     *     0000001000000
     *     0000000000000
     *     0002000000000
     *     0000000020000
     *     1000000000000
```

```
*       0000000000000
*       0000000000100  */
filtC7p2c34d = (STREL *) calloc (1, sizeof (STREL));
filtC7p2c34d->nx = 13;
filtC7p2c34d->ny = 13;
filtC7p2c34d->cx = 6;   /* center at center pixel */
filtC7p2c34d->cy = 6;
filtC7p2c34d->data = matrix(filtC7p2c34d->nx, filtC7p2c34d->ny);
filtC7p2c34d->data[0][2] = 1;
filtC7p2c34d->data[2][12] = 1;
filtC7p2c34d->data[3][4] = 2;
filtC7p2c34d->data[4][9] = 2;
filtC7p2c34d->data[6][6] = 1;
filtC7p2c34d->data[8][3] = 2;
filtC7p2c34d->data[9][8] = 2;
filtC7p2c34d->data[10][0] = 1;
filtC7p2c34d->data[12][10] = 1;

/* pattern match for 2 cycles in 2 dimensions of halftone frequency
     *   7 pix/cycle, 45-degree rotation:
     *     10000000001
     *     00000000000
     *     00020000000
     *     00000000200
     *     00000000000
     *     00000100000
     *     00000000000
     *     00200000000
     *     000000020uu
     *     00000000000
     *     10000000001  */
filtC7p2c45d = (STREL *) calloc (1, sizeof (STREL));
filtC7p2c45d->nx = 11;
filtC7p2c45d->ny = 11;
filtC7p2c45d->cx = 5;   /* center at center pixel */
filtC7p2c45d->cy = 5;
filtC7p2c45d->data = matrix(filtC7p2c45d->nx, filtC7p2c45d->ny);
filtC7p2c45d->data[0][0] = 1;
filtC7p2c45d->data[0][10] = 1;
filtC7p2c45d->data[2][3] = 2;
filtC7p2c45d->data[3][8] = 2;
filtC7p2c45d->data[5][5] = 1;
filtC7p2c45d->data[7][2] = 2;
filtC7p2c45d->data[8][7] = 2;
filtC7p2c45d->data[10][0] = 1;
filtC7p2c45d->data[10][10] = 1;

/* pattern match for 2 cycles in 2 dimensions of halftone frequency
     *   8 pix/cycle:              (0-degree, normal cruciform)
     *     00000000100000000
     *         000000 (3)
     *     00000000200000000
     *         000000 (3)
     *     10002000100020001
     *         000000 (3)
     *     00000000200000000
     *         000000 (3)
     *     00000000100000000    */
filtC8p2c0d = (STREL *) calloc (1, sizeof (STREL));
filtC8p2c0d->nx = 17;
```

```
filtC8p2c0d->ny = 17;
filtC8p2c0d->cx = 8;   /* center at center pixel */
filtC8p2c0d->cy = 8;
filtC8p2c0d->data = matrix(filtC8p2c0d->nx, filtC8p2c0d->ny);
filtC8p2c0d->data[8][0] = 1;
filtC8p2c0d->data[8][4] = 2;
filtC8p2c0d->data[8][8] = 1;
filtC8p2c0d->data[8][12] = 2;
filtC8p2c0d->data[8][16] = 1;
filtC8p2c0d->data[0][8] = 1;
filtC8p2c0d->data[4][8] = 2;
filtC8p2c0d->data[12][8] = 2;
filtC8p2c0d->data[16][8] = 1;

/* pattern match for 2 cycles in 2 dimensions of halftone frequency
     * 8 pix/cycle:                    (23-degree, rotated cruciform)
     *    000010000000000
     *    000000000000000
     *    000000000000000
     *    000000000000000
     *    000000200000001
     *    000000000000000
     *    000000000020000
     *    000000010000000
     *    000020000000000
     *    000000000000000
     *    100000002000000
     *    000000000000000
     *    000000000000000
     *    000000000000000
     *    000000000010000   */
filtC8p2c23d = (STREL *) calloc (1, sizeof (STREL));
filtC8p2c23d->nx = 15;
filtC8p2c23d->ny = 15;
filtC8p2c23d->cx = 7;   /* center at center pixel */
filtC8p2c23d->cy = 7;
filtC8p2c23d->data = matrix(filtC8p2c23d->nx, filtC8p2c23d->ny);
filtC8p2c23d->data[0][4] = 1;
filtC8p2c23d->data[4][6] = 2;
filtC8p2c23d->data[4][14] = 1;
filtC8p2c23d->data[6][10] = 2;
filtC8p2c23d->data[7][7] = 1;
filtC8p2c23d->data[8][4] = 2;
filtC8p2c23d->data[10][0] = 1;
filtC8p2c23d->data[10][8] = 2;
filtC8p2c23d->data[14][10] = 1;

/* pattern match for 2 cycles in 2 dimensions of halftone frequency
     * 8 pix/cycle:                    (30-degree, rotated cruciform)
     *    000100000000000
     *    000000000000000
     *    000000000000000
     *    000002000000001
     *    000000000000000
     *    000000000002000
     *    000000000000000
     *    000000010000000
     *    000000000000000
     *    000200000000000
     *    000000000000000
```

```
*       100000000200000
*       000000000000000
*       000000000000000
*       000000000001000      */
filtC8p2c30d = (STREL *) calloc (1, sizeof (STREL));
filtC8p2c30d->nx = 15;
filtC8p2c30d->ny = 15;
filtC8p2c30d->cx = 7;   /* center at center pixel */
filtC8p2c30d->cy = 7;
filtC8p2c30d->data = matrix(filtC8p2c30d->nx, filtC8p2c30d->ny);
filtC8p2c30d->data[0][3] = 1;
filtC8p2c30d->data[3][5] = 2;
filtC8p2c30d->data[3][14] = 1;
filtC8p2c30d->data[5][11] = 2;
filtC8p2c30d->data[7][7] = 1;
filtC8p2c30d->data[9][3] = 2;
filtC8p2c30d->data[11][0] = 1;
filtC8p2c30d->data[11][9] = 2;
filtC8p2c30d->data[14][11] = 1;

/* pattern match for 2 cycles in 2 dimensions of halftone frequency
 *  8 pix/cycle at 45-degrees rotation:
 *      1000000000001
 *      0000000000000
 *      0000000000000
 *      0002000002000
 *      0000000000000
 *      0000000000000
 *      0000001000000
 *      0000000000000
 *      0000000000000
 *      0002000002000
 *      0000000000000
 *      0000000000000
 *      1000000000001   */
filtC8p2c45d = (STREL *) calloc (1, sizeof (STREL));
filtC8p2c45d->nx = 13;
filtC8p2c45d->ny = 13;
filtC8p2c45d->cx = 6;   /* center at center pixel */
filtC8p2c45d->cy = 6;
filtC8p2c45d->data = matrix(filtC8p2c45d->nx, filtC8p2c45d->ny);
filtC8p2c45d->data[0][0] = 1;
filtC8p2c45d->data[0][12] = 1;
filtC8p2c45d->data[3][3] = 2;
filtC8p2c45d->data[3][9] = 2;
filtC8p2c45d->data[6][6] = 1;
filtC8p2c45d->data[9][3] = 2;
filtC8p2c45d->data[9][9] = 2;
filtC8p2c45d->data[12][0] = 1;
filtC8p2c45d->data[12][12] = 1;

/* pattern match for 1 cycle in 2 dimensions at 8 pix/cycle
 * with 30-degree, rotated cruciform:
 *      002000000
 *      0
 *      000000002
 *      0
 *      000010000
 *      0
 *      200000000
```

```
 *       0
 *       000000200     */
filtC8plc30d = (STREL *) calloc (1, sizeof (STREL));
filtC8plc30d->nx = 9;
filtC8plc30d->ny = 9;
filtC8plc30d->cx = 4;   /* center at center pixel */
filtC8plc30d->cy = 4;
filtC8plc30d->data = matrix(filtC8plc30d->nx, filtC8plc30d->ny);
filtC8plc30d->data[0][2] = 2;
filtC8plc30d->data[4][4] = 1;
filtC8plc30d->data[8][6] = 2;
filtC8plc30d->data[6][0] = 2;
filtC8plc30d->data[2][8] = 2;

/****************************
 *   wide bandpass 2-d filters
 ****************************/
    /* pattern match for 1 cycle, wideBP, halftone frequency 3 pix/cycle,
     *                  rotation 18 degrees.
     *     00010
     *     10000
     *     00200
     *     00001
     *     01000   */
filtL3plc18d = (STREL *) calloc (1, sizeof (STREL));
filtL3plc18d->nx = 5;
filtL3plc18d->ny = 5;
filtL3plc18d->cx = 2;   /* center pixel */
filtL3plc18d->cy = 2;
filtL3plc18d->data = matrix(filtL3plc18d->nx, filtL3plc18d->ny);
filtL3plc18d->data[0][3] = 1;
filtL3plc18d->data[1][0] = 1;
filtL3plc18d->data[2][2] = 2;
filtL3plc18d->data[3][4] = 1;
filtL3plc18d->data[4][1] = 1;

/* pattern match for 1 cycle, wideBP, halftone frequency 3 pix/cycle,
     *                  rotation 45 degrees.
     *     00100
     *     00000
     *     10201
     *     00000
     *     00100   */
filtL3plc45d = (STREL *) calloc (1, sizeof (STREL));
filtL3plc45d->nx = 5;
filtL3plc45d->ny = 5;
filtL3plc45d->cx = 2;   /* center pixel */
filtL3plc45d->cy = 2;
filtL3plc45d->data = matrix(filtL3plc45d->nx, filtL3plc45d->ny);
filtL3plc45d->data[0][2] = 1;
filtL3plc45d->data[2][0] = 1;
filtL3plc45d->data[2][2] = 2;
filtL3plc45d->data[2][4] = 1;
filtL3plc45d->data[4][2] = 1;

/* pattern match for 1 cycle, wideBP, halftone frequency 4 pix/cycle,
     *                  rotation 0 degrees.
     *              Should also work well for 5 pix/cycle.
     *     10001
```

```
 *      00000
 *      00200
 *      00000
 *      10001   */
filtL4plc0d = (STREL *) calloc (1, sizeof (STREL));
filtL4plc0d->nx = 5;
filtL4plc0d->ny = 5;
filtL4plc0d->cx = 2;   /* center pixel */
filtL4plc0d->cy = 2;
filtL4plc0d->data = matrix(filtL4plc0d->nx, filtL4plc0d->ny);
filtL4plc0d->data[0][0] = 1;
filtL4plc0d->data[0][4] = 1;
filtL4plc0d->data[2][2] = 2;
filtL4plc0d->data[4][0] = 1;
filtL4plc0d->data[4][4] = 1;

/* pattern match for 1 cycle, wideBP, halftone frequency 4 pix/cycle,
     *              rotation 27 deg
     *      0000100
     *      0000000
     *      1000000
     *      0002000
     *      0000001
     *      0000000
     *      0010000   */
filtL4plc27d = (STREL *) calloc (1, sizeof (STREL));
filtL4plc27d->nx = 7;
filtL4plc27d->ny = 7;
filtL4plc27d->cx = 3;   /* center pixel */
filtL4plc27d->cy = 3;
filtL4plc27d->data = matrix(filtL4plc27d->nx, filtL4plc27d->ny);
filtL4plc27d->data[0][4] = 1;
filtL4plc27d->data[2][0] = 1;
filtL4plc27d->data[3][3] = 2;
filtL4plc27d->data[4][6] = 1;
filtL4plc27d->data[6][2] = 1;

/* pattern match for 1 cycle, wideBP, halftone frequency 4 pix/cycle,
     *              rotation 45 degrees
     *              Should also work well for 5 pix/cycle.
     *      0001000
     *      0000000
     *      0000000
     *      1002001
     *      0000000
     *      0000000
     *      0001000   */
filtL4plc45d = (STREL *) calloc (1, sizeof (STREL));
filtL4plc45d->nx = 7;
filtL4plc45d->ny = 7;
filtL4plc45d->cx = 3;   /* center pixel */
filtL4plc45d->cy = 3;
filtL4plc45d->data = matrix(filtL4plc45d->nx, filtL4plc45d->ny);
filtL4plc45d->data[0][3] = 1;
filtL4plc45d->data[3][0] = 1;
filtL4plc45d->data[3][3] = 2;
filtL4plc45d->data[3][6] = 1;
filtL4plc45d->data[6][3] = 1;

/* pattern match for 1 cycle, wideBP, halftone frequency 5 pix/cycle,
```

```
/*              rotation 11 deg
 *      0000010
 *      1000000
 *      0000000
 *      0002000
 *      0000000
 *      0000001
 *      0100000  */
filtL5plc11d = (STREL *) calloc (1, sizeof (STREL));
filtL5plc11d->nx = 7;
filtL5plc11d->ny = 7;
filtL5plc11d->cx = 3;   /* center pixel */
filtL5plc11d->cy = 3;
filtL5plc11d->data = matrix(filtL5plc11d->nx, filtL5plc11d->ny);
filtL5plc11d->data[0][5] = 1;
filtL5plc11d->data[1][0] = 1;
filtL5plc11d->data[3][3] = 2;
filtL5plc11d->data[5][6] = 1;
filtL5plc11d->data[6][1] = 1;

/* pattern match for 1 cycle, wideBP, halftone frequency 6 pix/cycle,
 *              rotation 0 degrees
 *              Should also work well for 5 and 7 pix/cycle.
 *      1000001
 *      0000000
 *      0000000
 *      0002000
 *      0000000
 *      0000000
 *      1000001  */
filtL6plc0d = (STREL *) calloc (1, sizeof (STREL));
filtL6plc0d->nx = 7;
filtL6plc0d->ny = 7;
filtL6plc0d->cx = 3;   /* center pixel */
filtL6plc0d->cy = 3;
filtL6plc0d->data = matrix(filtL6plc0d->nx, filtL6plc0d->ny);
filtL6plc0d->data[0][0] = 1;
filtL6plc0d->data[0][6] = 1;
filtL6plc0d->data[3][3] = 2;
filtL6plc0d->data[6][0] = 1;
filtL6plc0d->data[6][6] = 1;

/* pattern match for 1 cycle, wideBP, halftone frequency 6 pix/cycle,
 *              rotation 18 degrees
 *      000000100
 *      000000000
 *      100000000
 *      000000000
 *      000020000
 *      000000000
 *      000000001
 *      000000000
 *      001000000  */
filtL6plc18d = (STREL *) calloc (1, sizeof (STREL));
filtL6plc18d->nx = 9;
filtL6plc18d->ny = 9;
filtL6plc18d->cx = 4;   /* center pixel */
filtL6plc18d->cy = 4;
filtL6plc18d->data = matrix(filtL6plc18d->nx, filtL6plc18d->ny);
filtL6plc18d->data[0][6] = 1;
```

```
filtL6plc18d->data[2][0] = 1;
filtL6plc18d->data[4][4] = 2;
filtL6plc18d->data[6][8] = 1;
filtL6plc18d->data[8][2] = 1;

/* pattern match for 1 cycle, wideBP, halftone frequency 6 pix/cycle,
     *                  rotation 31 degrees
     *      000001000
     *      000000000
     *      000000000
     *      100000000
     *      000020000
     *      000000001
     *      000000000
     *      000000000
     *      000100000   */
filtL6plc31d = (STREL *) calloc (1, sizeof (STREL));
filtL6plc31d->nx = 9;
filtL6plc31d->ny = 9;
filtL6plc31d->cx = 4;    /* center pixel */
filtL6plc31d->cy = 4;
filtL6plc31d->data = matrix(filtL6plc31d->nx, filtL6plc31d->ny);
filtL6plc31d->data[0][5] = 1;
filtL6plc31d->data[3][0] = 1;
filtL6plc31d->data[4][4] = 2;
filtL6plc31d->data[5][8] = 1;
filtL6plc31d->data[8][3] = 1;

/* pattern match for 1 cycle, wideBP, halftone frequency 6 pix/cycle,
     *                  rotation 45 degrees
     *      000010000
     *      000000000
     *      000000000
     *      000000000
     *      100020001
     *      000000000
     *      000000000
     *      000000000
     *      000010000   */
filtL6plc45d = (STREL *) calloc (1, sizeof (STREL));
filtL6plc45d->nx = 9;
filtL6plc45d->ny = 9;
filtL6plc45d->cx = 4;    /* center pixel */
filtL6plc45d->cy = 4;
filtL6plc45d->data = matrix(filtL6plc45d->nx, filtL6plc45d->ny);
filtL6plc45d->data[0][4] = 1;
filtL6plc45d->data[4][0] = 1;
filtL6plc45d->data[4][4] = 2;
filtL6plc45d->data[4][8] = 1;
filtL6plc45d->data[8][4] = 1;

/* pattern match for 1 cycle, wideBP, halftone frequency 7 pix/cycle,
     *                  rotation 8 degrees
     *      000000010
     *      100000000
     *      000000000
     *      000000000
     *      000020000
     *      000000000
     *      000000000
```

```
*       000000001
*       010000000  */
filtL7plc8d = (STREL *) calloc (1, sizeof (STREL));
filtL7plc8d->nx = 9;
filtL7plc8d->ny = 9;
filtL7plc8d->cx = 4;   /* center pixel */
filtL7plc8d->cy = 4;
filtL7plc8d->data = matrix(filtL7plc8d->nx, filtL7plc8d->ny);
filtL7plc8d->data[0][7] = 1;
filtL7plc8d->data[1][0] = 1;
filtL7plc8d->data[4][4] = 2;
filtL7plc8d->data[7][8] = 1;
filtL7plc8d->data[8][1] = 1;

/* pattern match for 1 cycle, wideBP, halftone frequency 7 pix/cycle,
     *                 rotation 34 degrees
     *      00000010000
     *      00000000000
     *      00000000000
     *      00000000000
     *      10000000000
     *      00000200000
     *      00000000001
     *      00000000000
     *      00000000000
     *      00000000000
     *      00000100000  */
filtL7plc34d = (STREL *) calloc (1, sizeof (STREL));
filtL7plc34d->nx = 11;
filtL7plc34d->ny = 11;
filtL7plc34d->cx = 5;   /* center pixel */
filtL7plc34d->cy = 5;
filtL7plc34d->data = matrix(filtL7plc34d->nx, filtL7plc34d->ny);
filtL7plc34d->data[0][6] = 1;
filtL7plc34d->data[4][0] = 1;
filtL7plc34d->data[5][5] = 2;
filtL7plc34d->data[6][10] = 1;
filtL7plc34d->data[10][4] = 1;

/* pattern match for 1 cycle, wideBP, halftone frequency 7 pix/cycle,
     *                 rotation 45 degrees
     *      00000100000
     *          00000 (4)
     *      10000200001
     *          00000 (4)
     *      00000100000  */
filtL7plc45d = (STREL *) calloc (1, sizeof (STREL));
filtL7plc45d->nx = 11;
filtL7plc45d->ny = 11;
filtL7plc45d->cx = 5;   /* center pixel */
filtL7plc45d->cy = 5;
filtL7plc45d->data = matrix(filtL7plc45d->nx, filtL7plc45d->ny);
filtL7plc45d->data[0][5] = 1;
filtL7plc45d->data[5][0] = 1;
filtL7plc45d->data[5][5] = 2;
filtL7plc45d->data[5][10] = 1;
filtL7plc45d->data[10][5] = 1;

/* pattern match for 1 cycle, wideBP, halftone frequency 8 pix/cycle,
     *                 rotation 0 degrees.
```

```
       *     100000001
       *       00000 (3)
       *     000020000
       *       00000 (3)
       *     100000001    */
filtL8plc0d = (STREL *) calloc (1, sizeof (STREL));
filtL8plc0d->nx = 9;
filtL8plc0d->ny = 9;
filtL8plc0d->cx = 4;    /* center pixel */
filtL8plc0d->cy = 4;
filtL8plc0d->data = matrix(filtL8plc0d->nx, filtL8plc0d->ny);
filtL8plc0d->data[0][0] = 1;
filtL8plc0d->data[0][8] = 1;
filtL8plc0d->data[4][4] = 2;
filtL8plc0d->data[8][0] = 1;
filtL8plc0d->data[8][8] = 1;

/* pattern match for 1 cycle, wideBP, halftone frequency 8 pix/cycle,
     *                   rotation 14 degrees
     *     00000000100
     *     00000000000
     *     10000000000
     *     00000000000
     *     00000000000
     *     00000200000
     *     00000000000
     *     00000000000
     *     00000000001
     *     00000000000
     *     00100000000   */
filtL8plc14d = (STREL *) calloc (1, sizeof (STREL));
filtL8plc14d->nx = 11;
filtL8plc14d->ny = 11;
filtL8plc14d->cx = 5;    /* center pixel */
filtL8plc14d->cy = 5;
filtL8plc14d->data = matrix(filtL8plc14d->nx, filtL8plc14d->ny);
filtL8plc14d->data[0][8] = 1;
filtL8plc14d->data[2][0] = 1;
filtL8plc14d->data[5][5] = 2;
filtL8plc14d->data[8][10] = 1;
filtL8plc14d->data[10][2] = 1;

/* pattern match for 1 cycle, wideBP, halftone frequency 8 pix/cycle,
     *                   rotation 23 degrees.
     *     00000001000
     *     00000000000
     *     00000000000
     *     10000000000
     *     00000000000
     *     00000200000
     *     00000000000
     *     00000000001
     *     00000000000
     *     00000000000
     *     00010000000   */
filtL8plc23d = (STREL *) calloc (1, sizeof (STREL));
filtL8plc23d->nx = 11;
filtL8plc23d->ny = 11;
filtL8plc23d->cx = 5;    /* center pixel */
filtL8plc23d->cy = 5;
```

```
filtL8plc23d->data = matrix(filtL8plc23d->nx, filtL8plc23d->ny);
filtL8plc23d->data[0][7] = 1;
filtL8plc23d->data[3][0] = 1;
filtL8plc23d->data[5][5] = 2;
filtL8plc23d->data[7][10] = 1;
filtL8plc23d->data[10][3] = 1;

/* pattern match for 1 cycle, wideBP, halftone frequency 8 pix/cycle,
     *                      rotation 45 degrees.
     *      0000001000000
     *          000000 (5)
     *      1000002000001
     *          000000 (5)
     *      0000001000000   */
filtL8plc45d = (STREL *) calloc (1, sizeof (STREL));
filtL8plc45d->nx = 13;
filtL8plc45d->ny = 13;
filtL8plc45d->cx = 6;   /* center pixel */
filtL8plc45d->cy = 6;
filtL8plc45d->data = matrix(filtL8plc45d->nx, filtL8plc45d->ny);
filtL8plc45d->data[0][6] = 1;
filtL8plc45d->data[6][0] = 1;
filtL8plc45d->data[6][6] = 2;
filtL8plc45d->data[6][12] = 1;
filtL8plc45d->data[12][6] = 1;

HTLFiltArray = (STREL **) calloc (N_HTL_FILT, sizeof (STREL *));
HTLFiltArray[0] = filtL3plc18d;
HTLFiltArray[1] = filtL3plc45d;
HTLFiltArray[2] = filtL4plc0d;
HTLFiltArray[3] = filtL4plc27d;
HTLFiltArray[4] = filtL4plc45d;
HTLFiltArray[5] = filtL5plc11d;
HTLFiltArray[6] = filtL6plc0d;
HTLFiltArray[7] = filtL6plc18d;
HTLFiltArray[8] = filtL6plc31d;
HTLFiltArray[9] = filtL6plc45d;
HTLFiltArray[10] = filtL7plc8d;
HTLFiltArray[11] = filtL7plc34d;
HTLFiltArray[12] = filtL7plc45d;
HTLFiltArray[13] = filtL8plc0d;
HTLFiltArray[14] = filtL8plc14d;
HTLFiltArray[15] = filtL8plc23d;
HTLFiltArray[16] = filtL8plc45d;

HTFiltArray = (STREL **) calloc (N_HT_FILT, sizeof (STREL *));
HTFiltArray[0] = filtC4p2c0d;
HTFiltArray[1] = filtC4p2c0dI;
HTFiltArray[2] = filtC4p2c14d;
HTFiltArray[3] = filtC4p2c27d;
HTFiltArray[4] = filtC4p2c45d;
HTFiltArray[5] = filtC5p2c0d;
HTFiltArray[6] = filtC5p2c22d;
HTFiltArray[7] = filtC5p2c37d;
HTFiltArray[8] = filtC6p2c0d;
HTFiltArray[9] = filtC6p2c18d;
HTFiltArray[10] = filtC6p2c31d;
HTFiltArray[11] = filtC6p2c45d;
HTFiltArray[12] = filtC7p2c0d;
HTFiltArray[13] = filtC7p2c27d;
HTFiltArray[14] = filtC7p2c45d;
HTFiltArray[15] = filtC8p2c0d;
HTFiltArray[16] = filtC8p2c23d;
HTFiltArray[17] = filtC8p2c45d;
}
```

```
/****************************************************************
 * Copyright (c) 1988, Xerox Corporation.  All rights reserved. *
 * Copyright protection claimed includes all forms and matters
 * of copyrightable material and information now allowed by
 * statutory or judicial law or hereafter granted, including
 * without limitation, material generated from the software
 * programs which are displayed on the screen such as icons,
 * screen display looks, etc.
 ****************************************************************/

/*
 * integerOpsAlp.c--includes subroutines
 *                  intStatsMenuProc()
 *                  intStatsCmd()
 *                  graphStats()
 *              --contains procedures that map from the
 *                      image to other domains:
 *                  equalPr()   returns 1 if two pr are identical; 2 args.
 *                  equalPrA()  returns 1 if two pr are identical; 3 args.
 *                  equalPrD()  returns 1 if two pr are identical; 2 args.
 *                  zeroPr()    returns 1 if pr is zero
 *                  numberPr()  returns number of ON pixels
 *                              or number of non-zero words
 *                  makeSumPixelTab()
 *                  sumPixels()
 *                  onPixelsInRow()
 *                  onPixelsInEachRow()
 *                  extremeOnPixelInRow()
 */ include <stdio.h>
include <llama.h>
#include <imageReps.h>
#include "alp.h"
#include "morph.h"
#include "alpStrels.h"
#include "graphA.h"

#define FAST_PIXEL_COUNT        1
define SLOW_PIXEL_COUNT        0 define ROW_SUMS                0
define COLUMN_SUMS             1
#define ROW_TRANSITIONS         2
define COLUMN_TRANSITIONS      3 static unsigned short int   *tabSumPixel = NULL;
static unsigned short int   *sumRowPixels = NULL;
static unsigned short int   *sumColumnPixels = NULL;
static unsigned short int   *sumRowTransPixels = NULL;
static unsigned short int   *sumColTransPixels = NULL;
static int                  scanlines, bytesPerLine;
static char                 message[50];

void
intStatsMenuProc(item, event)
Panel_item  item;
Event       *event;
{
```

```
int             selection;
static Menu     intStatsMenu;
void            intStatsCmd();

if (!intStatsMenu)
        intStatsMenu = menu_create(MENU_STRINGS,
                                "Is pr zero?",
                                "Count pixels in pr",
                                "Count non-zero words in pr",
                                "Compute new integer stats",
                                "Show row pixel stats",
                                "Show column pixel stats",
                                "Show row transition stats",
                                "Show column transition stats", 0,
                                0);

selection = (int) menu_show(intStatsMenu, mainControlPanel, event, 0);
    intStatsCmd(item, selection, event);
}

/*
 * intStatsCmd(): computes or shows integer statistics for a pixrect.
 */
void
intStatsCmd(intStatsItem, selection, event)
Panel_item      intStatsItem;
int             selection;
Event           *event;
{
int             i, n;

if (!selection)
        return;

if (!chosenPixrect)
    {
        strcpy(message, "  No chosen pixrect!");
        textsw_insert(mainTextSw, message, strlen(message));
        return;
    } switch (selection)
    {   /* Choose integer operations on pixrects */
    case 1:  /* Is pr = 0 */
        if (zeroPr(chosenPixrect))
        {
            strcpy(message, "\n  Pixrect has no ON pixels\n");;
            textsw_insert(mainTextSw, message, strlen(message));
        }
        else
        {
            strcpy(message, "\n  Pixrect has ON pixels\n");;
            textsw_insert(mainTextSw, message, strlen(message));
        }
        break;
    case 2:  /* Count pixels in pr */
        n = numberPr(chosenPixrect, PIXELS);
        sprintf(message, "\n %d ON pixels in pixrect\n", n);
        textsw_insert(mainTextSw, message, strlen(message));
```

```
        break;
    case 3: /* Count non-zero words in pr */
        n = numberPr(chosenPixrect, WORDS);
        sprintf(message, "\n %d non-zero words in pixrect\n", n);
        textsw_insert(mainTextSw, message, strlen(message));
        break;
    case 4: /* Compute integer stats */
        sumPixels(chosenPixrect);
        break;
    case 5: /* Show row pixel stats */
        graphStats(ROW_SUMS);
        break;
    case 6: /* Show column pixel byte stats */
        graphStats(COLUMN_SUMS);
        break;
    case 7: /* Show row pixel transition stats */
        graphStats(ROW_TRANSITIONS);
        break;
    case 8: /* Show column pixel transition stats */
        graphStats(COLUMN_TRANSITIONS);
        break;
    default:
        printf(" Error in intStatsCmd: unknown selection\n");
    } textsw_insert(mainTextSw, message, strlen(message));
}

/*
 * graphStats():   plots specified row or column statistics
 *                 assumes that there exist global variables:
 *                     chosenPixrect, chosenPixwin
 *                 if there is no chosenPixwin, then it takes
 *                 statistics from the chosenPixrect.
 */
graphStats(type)
int         type;
{
int         i;
DATA        *data, *graphInit();
static char procName[] = "graphStats";

if (!isPrDefined(chosenPixrect))
        return;

if (type == ROW_SUMS)
    {
        data = graphInit();
        graphPutTitle(data, "Sum of ON pixels in each row");
        if (!sumRowPixels)
            sumPixels(chosenPixrect);
        for (i = 0; i < scanlines; i++)
            graphPutData(data, i, sumRowPixels[i]);
    }
    else if (type == COLUMN_SUMS)
    {
        data = graphInit();
        graphPutTitle(data, "Sum of ON pixels in each byte column");
```

```
        if (!sumColumnPixels)
            sumPixels(chosenPixrect);
        for (i = 0; i < bytesPerLine; i++)
            graphPutData(data, i, sumColumnPixels[i]);
    }
    else if (type == ROW_TRANSITIONS)
    {
        data = graphInit();
        graphPutTitle(data, "Sum of pixel transitions in each row");
        if (!sumRowTransPixels)
            sumPixels(chosenPixrect);
        for (i = 0; i < scanlines; i++)
            graphPutData(data, i, sumRowTransPixels[i]);
    }
    else if (type == COLUMN_TRANSITIONS)
    {
        data = graphInit();
        graphPutTitle(data, "Sum of pixel transitions in each byte column");
        if (!sumColTransPixels)
            sumPixels(chosenPixrect);
        for (i = 0; i < bytesPerLine; i++)
            graphPutData(data, i, sumColTransPixels[i]);
    } graphMake(data);
}

/*
 * equalPr():   returns 1 if the two pixrects are identical; zero otherwise.
 *              creates a temporary pixrect.
 */
int
equalPr(pixr1, pixr2)
Pixrect     *pixr1, *pixr2;
{
int             w, h, eq;
Pixrect         *prT;
static char     procName[] = "equalPr";

if (!isPrDefined(pixr1, procName))
        return;
    if (!isPrDefined(pixr2, procName))
        return;

w = pixr2->pr_size.x;
    h = pixr2->pr_size.y;
    prT = mem_create(w, h, 1);
    if (!prT)
    {
        printf(" Error in equalPr: pixrect not created\n");
        return;
    } opPrPr(prT, pixr2, COPY);
    pr_rop(prT, 0, 0, pixr1->pr_size.x, pixr1->pr_size.y,
            OP_XOR, pixr1, 0, 0);

eq = zeroPr(prT);
    pr_close(prT);
```

```
        return eq;
}

/*
 *  equalPrA():  returns 1 if the two pixrects are identical; zero otherwise.
 *               accepts an auxiliary pixrect as an argument.
 */
int
equalPrA(pixr1, pixr2, pixrI)
Pixrect     *pixr1, *pixr2, *pixrI;
{
static char     procName[] = "equalPrA";

if (!isPrDefined(pixr1, procName))
        return;
    if (!isPrDefined(pixr2, procName))
        return;
    if (!isPrDefined(pixrI, procName))
        return;

opPrPr(pixrI, pixr2, COPY);
    pr_rop(pixrI, 0, 0, pixr1->pr_size.x, pixr1->pr_size.y,
            OP_XOR, pixr1, 0, 0);

return (zeroPr(pixrI));
}

/*
 *  equalPrD():  returns 1 if the two pixrects are identical; zero otherwise.
 *               destructive version: alters the contents of pixr2.
 */
int
equalPrD(pixr1, pixr2)
Pixrect     *pixr1, *pixr2;
{
static char     procName[] = "equalPrD";

if (!isPrDefined(pixr1, procName))
        return;
    if (!isPrDefined(pixr2, procName))
        return;

pr_rop(pixr2, 0, 0, pixr1->pr_size.x, pixr1->pr_size.y,
            OP_XOR, pixr1, 0, 0);

return (zeroPr(pixr2));
}

/*
 *  zeroPr():  returns 1 if the pixrect is zero; returns 0 otherwise.
 */
int
zeroPr(pixr)
Pixrect             *pixr;
{
int                 i, w, h, dataWords;
unsigned short int  *data;
```

```c
static char                  procName[] = "zeroPr";

if (!isPrDefined(pixr, procName))
        return;

w = pixr->pr_size.x;
    h = pixr->pr_size.y;
    dataWords = (prBytesPerLine(pixr) >> 1) * h;
    data = (unsigned short int *) mpr_d(pixr)->md_image;
    for (i = 0; i < dataWords; i++)
        if (data[i]) return(0);

return(1);
}

/*
 * numberPr():    returns either the number of ON pixels in the pixrect
 *                or the number of non-zero words, depending on
 *                the value of type.
 */
int
numberPr(pixr, type)
Pixrect                 *pixr;
int                     type;
{
int                     i, j, w, h, dataWords, dataBytes, num;
register int            byteOff, index;
register unsigned char  *bytePtr;
unsigned short int      *data;
static char             procName[] = "numberPr";

if (!isPrDefined(pixr, procName))
        return;

w = pixr->pr_size.x;
    h = pixr->pr_size.y;
    dataBytes = prBytesPerLine(pixr) * h;
    dataWords = dataBytes >> 1;
    num = 0;
    data = (unsigned short int *) mpr_d(pixr)->md_image;
    bytePtr = (unsigned char *) mpr_d(pixr)->md_image;
    if (type == PIXELS)
#if FAST_PIXEL_COUNT
    {
        if (tabSumPixel == NULL)
            makeSumPixelTab();
        byteOff = 0;
        for (i = 0; i < dataBytes; i++)
        {
            index = *(bytePtr + byteOff);
            byteOff++;
            num += tabSumPixel[(int) index];
        }
    }
#endif FAST_PIXEL_COUNT
#if SLOW_PIXEL_COUNT
    {
        for (i = 0; i < dataWords; i++)
            if (data[i])
```

```
            for (j = 0; j < 16; j++)
                if (data[i] & wmask[j])
                    num++;
        }
#endif SLOW_PIXEL_COUNT
    else if (type == WORDS)
        for (i = 0; i < dataWords; i++)
            if (data[i])    /* there exists at least one non-zero bit
                             *  in the word */
                num++;

return(num);
}

/*
 *  makeSumPixelTab()
 */
makeSumPixelTab()
{
int     p[8];
int     i, t, d, iStart, k;

if (tabSumPixel)  /* already exists; don't do anything */
        return;

/* allocate */
    tabSumPixel = (unsigned short int *) calloc (256, sizeof(short int));

/* initialize power table */
    p[0] = 1;
    for (i = 1; i < 8; i++)
        p[i] = 2 * p[i - 1];

/* make table returning sum of ON pixels in a byte */
    tabSumPixel[0] = (unsigned short int) 0;
    i = 1;
    for (d = 0; d < 8; d++)
    {
        iStart = p[d];
        if (i != iStart)
            printf(" Error: i = %d; iStart = %d\n", i, iStart);
        for (k = 0; k < iStart; k++)
            tabSumPixel[i++] = (unsigned short int) (1 + tabSumPixel[k]);
    }
}

/*
 *  sumPixels():    allocates storage, computes the number of ON pixels
 *                  in each row, the number of ON pixels in each
 *                  byte column, and the number of ON-OFF or OFF-ON
 *                  pixel transitions in each row.
 */
int
sumPixels(pixr)
Pixrect                 *pixr;
{
int                     w, h, i, j, num;
register int            byteOff, index, Bpl;
```

```c
register unsigned char    *bytePtr;
Pixrect                   *prT1, *prT2;
static char               procName[] = "sumPixels";

if (!isPrDefined(pixr, procName))
        return;

w = pixr->pr_size.x;
    h = pixr->pr_size.y;
    Bpl = prBytesPerLine(pixr);
    bytePtr = (unsigned char *) mpr_d(pixr)->md_image;

if (tabSumPixel == NULL)
        makeSumPixelTab();

if (sumRowPixels)
        free (sumRowPixels);
    if (sumColumnPixels)
        free (sumColumnPixels);
    if (sumRowTransPixels)
        free (sumRowTransPixels);
    if (sumColTransPixels)
        free (sumColTransPixels);

scanlines = h;
    bytesPerLine = Bpl;
    sumRowPixels = (unsigned short int *) calloc(h,
            sizeof(unsigned short int));
    sumColumnPixels = (unsigned short int *) calloc(Bpl,
            sizeof(unsigned short int));
    sumRowTransPixels = (unsigned short int *) calloc(h,
            sizeof(unsigned short int));
    sumColTransPixels = (unsigned short int *) calloc(Bpl,
            sizeof(unsigned short int));

/* find the number of ON pixels in each row */
    byteOff = 0;
    for (i = 0; i < h; i++)
    {
        num = 0;
        for (j = 0; j < Bpl; j++)
        {
            index = *(bytePtr + byteOff);
            byteOff++;
            num += tabSumPixel[(int) index];
        }
        sumRowPixels[i] = num;
    }

/* find the number of ON pixels in each column byte */
    for (i = 0; i < Bpl; i++)
    {
        num = 0;
        byteOff = i;
        for (j = 0; j < h; j++)
        {
            index = *(bytePtr + byteOff);
            byteOff += Bpl;
            num += tabSumPixel[(int) index];
        }
```

```
        sumColumnPixels[i] = num;
    }

/*  Find the number of pixels transitions in each row.
         *     Note that single pixel runs only get counted once, but this
         *     matters little, because single pixel runs are relatively
         *     rare.  They can be found by using ERODE with SE=strel3h1   */
    prT1 = mem_create(w, h, 1);
    prT2 = mem_create(w, h, 1);
    if (!prT1 || !prT2)
    {
        printf(" Error in sumPixels: pixrect create failure\n");
        return;
    }
    erode(prT1, pixr, strel3h);
    logOp(prT2, pixr, prT1, XOR);
    bytePtr = (unsigned char *) mpr_d(prT2)->md_image;
    byteOff = 0;
    for (i = 0; i < h; i++)
    {
        num = 0;
        for (j = 0; j < Bpl; j++)
        {
            index = *(bytePtr + byteOff);
            byteOff++;
            num += tabSumPixel[(int) index];
        }
        sumRowTransPixels[i] = num;
    }

/*  Find the number of pixels transitions in each byte of columns.
         *     Note that single pixel runs only get counted once, but this
         *     matters little, because single pixel runs are relatively
         *     rare.  They can be found by using ERODE with SE=strel3v1   */
    erode(prT1, pixr, strel3v);
    logOp(prT2, pixr, prT1, XOR);
    bytePtr = (unsigned char *) mpr_d(prT2)->md_image;
    for (i = 0; i < Bpl; i++)
    {
        num = 0;
        byteOff = i;
        for (j = 0; j < h; j++)
        {
            index = *(bytePtr + byteOff);
            byteOff += Bpl;
            num += tabSumPixel[(int) index];
        }
        sumColTransPixels[i] = num;
    }
    pr_close(prT1);
    pr_close(prT2);
}

/*
 *  onPixelsInRow():
 */
onPixelsInRow(pixr, row)
Pixrect                         *pixr;
int                             row;
```

```
{
int                      Bpl, byteOff, num, j;
int                      index;
unsigned char            *bytePtr;
static char              procName[] = "onPixelsInRow";

if (!isPrDefined(pixr, procName))
        return -1;

if (row >= pixr->pr_size.y)
        return -1;

if (tabSumPixel == NULL)
        makeSumPixelTab();

Bpl = prBytesPerLine(pixr);
    bytePtr = (unsigned char *) mpr_d(pixr)->md_image;
    byteOff = Bpl * row;
    num = 0;
    for (j = 0; j < Bpl; j++)
    {
        index = *(bytePtr + byteOff);
        byteOff++;
        num += tabSumPixel[(int) index];
    }
    return num;
}

/*
 * onPixelsInEachRow(pixr, array)
 */
onPixelsInEachRow(pixr, array)
Pixrect                  *pixr;
unsigned short int       *array;
{
int                      h, Bpl, byteOff, num, i, j;
int                      index;
unsigned char            *bytePtr;
static char              procName[] = "onPixelsInEachRow";

if (!isPrDefined(pixr, procName))
        return -1;

if (!array)
        return -1;

if (tabSumPixel == NULL)
        makeSumPixelTab();

/*  find the number of ON pixels in each row */
    h = pixr->pr_size.y;
    Bpl = prBytesPerLine(pixr);
    bytePtr = (unsigned char *) mpr_d(pixr)->md_image;
    byteOff = 0;
    for (i = 0; i < h; i++)
    {
        num = 0;
        for (j = 0; j < Bpl; j++)
        {
```

```
                index = *(bytePtr + byteOff);
                byteOff++;
                num += tabSumPixel[(int) index];
            }
            array[i] = (unsigned short int) num;
        }
    }

/*
 * extremeOnPixelInRow():   Returns the x-coordinate of either
 *                              (i) the first ON pixel in the row, or
 *                              (ii) the last ON pixel in the row, or
 *                              (iii) -1 on error.
 *                          "which" is either FIRST or LAST
 */
extremeOnPixelInRow(pixr, row, which)
Pixrect             *pixr;
int                 row, which;
{
int                 foundFlag;
int                 Bpl, byteOff, j, jStart, i;
unsigned char       *bytePtr, byte;
static char         procName[] = "extremeOnPixelInRow";

if (!isPrDefined(pixr, procName))
        return -1;

if (row >= pixr->pr_size.y)
        return -1;

foundFlag = FALSE;

/* find the first or last byte with ON pixel(s) */
    Bpl = prBytesPerLine(pixr);
    bytePtr = (unsigned char *) mpr_d(pixr)->md_image;
    if (which == FIRST)     /* first byte */
    {
        byteOff = Bpl * row;
        for (j = 0; j < Bpl; j++)
        {
            byte = *(bytePtr + byteOff);
            if (byte)
            {
                foundFlag = TRUE;
                break;
            }
            byteOff++;
        }
    }
    else  /* last byte */
    {
        byteOff = Bpl * (row + 1) - 1;
        for (j = Bpl - 1; j >= 0; j--)
        {
            byte = *(bytePtr + byteOff);
            if (byte)
            {
                foundFlag = TRUE;
                break;
```

```
            }
            byteOff--;
        }
    } if (!foundFlag)
        return (-1);

jStart = 8 * j;    /* bit position of start of byte with first ON pixel */
    if (which == FIRST)   /* search for first ON bit: left to right */
        for (i = 0; i < 8; i++)
        {
            if (byte & mask8[i])
                return (jStart + i);
        }
    else   /* search for first ON bit: right to left */
        for (i = 7; i >= 0; i--)
            if (byte & mask8[i])
                return (jStart + i);

printf(" Error in extremeOnPixelInRow: shouldn't have reached here\n");
    return -1;
}

/*******************************************************************
 *  Copyright (c) 1988, Xerox Corporation.  All rights reserved.   *
 *  Copyright protection claimed includes all forms and matters    *
 *  of copyrightable material and information now allowed by       *
 *  statutory or judicial law or hereafter granted, including      *
 *  without limitation, material generated from the software       *
 *  programs which are displayed on the screen such as icons,      *
 *  screen display looks, etc.                                     *
 *******************************************************************/

/*
 *  scale.c: contains subroutines for
 *           (1) thresholded reduction:
 *                  --reduceImToIm()
 *                  --reducePrToIm()
 *                  --reducePr()
 *                  --reducePr2()
 *                  --redOpF()
 *                  --redFastColumns()
 *                  --makeLookupTables()
 *                  --redOp()
 *           (2) fast and slow expansion
 *                  --expandPr2()
 *                  --expOpF()
 *                  --expFastColumns()
 *                  --expandPr2S()
 *           (3) set globals
 *                  - setThresholdLevel()
 *
 *      Note:  redOp() uses only rasterOps
 *             redOpF() uses rasterOps for rows and table lookup for columns.
 */ include <stdio.h>
include <llama.h>
#include <imageReps.h>
#include <imageGlobals.h>
#include "alp.h"
#include "morph.h"
```

```
#define   OR        1
#define   AND       2
#define   OR_OR     1
#define   OR_AND    2
#define   AND_OR    3
define   AND_AND   4 static unsigned char       *tabOr, *tabAnd;
static unsigned short int  *tabExp2;

/****************************************************************
 *       Reduction procedures
 ****************************************************************/
/*
 *  reduceImToIm():   Returns reduced image from a source image.
 *                    level = {1, 2, 3, 4} == {.25, .5, .75, 1.0} black
 *                    returns NULL on error.
 *                    This hasn't been tested, but because it differs from
 *                    reducePrToIm by only a line, it should be OK.
 */
IMAGE *
reduceImToIm(imIn, level)
IMAGE      *imIn;
int         level;
{
Pixrect    *pixrS, *pixrD, *imageToPrN(), *reducePr();
IMAGE      *imOut, *pixrectToImageN();

pixrS = imageToPrN(imIn);
    pixrD = reducePr(pixrS, level);
    if (!pixrD)
    {
        printf(" Error in reduceImToIm:  returned Pr is NULL\n");
        return (NULL);
    } imOut = pixrectToImageN(pixrD);
    pr_close (pixrS);
    pr_close (pixrD);

return (imOut);
}

/*
 *  reducePrToIm():   Returns reduced image from Pixrect.
 *                    level = {1, 2, 3, 4} == {.25, .5, .75, 1.0} black
 *                    returns NULL on error.
 */
IMAGE *
reducePrToIm(pixrS, level)
Pixrect    *pixrS;
int         level;
{
Pixrect    *pixrD, *reducePr();
IMAGE      *im, *pixrectToImageN();

pixrD = reducePr(pixrS, level);
    if (!pixrD)
    {
        printf(" Error in reducePrToIm:  returned Pr is NULL\n");
        return (NULL);
    }
```

```
    im = pixrectToImageN(pixrD);
    pr_close (pixrD);

return (im);
}

/*
 *  reducePr():  Returns reduced pixrect such that each pixel is ON
 *               if at least 'level' of the four corresponding
 *               source pixels is ON.
 *               Makes lookup tables if not already done.
 *               Uses redOpF (with table look-up) for speed.
 */
Pixrect * reducePr(pixrS, level)
Pixrect       *pixrS;
int           level;
{
Pixrect       *pixrD, *pixrDAux;
int           wS, hS, wD, hD;
int           error1, error2;
static char   procName[] = "reducePr";

if (!isPrDefined(pixrS, procName))
        return (NULL);

wS = pixrS->pr_size.x;
    hS = pixrS->pr_size.y;
    pixrDAux = NULL;
    pixrD = mem_create(wS/2, hS/2, 1);   /* a half-height, half-width pr */
    if (!isPrDefined(pixrD, procName))
        return (NULL);

if (!tabAnd || !tabOr)
        makeLookupTables();

error1 = error2 = 0;
    wD = wS/2;
    hD = hS/2;

if (level == 1)
        error1 = redOpF(pixrD, pixrS, OR_OR);
    else if (level == 2)
    {
        error1 = redOpF(pixrD, pixrS, OR_AND);
        pixrDAux = mem_create(wS/2, hS/2, 1);   /* a half-ht, half-width pr */
        error2 = redOpF(pixrDAux, pixrS, AND_OR);
        pr_rop(pixrD, 0, 0, wD, hD, OP_HU, pixrDAux, 0, 0);
    }
    else if (level == 3)
    {
        error1 = redOpF(pixrD, pixrS, OR_AND);
        pixrDAux = mem_create(wS/2, hS/2, 1);   /* a half-ht, half-width pr */
        error2 = redOpF(pixrDAux, pixrS, AND_OR);
        pr_rop(pixrD, 0, 0, wD, hD, OP_HI, pixrDAux, 0, 0);
    }
    else if (level == 4)
        error1 = redOpF(pixrD, pixrS, AND_AND);

if (pixrDAux)
        pr_close(pixrDAux);
```

```
        if (errorl || error2)
            return (NULL);
        else
            return (pixrD);
    }

/*
     * reducePr2():  Takes an input pixrect and a reduced output pixrect,
     *               and returns in the reduced pixrect an image
     *               such that each pixel is ON
     *               if at least 'level' of the four corresponding
     *               pixels in the input pixrect is ON.
     *               Makes lookup tables if not already done.
     *               Uses redOpF (with table look-up) for speed.
     */
    reducePr2(pixrD, pixrS, level)
    Pixrect      *pixrD, *pixrS;
    int          level;
    {
    Pixrect      *pixrDAux;
    int          wS, hS, wD, hD;
    int          errorl, error2;
    static char  procName[] = "reducePr2";

if (!isPrDefined(pixrS, procName))
            return 1;
        if (!isPrDefined(pixrD, procName))
            return 1;

wS = pixrS->pr_size.x;
        hS = pixrS->pr_size.y;
        wD = pixrD->pr_size.x;
        hD = pixrD->pr_size.y;
        if (wS != 2*wD || hS != 2*hD)
        {
            printf("Error in reducePr2: pixrect sizes incorrect\n");
            return 1;
        } if (!tabAnd || !tabOr)
            makeLookupTables();

pixrDAux = NULL;
        errorl = error2 = 0;

if (level == 1)
            errorl = redOpF(pixrD, pixrS, OR_OR);
        else if (level == 2)
        {
            errorl = redOpF(pixrD, pixrS, OR_AND);
            pixrDAux = mem_create(wS/2, hS/2, 1);  /* a half-ht, half-width pr */
            error2 = redOpF(pixrDAux, pixrS, AND_OR);
            pr_rop(pixrD, 0, 0, wD, hD, OP_HU, pixrDAux, 0, 0);
        }
        else if (level == 3)
        {
            errorl = redOpF(pixrD, pixrS, OR_AND);
            pixrDAux = mem_create(wS/2, hS/2, 1);  /* a half-ht, half-width pr */
            error2 = redOpF(pixrDAux, pixrS, AND_OR);
            pr_rop(pixrD, 0, 0, wD, hD, OP_HI, pixrDAux, 0, 0);
        }
        else if (level == 4)
            errorl = redOpF(pixrD, pixrS, AND_AND);
```

```
    if (pixrDAux)
        pr_close(pixrDAux);

if (error1 || error2)
        return 1;
    else
        return 0;
}

/*
 *  redOpF: Fills the reduced destination pixrect with data of
 *              the type specified by op.
 *          Fast version with table lookup.
 *          Two steps:  first combines adjacent rows of the source
 *              pixrect and writes into the intermediate pixrect;
 *              then uses table to convert each set of 16 adjacent bits
 *              of the intermediate pixrect into eight bits of the
 *              destination pixrect.
 *          Returns 0 if OK; 1 on error.
 */
redOpF(pixrD, pixrS, op)
Pixrect      *pixrD, *pixrS;
int          op;
{
int          wS, hS, wD, hD, j;
Pixrect      *pixrI;
static char  procName[] = "redOpF";

if (!isPrDefined(pixrS, procName))
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    if (wS != 2*wD || hS != 2*hD)
    {
        printf("Error in redOpF: pixrect sizes incorrect\n");
        return 1;
    } pixrI = mem_create(wS, hS/2, 1);  /* a half-height, full-width pr */
    if (!pixrI)
    {
        printf(" Error in redOpF: pixrI not created\n");
        return 1;
    } if (op == OR_OR)
    {
        for (j = 0; j < hD; j++)
        {
            pr_rop(pixrI, 0, j, wS, 1, OP_HC, pixrS, 0, 2*j);
            pr_rop(pixrI, 0, j, wS, 1, OP_HU, pixrS, 0, 2*j + 1);
        } if (redFastColumns(pixrD, pixrI, OR))
            return 1;
    }
    else if (op == OR_AND)
    {
```

```c
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HU, pixrS, 0, 2*j + 1);
    } if (redFastColumns(pixrD, pixrI, AND))
        return 1;
}
else if (op == AND_OR)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HI, pixrS, 0, 2*j + 1);
    } if (redFastColumns(pixrD, pixrI, OR))
        return 1;
}
else if (op == AND_AND)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HI, pixrS, 0, 2*j + 1);
    } if (redFastColumns(pixrD, pixrI, AND))
        return 1;
}
else
{
    printf(" Error in redOpF: unknown operators\n");
    return 1;
} pr_close (pixrI);
    return 0;
}

/*
 *  redFastColumns():  uses lookup tables to reduce the number of
 *                     columns by a factor of 2 in going from the
 *                     source pixrect to the destination pixrect.
 *                     checks that relative sizes of source and destination
 *                         pixrects are correct.
 *                     depending on the line padding, the pixrect data
 *                         is either stored in short ints or in 32-bit ints.
 *                     returns 0 (or 1 on error).
 */
redFastColumns(pixrD, pixrS, op)
Pixrect                 *pixrD, *pixrS;
int                     op;
{
int                     wS, hS, wD, hD, j, prSWpl, prDBpl;
register                i, sWord, dByte;
unsigned short int      *pS, index;
unsigned char           *pD, *tab;
static char             procName[] = "redFastColumns";

if (!isPrDefined(pixrS, procName))
```

```
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    prSWpl = prBytesPerLine(pixrS) >> 1;
    prDBpl = prBytesPerLine(pixrD);        /* Note that prDBpl >= prSWpl */
    if ((wD != ((wS + 1) >> 1)) || (hD != hS))
    {
        printf("Error in redFastColumns: pixrect sizes incorrect\n");
        return 1;
    }
    pS = (unsigned short int *) mpr_d(pixrS)->md_image;
    pD = (unsigned char *) mpr_d(pixrD)->md_image;

if (op == OR)
        tab = tabOr;
      else if (op == AND)
        tab = tabAnd;
      else
        printf(" Error in redFastColumns: unknown operation\n");

dByte = 0;
    for (j = 0; j < hS; j++)
    {
        sWord = j * prSWpl;
        for (i = 0; i < prSWpl; i++)
        {
            /* obtain 16 bits from the source */
            index = *(pS + sWord);
            sWord++;
            /* get the corresponding 8 bits from the table,
             * and put it in the destination byte */
            *(pD + dByte) = tab[index];
            dByte++;
        }
        /* Note that i for the row just completed has been incremented,
         * and it now gives the number of bytes written to pixrD.
         * Write null bytes to pad pixrD */
        for (; i < prDBpl; i++)
        {
            *(pD + dByte) = '\0';
            dByte++;
        }
    } return 0;
}

/*
 *  makeLookupTables():  Allocates and fills OR and AND tables
 *                         for column reduction.
 *                -      Allocates and fills expansion table.
 */
makeLookupTables()
```

```c
{
int     p[15], base[8];
int     i, d, r, k, iStart, tInc;

/* allocate */
    tabOr = (unsigned char *) calloc (256*256, 1);
    tabAnd = (unsigned char *) calloc (256*256, 1);
    tabExp2 = (unsigned short int *) calloc (256, sizeof(short int));

p[0] = 1;
    for (i = 1; i <= 14; i++)
        p[i] = 2 * p[i - 1];

/*  OR table */
    tabOr[0] = (unsigned char) 0;
    i = 1;
    for (d = 1; d <= 8; d++)
    {
        iStart = p[2 * d - 2];
        tInc = p[d - 1];
        if (i != iStart)
            printf(" Error: i = %d; iStart = %d\n", i, iStart);
        for (r = 1; r <= 3; r++)
            for (k = 0; k < iStart; k++)
                tabOr[i++] = (unsigned char) ((int)tabOr[k] + tInc);
    }

/*  AND table */
    tabAnd[0] = (unsigned char) 0;
    i = 1;
    for (d = 1; d <= 8; d++)
    {
        iStart = p[2 * d - 2];
        if (i != iStart)
            printf(" Error: i = %d; iStart = %d\n", i, iStart);
        for (r = 1; r <= 3; r++)
        {
            if (r < 3)
                tInc = 0;
              else
                tInc = p[d - 1];
            for (k = 0; k < iStart; k++)
                tabAnd[i++] = (unsigned char) ((int)tabAnd[k] + tInc);
        }
    }

/*  for (d = 0; d < 15; d++)
    {
        for (i = p[d]; i < p[d] + 6; i++)
            printf(" tabOr[%d] = %d; tabAnd[%d] = %d\n",
                    i, tabOr[i], i, tabAnd[i]);
        for (i = p[d]; i > p[d] - 6; i--)
            printf(" tabOr[%d] = %d; tabAnd[%d] = %d\n",
                    i, tabOr[i], i, tabAnd[i]);
    } */ base[0] = 3;
    for (i = 1; i < 8; i++)
        base[i] = p[2 * i] * base[0];
```

```
    /* Expansion table */
tabExp2[0] = 0;
i = 1;
for (d = 0; d < 8; d++)
{
    iStart = p[d];
    if (i != iStart)
        printf(" Error: i = %d; iStart = %d\n", i, iStart);
    for (k = 0; k < iStart; k++)
        tabExp2[i++] = (unsigned short int) base[d] + tabExp2[k];
}

/*  for (i = 0; i < p[8]; i += 2)
        printf(" tabExp2[%d] = %d; tabExp2[%d] = %d\n",
            i, tabExp2[i], i+1, tabExp2[i+1]);  */
}

/*
 * redOp(): Fills the reduced destination pixrect with data of
 *          the type specified by op.
 *          Two steps: first combines adjacent rows of the source
 *             pixrect and writes into the intermediate pixrect;
 *             then combines adjacent columns of the intermediate pixrect
 *             and writes into the destination pixrect.
 *          This is about 7 times slower than redOpF.
 *          Returns 0 it OK; 1 on error.
 *          To use this subroutine, substitute the redOp() call
 *             for redOpF(), in reducePr() and/or reducePr2().
 */
redOp(pixrD, pixrS, op)
Pixrect     *pixrD, *pixrS;
int         op;
{
int         wS, hS, wD, hD, i, j;
Pixrect     *pixrI;
static char procName[] = "redOp";

if (!isPrDefined(pixrS, procName))
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    if (wS != 2*wD || hS != 2*hD)
    {
        printf("Error in redOp: pixrect sizes incorrect\n");
        return 1;
    } pixrI = mem_create(wS, hS/2, 1);   /* a half-height, full-width pr */
    if (!pixrI)
    {
        printf(" Error in redOp: pixrI not created\n");
        return 1;
    }
```

```c
if (op == OR_OR)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HU, pixrS, 0, 2*j + 1);
    } for (i = 0; i < wD; i++)
    {
        pr_rop(pixrD, i, 0, 1, hD, OP_HC, pixrI, 2*i, 0);
        pr_rop(pixrD, i, 0, 1, hD, OP_HU, pixrI, 2*i + 1, 0);
    }
}
else if (op == OR_AND)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HU, pixrS, 0, 2*j + 1);
    } for (i = 0; i < wD; i++)
    {
        pr_rop(pixrD, i, 0, 1, hD, OP_HC, pixrI, 2*i, 0);
        pr_rop(pixrD, i, 0, 1, hD, OP_HI, pixrI, 2*i + 1, 0);
    }
}
else if (op == AND_OR)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HI, pixrS, 0, 2*j + 1);
    } for (i = 0; i < wD; i++)
    {
        pr_rop(pixrD, i, 0, 1, hD, OP_HC, pixrI, 2*i, 0);
        pr_rop(pixrD, i, 0, 1, hD, OP_HU, pixrI, 2*i + 1, 0);
    }
}
else if (op == AND_AND)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HI, pixrS, 0, 2*j + 1);
    } for (i = 0; i < wD; i++)
    {
        pr_rop(pixrD, i, 0, 1, hD, OP_HC, pixrI, 2*i, 0);
        pr_rop(pixrD, i, 0, 1, hD, OP_HI, pixrI, 2*i + 1, 0);
    }
}
else
{
    printf(" Error in redOp: unknown operators\n");
    return 1;
```

```
        } pr_close (pixrI);
    return 0;
}

/****************************************************************
 *          Expansion procedures
 ****************************************************************/
/*
 *  expandPr2():  Takes a source pixrect and an expanded destination pixrect;
 *                each pixel in the source pixrect is mapped to four
 *                identical pixels in the destination.
 *                Makes lookup tables if not already done.
 *                Uses expOpF (with table look-up) for speed.
 */
expandPr2(pixrD, pixrS)
Pixrect         *pixrD, *pixrS;
{
int             wS, hS, wD, hD;
static char     procName[] = "expandPr2";

if (!isPrDefined(pixrS, procName))
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    if (wD != 2 * wS || hD != 2 * hS)
    {
        printf("Error in expandPr2: pixrect sizes incorrect\n");
        return 1;
    } if (!tabExp2)
        makeLookupTables();

if (expOpF(pixrD, pixrS))
        return 1;
      else
        return 0;
}

/*
 *  expOpF: Fills the expanded destination pixrect with
 *          data from the source.
 *          Fast version with table lookup.
 *          Two steps: first combines adjacent rows of the source
 *          pixrect and writes into the intermediate pixrect;
 *          then uses table to convert each columns
 *          of the intermediate pixrect into two columns of
 *          the destination pixrect.
 *          Returns 0 if OK; 1 on error.
 */
expOpF(pixrD, pixrS)
```

```
Pixrect         *pixrD, *pixrS;
{
int             wS, hS, wD, hD, j;
Pixrect         *pixrI;
static char     procName[] = "expOpF";

if (!isPrDefined(pixrS, procName))
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    if (wD != 2*wS || hD != 2*hS)
    {
        printf("Error in expOpF: pixrect sizes incorrect\n");
        return 1;
    } pixrI = mem_create(wS, 2 * hS, 1);
    if (!pixrI)
    {
        printf(" Error in expOpF: pixrI not created\n");
        return 1;
    } for (j = 0; j < hS; j++)
    {
        pr_rop(pixrI, 0, 2*j, wS, 1, OP_HC, pixrS, 0, j);
        pr_rop(pixrI, 0, 2*j + 1, wS, 1, OP_HC, pixrS, 0, j);
    } if (expFastColumns(pixrD, pixrI))
        return 1;

pr_close (pixrI);
    return 0;
}

/*
 * expFastColumns():  uses lookup tables to expand the number of
 *                    columns by a factor of 2 in going from the
 *                    source pixrect to the destination pixrect.
 *                    checks that relative sizes of source and destination
 *                        pixrects are correct.
 *                    depending on the line padding, the pixrect data
 *                        is either stored in short ints or in 32-bit ints.
 *                    Returns 0 (or 1 on error).
 */
expFastColumns(pixrD, pixrS)
Pixrect             *pixrD, *pixrS;
{
int                 wS, hS, wD, hD, j, prSBpl, prDWpl;
register            i, sByte, dWord;
unsigned char       *pS, index;
unsigned short int  *pD;
static char         procName[] = "expFastColumns";
```

```c
    if (!isPrDefined(pixrS, procName))
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    prSBpl = prBytesPerLine(pixrS);
    prDWpl = prBytesPerLine(pixrD) >> 1;   /* Note that prSBpl >= prDWpl */
    if (wD != 2 * wS || hS != hD)
    {
        printf("Error in expFastColumns: pixrect sizes incorrect\n");
        return 1;
    }
    pS = (unsigned char *) mpr_d(pixrS)->md_image;
    pD = (unsigned short int *) mpr_d(pixrD)->md_image;

dWord = 0;
    for (j = 0; j < hS; j++)
    {
        sByte = j * prSBpl;
        for (i = 0; i < prDWpl; i++)   /* because prDWpl <= prSBpl */
        {
                /* obtain 8 bits from the source */
            index = *(pS + sByte);
            sByte++;
                /* get the corresponding 16 bits from the table,
                 * and put it in the destination byte */
            *(pD + dWord) = tabExp2[(int) index];
            dWord++;
        }
    } return 0;
}

/*
 * expandPr2S():  Takes an input pixrect and an expanded output pixrect,
 *                and returns in the expanded pixrect an image
 *                such that for each ON pixel in the input pixrect,
 *                all corresponding pixels in the output pixrect are ON.
 *                The integer mag is the requested magnification.
 *                    It is checked against the sizes of source and destination
 *                    pixrects, and if the relative sizes don't equal mag,
 *                    the routine returns with an error.
 *                Returns 1 on error; 0 if OK.
 *                This is the "slow" version, that does everything by
 *                    bit checking and substitution.
 */
expandPr2S(pixrD, pixrS, mag)
Pixrect     *pixrD, *pixrS;
int         mag;
{
IMAGE       *imS, *imD, *pixrectToImageN(), *expandImage();
int         wS, hS, wD, hD;
int         error;
```

```
static char    procName[] = "expandPr2S";

if (!isPrDefined(pixrS, procName))
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    if (wD != (mag * wS) || hD != (mag * hS))
    {
        printf("Error in expandPr2S: pixrect sizes incorrect\n");
        return 1;
    } imS = pixrectToImageN(pixrS);   /* imS has new data */
    imD = expandImage(imS, mag);    /* imD is newly made image structure */
    if (!imD)
        return 1;
    error = imageIntoPr(pixrD, imD); /* data from imD copied to pixrD */
    free (imS->data);
    free (imS);
    free (imD->data);
    free (imD);
    if (error)
        return 1;
    else
        return 0;
}

/*****************************************************************
 *      Set globals
 *****************************************************************/
/*
 *   setThresholdLevel()
 */
setThresholdLevel(level)
int     level;
{ if (level > 0 && level <= 4)
        thresholdLevel = level;
    else
        printf(" Error in setThresholdLevel: unknown level\n");
}
```

```
/************************************************************
 * Copyright (c) 1988, Xerox Corporation.  All rights reserved. *
 * Copyright protection claimed includes all forms and matters  *
 * of copyrightable material and information now allowed by     *
 * statutory or judicial law or hereafter granted, including    *
 * without limitation, material generated from the software     *
 * programs which are displayed on the screen such as icons,    *
 * screen display looks, etc.                                   *
 ************************************************************/

/*
 * Taken from the version of graph.c in Vicuna.
 *      Substitute:  >> #include "alpaca.h"
 *                   >> #include "graph.h"
 *         for:      << #include "raveDisplay.h"
 */

/*
 * graphA: This module contains the procedures to create a pop up
 *         frame or subframe that plots graphical data.
 *      The following functions are defined:
 *          graphMake()
 *          graphMenu()
 *          graphPaint()
 *          graphInvert()
 *          graphHardcopyMenu()
 *              graphHardcopyCmd()
 *              graphDumpDisplay()
 *          graphWriteFile()
 *          graphQuit()
 *          graphScaleProc()
 *              graphInputMenu()
 *              graphInputSelect()
 *              graphInputQuit()
 *              graphInputInit()
 *          graphSelectType()
 *          graphClearCanvas()
 *          graphInit()
 *          graphPutTitle()
 *          graphPutData()
 *          graphPutType()
 *          graphPlotData()
 *          graphGetMinMax()
 *          graphSetScale()
 *          graphAxes()
 *          graphPoints()
 *          graphCurve()
 *          graphHistogram()
 *          graphCanCoord()
 *          graphCanClip()
 *          graphDrawPoint()
 *          graphCheck()
 *          graphTestExample()
 *      The following functions are defined in writeFileA.c:
 *          panelMessage()
 *          clearString()
 *      Usage:  entry is through graphMake(data).
 *          data is a pointer to data struct DATA.
 *          This makes the graph frame if it is not existent.
 *          The frame is made either as a subframe (of mainFrame) or as
```

```
*              a mainFrame.  In the latter case, window_main_loop is called,
*              and control is returned to the calling program by destroying
*              the window.
*/ include <stdio.h>
include <sys/file.h>
#include <llama.h>
#include <imageReps.h>
#include "alpaca.h"
#include "graphA.h"

#define    GRAPH_FRAME_WIDTH        380
#define    GRAPH_FRAME_HEIGHT       450
#define    MARGIN                   20
#define    DEBUG                    0
#define    DISPLAY_TIME             10   /* if > 0, automatically removes
                                          * display after this number of secs */ define    DUMP_FILE                "/usr/tmp/dumpfile"
define    Sign(x)                  (((x) < 0) ? -1 : 1)

static char      clearMessage[] = "                                                    ";
static char      paintMessage[] = " Painting not yet implemented.";
static char      dumpFrameMessage[] = " Frame is being printed. ";
static char      dumpGraphMessage[] = " Graph is being printed. ";
static char      message[100], filename[80];
static char      varMessage[60];
static char      inputStart[] = " Enter value and click selection ";
static int       tooMuchData = 0;
Panel_item       graphMessage;
Panel_item       graphScaling;
Panel_item       graphScaleChoice;
Panel_item       graphSelectPanel;
Panel_item       graphInputMessage;
Panel_item       graphInputText;

void             graphQuit();

graphMake(data)
DATA       *data;
{
    if (!graphFrame)
       graphMenu();
    window_set(graphFrame, WIN_SHOW, TRUE, 0);
    graphAutoScale = 1;    /* default is for automatic scaling */
    panel_set_value(graphScaleChoice, 0);
    panel_set_value(graphSelectPanel, 0);
    graphData = data;
    graphPlotData(graphData);
    if (DISPLAY_TIME > 0)
        doWithDelay(graphQuit, DISPLAY_TIME, 0);
    if (!mainFrame)
        window_main_loop(graphFrame);
} graphMenu()
{
/*
 * graphMenu --- displays a pop up frame or sub-frame with message panel,
```

```
 *              control panel, and canvas that allows plotting of data.
 */
/* Panel       graphMessagePanel;
 * Panel       graphControlPanel;
 * Canvas      graphCanvas;    */
void            graphPaint();
void            graphInvert();
void            graphHardcopyMenu();
void            graphWriteFile();
void            graphScaleProc();
void            graphSelectType();

if (mainFrame)
    {   /* make a subframe */
        graphFrame = window_create(mainFrame, FRAME,
                FRAME_LABEL,        "Graph",
                WIN_WIDTH,          GRAPH_FRAME_WIDTH,
                WIN_HEIGHT,         GRAPH_FRAME_HEIGHT,
                WIN_X,              0,
                WIN_Y,              360,
                0);
    }
      else
    {   /* make a main frame */
        graphFrame = window_create(NULL, FRAME,
                FRAME_LABEL,        "Graph",
                WIN_WIDTH,          GRAPH_FRAME_WIDTH,
                WIN_HEIGHT,         GRAPH_FRAME_HEIGHT,
                WIN_X,              300,
                WIN_Y,              360,
                0);
    } graphMessagePanel = window_create(graphFrame, PANEL,
            PANEL_HEIGHT,       ATTR_ROW(2),
            0);
    graphMessage = panel_create_item(graphMessagePanel, PANEL_MESSAGE,
            PANEL_LABEL_BOLD,   TRUE,
            PANEL_LABEL_STRING, "                              ",
            PANEL_ITEM_X,       0,
            PANEL_SHOW_ITEM,    FALSE,
            0);
    graphScaling = panel_create_item(graphMessagePanel, PANEL_MESSAGE,
            PANEL_LABEL_BOLD,   TRUE,
            PANEL_LABEL_STRING, "                              ",
            PANEL_ITEM_X,       0,
            PANEL_ITEM_Y,       ATTR_ROW(1),
            PANEL_SHOW_ITEM,    FALSE,
            0);
    window_fit_height(graphMessagePanel);

graphControlPanel = window_create(graphFrame, PANEL,
            WIN_BELOW,          graphMessagePanel,
            0);
    panel_create_item(graphControlPanel, PANEL_BUTTON,
            PANEL_LABEL_IMAGE,
                panel_button_image(graphControlPanel,"paint",4,0),
            PANEL_LABEL_BOLD,   TRUE,
            PANEL_NOTIFY_PROC,  graphPaint,
            0);
```

```
    panel_create_item(graphControlPanel, PANEL_BUTTON,
        PANEL_LABEL_IMAGE,
            panel_button_image(graphControlPanel,"invert",6,0),
        PANEL_LABEL_BOLD,       TRUE,
        PANEL_NOTIFY_PROC,      graphInvert,
        0);
    panel_create_item(graphControlPanel, PANEL_BUTTON,
        PANEL_LABEL_IMAGE,
            panel_button_image(graphControlPanel,"hardcopy",8,0),
        PANEL_LABEL_BOLD,       TRUE,
        PANEL_NOTIFY_PROC,      graphHardcopyMenu,
        0);
    panel_create_item(graphControlPanel, PANEL_BUTTON,
        PANEL_LABEL_IMAGE,
            panel_button_image(graphControlPanel,"writeFile",9,0),
        PANEL_LABEL_BOLD,       TRUE,
        PANEL_NOTIFY_PROC,      graphWriteFile,
        0);
    panel_create_item(graphControlPanel, PANEL_BUTTON,
        PANEL_LABEL_IMAGE,
            panel_button_image(graphControlPanel,"quit",4,0),
        PANEL_LABEL_BOLD,       TRUE,
        PANEL_NOTIFY_PROC,      graphQuit,
        0);
    graphScaleChoice = panel_create_item(graphControlPanel, PANEL_CYCLE,
        PANEL_ITEM_X,           ATTR_COL(0),
        PANEL_ITEM_Y,           ATTR_ROW(1),
        PANEL_LABEL_BOLD,       TRUE,
        PANEL_LABEL_STRING,     "Auto Scaling Enabled: ",
        PANEL_CHOICE_STRINGS,   "YES", "NO", 0,
        PANEL_VALUE,            0,
        PANEL_NOTIFY_PROC,      graphScaleProc,
        0);
    graphSelectPanel = panel_create_item(graphControlPanel, PANEL_CHOICE,
        PANEL_ITEM_X,           ATTR_COL(0),
        PANEL_ITEM_Y,           ATTR_ROW(2)+1,
        PANEL_LABEL_STRING,     "Type:",
        PANEL_LABEL_BOLD,       TRUE,
        PANEL_CHOICE_STRINGS,   "Histo","Curve","Points",0,
        PANEL_NOTIFY_PROC,      graphSelectType,
        0);
    window_fit_height(graphControlPanel);

graphCanvasWidth = 365;
    graphCanvasHeight = 320;
    graphCanvas = window_create(graphFrame, CANVAS,
            WIN_BELOW,              graphControlPanel,
            CANVAS_AUTO_SHRINK,     FALSE,
            CANVAS_WIDTH,           graphCanvasWidth,
            CANVAS_HEIGHT,          graphCanvasHeight,
            WIN_CONSUME_PICK_EVENTS,WIN_NO_EVENTS,WIN_MOUSE_BUTTONS,LOC_DRAG,0,
            0);
    graphPw = canvas_pixwin(graphCanvas);
} void
graphPaint(item,event)
Panel_item      item;
Event           *event;
{
```

```c
    panelMessage(graphMessage,paintMessage);
} void
graphInvert()
{
    pw_writebackground(graphPw,0,0,graphCanvasWidth,graphCanvasHeight,
            PIX_NOT(PIX_DST));
} void
graphHardcopyMenu(item,event)
Panel_item      item;
Event           *event;
{
int             selection;
static Menu     hardcopyMenu;
void            graphHardcopyCmd();

if (!hardcopyMenu)
        hardcopyMenu = menu_create(MENU_STRINGS,
                                    "Hardcopy frame",
                                    "Hardcopy graph", 0,
                                    0);

selection = (int) menu_show(hardcopyMenu, graphControlPanel, event, 0);
    graphHardcopyCmd(item, selection, event);
}

/*
 * graphHardcopyCmd()
 */
void
graphHardcopyCmd(hardcopyItem, selection, event)
Panel_item      hardcopyItem;
int             selection;
Event           *event;
{
int             width, height;

if (!selection)
        return;

switch (selection)
    {
    case 1: /* automatic hardcopy of graph frame */
        graphDumpDisplay();
        panelMessage(graphMessage,dumpFrameMessage);
        width = (int) window_get(graphFrame, WIN_WIDTH);
        height = (int) window_get(graphFrame, WIN_HEIGHT);
        autoSizeDump(width, height);
        break;
    case 2: /* automatic hardcopy of graph canvas */
        dumpCanvas(graphCanvas, NULL);
        panelMessage(graphMessage,dumpGraphMessage);
        autoSizeDump(graphCanvasWidth, graphCanvasHeight);
        break;
    default:
```

```
        printf(" Error in graphHardcopyCmd: unknown selection %d\n", selection);
    }
} graphDumpDisplay()
{
struct pixrect   *framepr, *mem_create(), *screen;
int               fd, x, y, width, height, mainX, mainY;
FILE             *fp;

fd = open(DUMP_FILE, O_CREAT, 0666);   /* create a new file if possible */
    close(fd);
    fd = open(DUMP_FILE, O_TRUNC, 0666);   /* truncate to zero length */
    close(fd);
    fd = open(DUMP_FILE, O_RDWR, 0666);
    fp = fdopen(fd,"w+");
    if(fp == NULL)
    {
        sprintf(message,"%s could not be opened",filename);
        warning(message);
        return;
    } x = (int) window_get(graphFrame,WIN_X);
    y = (int) window_get(graphFrame,WIN_Y);
    if (mainFrame)
    {
        mainX = (int) window_get(mainFrame,WIN_X);
        mainY = (int) window_get(mainFrame,WIN_Y);
        x += mainX;
        y += mainY;
    }
    width = (int) window_get(graphFrame, WIN_WIDTH);
    height = (int) window_get(graphFrame, WIN_HEIGHT);
    screen = pr_open("/dev/fb");
    if (screen == NULL) syserr("can't find framebuffer");
    framepr = mem_create(width, height, 1);
    pr_rop(framepr, 0, 0, width, height, PIX_SRC, screen, x, y);
    pr_dump(framepr, fp, NULL, RT_STANDARD, 1);

fclose(fp);
} void
graphWriteFile()
{
Panel_item       item;
Event            *event;

writeFileMain(item, event, graphCanvas, NULL);
} void
graphQuit()
{
    if (mainFrame)
    {
        panelMessage(graphMessage,clearMessage);
```

```
        graphClearCanvas();
        window_set(graphFrame, WIN_SHOW, FALSE, 0);
    }
    else
        window_destroy(graphFrame);

free (graphData);
    graphData = NULL;   /* the free knows only about "data", not "graphData";
                         * hence, graphInit() will try to free graphData
                         * if it is not NULL, resulting in a seg. fault! */
} void
graphScaleProc()
{
    if (!panel_get_value(graphScaleChoice))
    {   /* automatic scaling */
        graphAutoScale = 1;
        panelMessage(graphScaling, clearMessage);
    }
    else
    {   /* otherwise, do manual scaling */
        graphAutoScale = 0;
        if (!graphInputFrame)
            graphInputMenu();
        else
            window_set(graphInputFrame, WIN_SHOW, TRUE, 0);
        sprintf(varMessage,"X: %d to %d; Y: %d to %d\n", graphData->minX,
            graphData->maxX, graphData->minY, graphData->maxY);
        panelMessage(graphInputMessage,varMessage);
        panelMessage(graphScaling,varMessage);
    }
} graphInputMenu()
{
/* Frame            graphInputFrame;
 * Panel            graphInputPanel;    */
void            graphInputSelect();
void            graphInputQuit();
void            graphInputInit();

graphInputFrame = window_create(graphFrame, FRAME,
        WIN_X,              GRAPH_FRAME_WIDTH,
        WIN_Y,              100,
        WIN_WIDTH,          GRAPH_FRAME_WIDTH,
        WIN_HEIGHT,         75,
        0);
    graphInputPanel = window_create(graphInputFrame, PANEL, 0);
    graphInputMessage = panel_create_item(graphInputPanel, PANEL_MESSAGE,
        PANEL_ITEM_X,       0,
        PANEL_ITEM_Y,       ATTR_ROW(0),
        PANEL_LABEL_BOLD,   TRUE,
        PANEL_LABEL_STRING, "                                        ",
        PANEL_SHOW_ITEM,    FALSE,
        0);
    panel_create_item(graphInputPanel, PANEL_CHOICE,
        PANEL_ITEM_X,       0,
        PANEL_ITEM_Y,       ATTR_ROW(1),
        PANEL_LABEL_BOLD,   TRUE,
```

```
        PANEL_CHOICE_STRINGS,    "MinX", "MaxX", "MinY", "MaxY", 0,
        PANEL_NOTIFY_PROC,       graphInputSelect,
        0);
    panel_create_item(graphInputPanel, PANEL_BUTTON,
        PANEL_LABEL_IMAGE,
            panel_button_image(graphInputPanel,"Quit",5,0),
        PANEL_LABEL_BOLD,        TRUE,
        PANEL_NOTIFY_PROC,       graphInputQuit,
        0);
    graphInputText = panel_create_item(graphInputPanel, PANEL_TEXT,
        PANEL_ITEM_X,            0,
        PANEL_ITEM_Y,            ATTR_ROW(2),
        PANEL_LABEL_BOLD,        TRUE,
        PANEL_VALUE_DISPLAY_LENGTH,   20,
        PANEL_LABEL_STRING,      "                    ",
        PANEL_NOTIFY_PROC,       graphInputInit,
        0);
    window_fit_height(graphInputPanel);
    window_set(graphInputFrame, WIN_SHOW, TRUE, 0);
    panelMessage(graphInputMessage,inputStart);
    graphInputInit();
} void
graphInputSelect(selectItem, choice, event)
Panel_item      selectItem;
int             choice;
Event           *event;
{
    graphInputInit();
    switch(choice)
    {
    case 0:       /* replace MinX */
        graphData->minX = atoi(panel_get_value(graphInputText));
        break;
    case 1:       /* replace MaxX */
        graphData->maxX = atoi(panel_get_value(graphInputText));
        break;
    case 2:       /* replace MinY */
        graphData->minY = atoi(panel_get_value(graphInputText));
        break;
    case 3:       /* replace MaxY */
        graphData->maxY = atoi(panel_get_value(graphInputText));
        break;
    default:
        printf("Error in graphInputSelect: unknown choice");
    }
    sprintf(varMessage,"X: %d to %d; Y: %d to %d\n", graphData->minX,
        graphData->maxX, graphData->minY, graphData->maxY);
    panelMessage(graphInputMessage,varMessage);
    panelMessage(graphScaling,varMessage);
    panel_set_value(graphInputText,"");
} void
graphInputQuit()
{
    window_set(graphInputFrame, WIN_SHOW, FALSE, 0);
}
```

```
void
graphInputInit()
{
    panel_set(graphInputText, PANEL_LABEL_STRING, " Value:",
        PANEL_SHOW_ITEM,   TRUE,
        0);
} void
graphSelectType(selectedPanel, type, event)
Panel_item      selectedPanel;
int             type;
Event           *event;
{ graphClearCanvas();
    switch (type)
    {
    case 0:     /* display histogram */
        graphData->type = HISTOGRAM;
        break;
    case 1:     /* display curve */
        graphData->type = CURVE;
        break;
    case 2:     /* display points */
        graphData->type = POINTS;
        break;
    default:
        printf("error in graphSelectType: unknown plot type\n");
    }
    graphPlotData(graphData);
} graphClearCanvas()
{
    pw_writebackground(graphPw,0,0,graphCanvasWidth,graphCanvasHeight,PIX_
}

/*****************************
 *   Graphical routines      *
 *****************************/

DATA *
graphInit()
{
DATA            *data;
int             i;
/* char         *titleString;  */ if (graphData)  /* clean up previous stuff */
    {
        free (graphData);
        graphData = NULL;
    } data = (DATA *)calloc(1, sizeof(DATA));
    if (!data)
        syserr(" Malloc failure for data in graphInit in graph.c");
    data->n = 0;
    data->minX = data->maxX = data->minY = data->maxY = 0;
```

```
    data->scaleX = data->scaleY = 0.0;
    data->origX = data->origY = 0;
    data->type = HISTOGRAM;
    data->title = "";
    for (i = 0; i < GRAPH_ARRAY_SIZE; i++)
        data->x[i] = data->y[i] = 0;
    return(data);
} graphPutTitle(data, title)
DATA        *data;
char        *title;
{
    data->title = (char *)malloc(strlen(title) + 1);
    if (!data->title)
    {
        printf("Malloc error in graphPutTitle");
        return;
    }
    strcpy(data->title, title);
} graphPutData(data,x,y)
DATA        *data;
int         x,y;
{
    int         nextN;

nextN = data->n;
    if (nextN > (GRAPH_ARRAY_SIZE - 3))
    {
        if (!tooMuchData)  /* only print the message the first time */
        {
            printf("Error in graphPutData: too many data points\n");
            tooMuchData = 1;
        }
        return;
    }
    data->x[nextN] = x;
    data->y[nextN] = y;
    data->n++;
} graphPutType(data,type)
DATA        *data;
int         type;
{ data->type = type;
} graphPlotData(data)
DATA        *data;
{
int         errFlag, graphMinMax(), graphSetScale(), graphAxes();

if (!data)
    {
        printf("Error in graphPlotData: no data\n");
        return;
```

```c
    /* do preliminaries */
errFlag = graphGetMinMax(data);
if (errFlag)
{
    printf(" Error in graphPlotData from graphGetMinMax\n");
    return;
}
errFlag = graphSetScale(data);
if (errFlag)
{
    printf(" Error in graphPlotData from graphSetScale\n");
    return;
} graphClearCanvas();
panelMessage(graphMessage,clearMessage);
strcpy(varMessage,data->title);
panelMessage(graphMessage,varMessage);

sprintf(varMessage,"X: %d to %d; Y: %d to %d\n",
        data->minX, data->maxX, data->minY, data->maxY);
panelMessage(graphScaling,varMessage);

/* plot axes */
errFlag = graphAxes(data);
if (errFlag)
{
    printf(" Error in graphPlotData from graphAxes\n");
    return;
}

/* plot data */
switch (data->type)
{
case POINTS:
    graphPoints(data);
    break;
case CURVE:
    graphCurve(data);
    break;
case HISTOGRAM:
    graphHistogram(data);
    break;
default:
    printf(" Error in graphPlotData: plot type unknown\n");
    break;
}
} int
graphGetMinMax(data)
DATA        *data;
{
int         i;

if (!data)
    {
        printf("Error in graphGetMinMax:  no data\n");
```

```
        return(1);
    } if (!data->n)
    {
        printf("Error in graphGetMinMax: no datapoints\n");
        return(1);
    } if (!graphAutoScale)   /* if manual, do not reset min and max */
        return(0);

data->minX = data->minY = 1000000000;
    data->maxX = data->maxY = -1000000000;
    for (i = 0; i < data->n; i++)
    {
        data->minX = Min(data->x[i], data->minX);
        data->maxX = Max(data->x[i], data->maxX);
        data->minY = Min(data->y[i], data->minY);
        data->maxY = Max(data->y[i], data->maxY);
    }
#if DEBUG
    printf("MinX = %d; MaxX = %d; MinY = %d; MaxY = %d\n",
        data->minX, data->maxX, data->minY, data->maxY);
#endif DEBUG
    return(0);
} int
graphSetScale(data)
DATA        *data;
{
int         maxX, minX, maxY, minY, rangeX, rangeY;
int         signMaxX, signMinX, signMaxY, signMinY;
float       scaleX, scaleY;

if (!data)
    {
        printf("Error in graphSetScale:  no data\n");
        return(1);
    } minX = data->minX;
    maxX = data->maxX;
    minY = data->minY;
    maxY = data->maxY;
    signMinX = Sign(minX);
    signMaxX = Sign(maxX);
    signMinY = Sign(minY);
    signMaxY = Sign(maxY);
    if (graphAutoScale)
    {   /* always include 0 in range */
        if (signMinX * signMaxX >= 0)
        {   /* they're either both positive or both negative */
            if (signMaxX > 0)
            {   /* plot from zero to max */
                rangeX = maxX;
                data->origX = 0;
            }
```

```
            else
            {   /* plot from min to zero */
                rangeX = -minX;
                data->origX = minX;
            }
        }
        else
        {   /* plot from min to max */
            rangeX = maxX - minX;
            data->origX = minX;
        } if (signMinY * signMaxY >= 0)
        {   /* they're either both positive or both negative */
            if (signMaxY > 0)
            {   /* plot from zero to max */
                rangeY = maxY;
                data->origY = 0;
            }
            else
            {   /* plot from min to zero */
                rangeY = -minY;
                data->origY = minY;
            }
        }
        else
        {   /* plot from min to max */
            rangeY = maxY - minY;
            data->origY = minY;
        }
    }
    else
    {   /* take the range as given */
        rangeX = maxX - minX;
        data->origX = minX;
        rangeY = maxY - minY;
        data->origY = minY;
    }
#if DEBUG
    printf("rangeX = %d; rangeY = %d\n", rangeX, rangeY);
    printf("origX = %d; origY = %d\n", data->origX, data->origY);
endif DEBUG if (!rangeX || !rangeY)
    {
        printf("Error in graphSetScale: some range = 0\n");
        return(1);
    }

/* allows expansion of canvas by resizing window */
    graphCanvasWidth = (int) window_get(graphCanvas, WIN_WIDTH);
    graphCanvasHeight = (int) window_get(graphCanvas, WIN_HEIGHT);

scaleX = (graphCanvasWidth - 2 * MARGIN) / ((float) rangeX);
    scaleY = (graphCanvasHeight - 2 * MARGIN) / ((float) rangeY);
    data->scaleX = scaleX;
    data->scaleY = scaleY;
#if DEBUG
    printf(" scaleX = %-.3f; scaleY = %-.3f\n",scaleX,scaleY);
#endif DEBUG
```

```
    return(0);
} int
graphAxes(data)
DATA        *data;
{
int         errFlag, graphSetScale(), op, left, top, right, bottom;
int         i, graphCanCoord(), axisX, axisY, centerX, centerY, canX, canY;
int         extentX, extentY, exponX, exponY, factorX, factorY, ticX, ticY;
float       scaleX, scaleY;
struct rect r;

if (!data)
    {
        printf("Error in graphAxes:  no data\n");
        return(1);
    } scaleX = data->scaleX;
    scaleY = data->scaleY;
    if (!scaleX || !scaleY)
    {
        errFlag = graphSetScale(data);
        if (errFlag)
        {
            printf(" Error in graphAxes from graphSetScale\n");
            return(1);
        }
        scaleX = data->scaleX;
        scaleY = data->scaleY;
    } op = PIX_SET;
    centerX = graphCanvasWidth >> 1;
    centerY = graphCanvasHeight >> 1;
    extentX = Max(Abs(data->maxX), Abs(data->minX));
    extentY = Max(Abs(data->maxY), Abs(data->minY));
    exponX = (int) log10 ((double) extentX);
    exponY = (int) log10 ((double) extentY);
    factorX = (int) pow(10.,(double) exponX);
    factorY = (int) pow(10.,(double) exponY);
#if DEBUG
    printf("extentX = %d,extentY = %d,exponX = %d,exponY = %d\n",
        extentX, extentY, exponX, exponY);
    printf("factorX = %d,factorY = %d\n",factorX,factorY);
#endif DEBUG
    left = MARGIN;
    right = graphCanvasWidth - MARGIN;
    top = MARGIN;
    bottom = graphCanvasHeight - MARGIN;
    axisX = graphCanCoord(0, data->origY, scaleY, YAXIS);
    axisY = graphCanCoord(0, data->origX, scaleX, XAXIS);
    pw_get_region_rect(graphPw,&r);
    pw_lock(graphPw,&r);
    if (graphAutoScale || graphCanClip(centerX, axisY))  /* x-axis within canvas */
        pw_vector(graphPw, left, axisX, right, axisX, op, 1);
    if (graphAutoScale || graphCanClip(axisY, centerY))  /* y-axis within canvas */
        pw_vector(graphPw, axisY, top, axisY, bottom, op, 1);
```

```c
    for (i = -10; i<=10; i++)
    {   /* draw clipped tics */
        ticX = i * factorX;
        ticY = i * factorY;
        canX = graphCanCoord(ticX, data->origX, scaleX, XAXIS);
        canY = graphCanCoord(ticY, data->origY, scaleY, YAXIS);
        if (graphCanClip(canX, axisX))
            graphDrawPoint(canX, axisX, 4, op);
        if (graphCanClip(axisY, canY))
            graphDrawPoint(axisY, canY, 4, op);
    }
    pw_unlock(graphPw);
    return(0);
} graphPoints(data)
DATA        *data;
{
int         errFlag, graphCheck(), graphCanCoord();
int         i, op, canX, canY;
float       scaleX, scaleY;
struct rect r;

errFlag = graphCheck(data);
    if (errFlag)
    {
        printf(" Error in graphCurve from graphCheck\n");
        return;
    } scaleX = data->scaleX;
    scaleY = data->scaleY;
    op = PIX_SET;
    pw_get_region_rect(graphPw,&r);
    pw_lock(graphPw,&r);
    for (i = 0; i < data->n; i++)
    {
        canX = graphCanCoord(data->x[i], data->origX, scaleX, XAXIS);
        canY = graphCanCoord(data->y[i], data->origY, scaleY, YAXIS);
        if (graphAutoScale || graphCanClip(canX, canY))
            graphDrawPoint(canX, canY, 2, op);
    }
    pw_unlock(graphPw);
} graphCurve(data)
DATA        *data;
{
int         errFlag, graphCheck(), graphCanCoord();
int         i, op, oldX, oldY, newX, newY;
float       scaleX, scaleY;
struct rect r;

errFlag = graphCheck(data);
    if (errFlag)
    {
        printf(" Error in graphCurve from graphCheck\n");
        return;
    }
```

```
    scaleX = data->scaleX;
    scaleY = data->scaleY;
    op = PIX_SET;
    oldX = graphCanCoord(data->x[0], data->origX, scaleX, XAXIS);
    oldY = graphCanCoord(data->y[0], data->origY, scaleY, YAXIS);
    pw_get_region_rect(graphPw,&r);
    pw_lock(graphPw,&r);
    for (i = 1; i < data->n; i++)
    {
        newX = graphCanCoord(data->x[i], data->origX, scaleX, XAXIS);
        newY = graphCanCoord(data->y[i], data->origY, scaleY, YAXIS);
        if (graphAutoScale ||
               (graphCanClip(oldX, oldY) && graphCanClip(newX, newY)))
            pw_vector(graphPw, oldX, oldY, newX, newY, op, 1);
        oldX = newX;
        oldY = newY;
    }
    pw_unlock(graphPw);
} graphHistogram(data)
DATA        *data;
{
int         errFlag, graphCheck(), graphCanCoord();
int         i, op, canX, canY, onAxisY;
float       scaleX, scaleY;
struct rect r;

errFlag = graphCheck(data);
    if (errFlag)
    {
        printf(" Error in graphCurve from graphCheck\n");
        return;
    } scaleX = data->scaleX;
    scaleY = data->scaleY;
    op = PIX_SET;
    onAxisY = graphCanCoord(0, data->origY, scaleY, YAXIS);
    pw_get_region_rect(graphPw,&r);
    pw_lock(graphPw,&r);
    for (i = 0; i < data->n; i++)
    {
        canX = graphCanCoord(data->x[i], data->origX, scaleX, XAXIS);
        canY = graphCanCoord(data->y[i], data->origY, scaleY, YAXIS);
        if (graphAutoScale ||
               (graphCanClip(canX, canY) && graphCanClip(canX, onAxisY)))
            pw_vector(graphPw, canX, canY, canX, onAxisY, op, 1);
    }
    pw_unlock(graphPw);
}

/*
 *  graphCanCoord():  returns the canvas pixel coordinate value,
 *                    relative to the upper-left corner (minus the
 *                    MARGIN) of the canvas.
 *                    when the "val" is at the "orig", the canvas
 *                    coordinate returned is the lower-left corner
 *                    (minus the MARGIN) of the canvas!
```

```
*/
int
graphCanCoord(val, orig, scale, axis)
double          scale;
int             val, orig, axis;
{
int             canCoord;

switch(axis)
    {
    case XAXIS:
        canCoord = MARGIN + scale * (val - orig);
        return(canCoord);
        break;
    case YAXIS:
        canCoord = (graphCanvasHeight - MARGIN) - scale * (val - orig);
        return(canCoord);
        break;
    default:
        printf("Error in graphCanCoord: unknown axis type\n");
    }
} int
graphCanClip(canX, canY)
int             canX, canY;
{   /* returns 1 if within margined canvas */
    if (canX >= MARGIN && canX <= (graphCanvasWidth - MARGIN)
            && canY >= MARGIN && canY <= (graphCanvasHeight - MARGIN))
        return(1);
    else
        return(0);
} graphDrawPoint(canX, canY, size, op)
int             canX, canY, size, op;
{
int             left, right, top, bottom;

/* this is for a plus sign */
    left = canX - size;
    right = canX + size;
    top = canY - size;
    bottom = canY + size;
    pw_vector(graphPw, left, canY, right, canY, op, 1);
    pw_vector(graphPw, canX, top, canX, bottom, op, 1);
} int
graphCheck(data)
DATA            *data;
{
int             errFlag, graphSetScale();
float           scaleX, scaleY;

if (!data)
    {
        printf(" Error in graphCheck: no data\n");
        return(1);
    }
```

```
    scaleX = data->scaleX;
    scaleY = data->scaleY;
    if (!scaleX || !scaleY)
    {
        errFlag = graphSetScale(data);
        if (errFlag)
        {
            printf(" Error in graphCheck from graphSetScale: no range\n");
            return(1);
        }
    } if (!data->n)
    {
        printf(" Error in graphCheck:  no data points\n");
        return(1);
    } return(0);   /* OK */
} graphTestExample()
{
DATA        *testData, *graphInit();
int          i, x, y;

/* initialize graph */
    testData = graphInit();

/* input data into fields */
    graphPutTitle(testData,"Example Data");
    for (i = -50; i <= 50; i++)
    {
        x = 2 * i;
        y = x * Abs(x);
        graphPutData(testData,x,y);
    }
    graphPutType(testData,HISTOGRAM);
    graphMake(testData);
}

/*****************************************************************
 * Copyright (c) 1989, Xerox Corporation.  All rights reserved. *
 * Copyright protection claimed includes all forms and matters
 * of copyrightable material and information now allowed by
 * statutory or judicial law or hereafter granted, including
 * without limitation, material generated from the software
 * programs which are displayed on the screen such as icons,
 * screen display looks, etc.
 *****************************************************************/

/*
 * coordsA.c: includes subroutines
 *             --createCoords():  creates struct and associated arrays
 *             --destroyCoords(): frees arrays and returns NULL ptr
 *             --xformCoords():   translation and scaling
 *             --storeCoords():   stores ON pixels in a pixrect
 *             --printCoords():   prints coord pairs
 *             --displayCoords(): writes coord to a pixrect
 *             --displayArray():  writes coordinated array to a pixrect
 *             --writeCoords():   writes formatted to file
 *             --readCoords():    reads formatted from a file
 *             --coordsToBoxes():
 */
```

```
#include <stdio.h>
include <llama.h>
#include <imageReps.h>
#include "alpaca.h"
#include "morph.h"
#include "strelGlobals.h"

static char             message[50];

/*
 *  createCoords():  takes the number of coordinate pairs, and returns
 *                   a COORDS data structure.
 */
COORDS *
createCoords(numPts)
int         numPts;
{
COORDS      *coords;
int         *x, *y;

coords = (COORDS *) calloc(1, sizeof(COORDS));
    x = (int *) calloc(numPts, sizeof(int));
    y = (int *) calloc(numPts, sizeof(int));
    if (!coords || !x || !y)
    {
        printf(" Error in createCoords(): malloc failure!\n");
        return NULL;
    }
    coords->x = x;
    coords->y = y;
    coords->n = numPts;

return (coords);
}
/*
 *  destroyCoords():  frees the storage and returns a NULL pointer
 */
COORDS *
destroyCoords(coords)
COORDS      *coords;
{ if (!coords)
    {
        printf(" Error in destroyCoords: COORDS structure not defined\n");
        return NULL;
    } free(coords->x);
    free(coords->y);
    free(coords);
    return NULL;
}

/*
 *  xformCoords()
 */
COORDS *
xformCoords(coords, shiftX, shiftY, scale)
COORDS      *coords;
int         shiftX, shiftY, scale;
{
int         i, numPts;
COORDS      *coordsOut, *createCoords();
```

```
    if (!coords)
    {
        printf(" Error in xformCoords: no COORDS structure\n");
        return NULL;
    } numPts = coords->n;
    coordsOut = createCoords(numPts);
    if (!coordsOut)
    {
        printf(" Error in xformCoords: coordsOut not created\n");
        return NULL;
    }

/* shift the origin and then scale */
    for (i = 0; i < numPts; i++)
    {
        coordsOut->x[i] = scale * (coords->x[i] + shiftX);
        coordsOut->y[i] = scale * (coords->y[i] + shiftY);
    } return (coordsOut);
}

/*
 *  storeCoords():  takes a pixrect, creates a COORDS data structure,
 *                  places the coordinates of the ON pixels in the
 *
 *                  data structure, and returns the COORDS struct.
 */
COORDS *
storeCoords(pixr)
Pixrect         *pixr;
{
COORDS          *coords, *createCoords();
int              numPts, h, Bpl, arrayIndex, i, j, k, x1, x2;
unsigned char   *bytePtr, byte;
static char      procName[] = "storeCoords";

if (!isPrDefined(pixr, procName))
        return NULL;

numPts = numberPr(pixr, PIXELS);

coords = createCoords(numPts);
    if (!coords)
        return NULL;

Bpl = prBytesPerLine(pixr);
    h = pixr->pr_size.y;
    bytePtr = (unsigned char *) mpr_d(pixr)->md_image;
    arrayIndex = 0;
    for (i = 0; i < h; i++)
        for (j = 0; j < Bpl; j++)
        {
            byte = *bytePtr;
            if (byte)  /* extract the coordinates of the ON pixels */
            {
                x1 = 8 * j;
                x2 = x1 + 8;
                for (k = x1; k < x2; k++)
                    if (pr_get(pixr, k, i) == 1)
```

```
                    {
                        coords->x[arrayIndex] = k;
                        coords->y[arrayIndex] = i;
                        arrayIndex++;
                    }
                }
                bytePtr++;
            } if (arrayIndex != numPts)
        printf(" Error in storeCoords(): %d ON pixels, %d coord pairs!!\n",
                numPts, arrayIndex);

return (coords);
}

/*
 * printCoords()
 */
printCoords(coords)
COORDS       *coords;
{
int          numPts, i;

if (!coords)

{
        printf(" Error in printCoords(): no COORD data structure\n");
        return;
    } numPts = coords->n;
    printf("      ");
    for (i = 0; i < numPts; i++)
    {
        printf("(%d,%d) ", coords->x[i], coords->y[i]);
        if (((i+1) % 6) == 0)
            printf("\n      ");
    }
    printf("\n");
}

/*
 * displayCoords():  writes pixels from input COORDS structure onto pixrect.
 */
displayCoords(pixr, coords)
Pixrect      *pixr;
COORDS       *coords;
{
int          i, numPts;
static char  procName[] = "displayCoords";

if (!isPrDefined(pixr, procName))
        return;

if (!coords)
    {
        printf(" Error in displayCoords(): COORDS structure not defined\n");
        return;
```

```
    } numPts = coords->n;
    clearPr(pixr);
    for (i = 0; i < numPts; i++)
        pr_put(pixr, coords->x[i], coords->y[i], 1);
}

/*
 * displayArray():  displays in a pixrect a binary array, at the locations
 *                  specified by a COORDS structure.  Useful for debugging.
 *          Note: number of points in COORDS should equal array size,
 *                but this cannot be checked.
 */
displayArray(pixr, coords, array)
Pixrect         *pixr;
COORDS          *coords;
unsigned char   *array;
{
int             i, numPts;
static char     procName[] = "displayArray";

if (!isPrDefined(pixr, procName))
        return;

if (!coords || !array)
    {
        printf(" Error in displayArray(): input data structure not defined\n");
        return;
    } numPts = coords->n;
    clearPr(pixr);
    for (i = 0; i < numPts; i++)
        pr_put(pixr, coords->x[i], coords->y[i], array[i]);
}

/*
 * writeCoords():  formatted write of a COORDS structure to named file
 */
writeCoords(filename, coords)
char        *filename;
COORDS      *coords;
{
int         n, i;
FILE        *fp;

if (!coords)
    {
        printf(" Error in writeCoords: no COORDS data structure\n");
        return 1;
    } fp = fopen(filename, "w");
    if (!fp)
    {
        printf(" Error in writeCoords: failure to open %s\n", filename);
        return 1;
    } n = coords->n;
    fprintf(fp, " Number of points: %d\n", n);
    fprintf(fp, " Coords:\n   ");
    for (i = 0; i < n; i++)
```

```c
{
    fprintf(fp, "(%d,%d) ", coords->x[i], coords->y[i]);
    if (i % 5 == 4) fprintf(fp, "\n    ");
}
fprintf(fp, "\n");

fclose(fp);
}

/*
 * readCoords():  formatted read of a COORDS structure from named file;
 *                returns the structure.
 */
COORDS *
readCoords(filename)
char        *filename;
{
int         n, i, xcoord, ycoord;
FILE        *fp;

COORDS      *coords, *createCoords();

fp = fopen(filename, "r");
    if (!fp)
    {
        printf(" Error in readCoords: failure to open %s\n", filename);
        return NULL;
    } fscanf(fp, " Number of points: %d\n", &n);
    coords = createCoords(n);
    fscanf(fp, " Coords:\n    ");
    for (i = 0; i < n; i++)
    {
        fscanf(fp, "(%d,%d) ", &coords->x[i], &coords->y[i]);
        if (i % 5 == 4) fscanf(fp, "\n    ");
    } fclose(fp);

return (coords);
}

/*
 * coordsToBoxes()
 */
BOXES *
coordsToBoxes(coords)
COORDS      *coords;
{
int         *x1, *x2, *y1, *y2;
int         numPts, numRects, i, j, index, x, y, found;
BOXES       *boxes, *createBoxes();

if (!coords)
    {
        printf(" Error in coordsToBoxes: COORDS struct undefined\n");
        return NULL;
```

```
} numPts = coords->n;
if (numPts % 4)    /* not evenly divisible by 4 */
{
    printf(" Error in coordsToBoxes: npts = %d not div. by 4\n", numPts);
    return NULL;
} numRects = numPts / 4;
boxes = createBoxes(numRects);
if (!boxes)
    return NULL;

/* make arrays of integers for UL and LR corners of rects */
x1 = (int *) calloc(numRects, sizeof(int));
x2 = (int *) calloc(numRects, sizeof(int));
y1 = (int *) calloc(numRects, sizeof(int));
y2 = (int *) calloc(numRects, sizeof(int));
if (!x1 || !y1 || !x2 || !y2)
{
    printf(" Error in coordsToBoxes: calloc failure for coord. array\n");
    return NULL;
} index = 0;
for (i = 0; i < numPts; i++)
{   /* go through each set of 2 coord pairs */
    x = coords->x[i];
    y = coords->y[i];
    found = FALSE;
    for (j = 0; j < index; j++)   /* search rects already started */
        if ((x == x1[j]) && !y2[j])   /* associated with rect j */
        {
            found = TRUE;
            y2[j] = y;
            if (coords->x[i] != x1[j])
            {
                printf(" Warning in coordsToBoxes, in rect %d:\n", j);
                printf("   x-coords of points 1 and 3: (%d) and (%d)\n",
                    x1[j], coords->x[i]);
            }
            i++;  /* go to the last point in the rect; check that it's
                     OK */
            if (coords->x[i] != x2[j])
            {
                printf(" Warning in coordsToBoxes, in rect %d:\n", j);
                printf("   x-coords of points 2 and 4: (%d) and (%d)\n",
                    x2[j], coords->y[i]);
            }
            if (coords->y[i] != y2[j])
            {
                printf(" Warning in coordsToBoxes, in rect %d:\n", j);
                printf("   y-coords of points 3 and 4: (%d) and (%d)\n",
                    y2[j], coords->y[i]);
            }
            break;   /* don't look at any more rectangles */
        }
    if (!found)   /* start a new rect */
    {
        if (index == numRects)   /* check for overflow: this can happen
                                  * if x coords of 1st and 3rd pts differ */
```

```c
    {
        printf(" Error in coordsToBoxes: too many rects\n");
        return NULL;
    }
    xl[index] = x;
    yl[index] = y;
    i++;   /* get the next point */
    x2[index] = coords->x[i];
    if (coords->y[i] != y)
    {
        printf(" Warning in coordsToBoxes, in rect %d:\n", index);
        printf("   y-coords of points 1 and 2: (%d) and (%d)\n",
            y, coords->y[i]);
    }
    index++;  /* increment to point to the first empty rect
             * in the set of 4 arrays   */
        }
    }

/* transfer data from arrays to BOXES struct */
    for (i = 0; i < numRects; i++)
    {
        boxes->rect[i]->x = xl[i];
        boxes->rect[i]->y = yl[i];
        boxes->rect[i]->w = x2[i] - xl[i] + 1;
        boxes->rect[i]->h = y2[i] - yl[i] + 1;
    }

/* finish up */
    free(xl);
    free(yl);
    free(x2);
    free(y2);
    return (boxes);
}

/****************************************************************
 * Copyright (c) 1989, Xerox Corporation.  All rights reserved.  *
   Copyright protection claimed includes all forms and matters
   of copyrightable material and information now allowed by
   statutory or judicial law or hereafter granted, including
   without limitation, material generated from the software
   programs which are displayed on the screen such as icons,
   screen display looks, etc.
 ****************************************************************/

/*
 * boxesA.c:  includes subroutines
 *            --createBoxes():  creates struct, pointers, and RECT arrays
 *            --xformBoxes():   translation and scaling
 *            --printBoxes():   prints formatted boxes
 *            --displayBoxes(): writes outline of each RECT to a pixrect
 *            --writeBoxes():   writes formatted to a file
 *            --readBoxes():    reads formatted from a file
 *            --boxesToCoords(): makes coords struct of UL corners
 */ include <stdio.h>
include <llama.h>
#include <imageReps.h>
#include "alpaca.h"
#include "morph.h"
#include "strelGlobals.h"
```

```c
static char          message[50];

/*
 * createBoxes():  takes the number of Rects, and returns a BOXES data
 *                 structure, that has all the rects pre-allocated.
 */
BOXES *
createBoxes(numRects)
int          numRects;
{
int          i;
BOXES        *boxes;

/* make the boxes structure */
    boxes = (BOXES *) calloc(1, sizeof(BOXES));
    if (!boxes)
    {
        printf(" Error in createBoxes: calloc failure for boxes\n");
        return NULL;
    }
    boxes->n = numRects;

/* make the array of pointers to rects, and then make the
       array of rects */
    boxes->rect = (RECT **) calloc(numRects, sizeof(RECT *));
    for (i = 0; i < numRects; i++)
    {
        boxes->rect[i] = (RECT *) calloc(1, sizeof(RECT));
        if (!boxes->rect[i])
        {
            printf(" Error in createBoxes: calloc failure for rect\n");

return NULL;
        }
    } return (boxes);
}

/*
 * xformBoxes()
 */
BOXES *
xformBoxes(boxes, shiftX, shiftY, scale)
BOXES        *boxes;
int          shiftX, shiftY, scale;
{
int          i, numRects;
BOXES        *boxesOut, *createBoxes();

if (!boxes)
    {
        printf(" Error in xformBoxes: no BOXES structure\n");
        return NULL;
    } numRects = boxes->n;
    boxesOut = createBoxes(numRects);
    if (!boxesOut)
    {
        printf(" Error in xformBoxes: boxesOut not created\n");
        return NULL;
```

```c
    }

/* shift the origin and then scale */
    for (i = 0; i < numRects; i++)
    {
        boxesOut->rect[i]->x = Max(0, boxes->rect[i]->x + shiftX);
        boxesOut->rect[i]->y = Max(0, boxes->rect[i]->y + shiftY);
        boxesOut->rect[i]->x *= scale;
        boxesOut->rect[i]->y *= scale;
        boxesOut->rect[i]->w = boxes->rect[i]->w * scale;
        boxesOut->rect[i]->h = boxes->rect[i]->h * scale;
    } return (boxesOut);
}

/*
 *  printBoxes()
 */
printBoxes(boxes)
BOXES       *boxes;
{
int             numRects, i;

if (!boxes)
    {
        printf(" Error in printBoxes(): no BOXES data structure\n");
        return;
    } numRects = boxes->n;
    printf(" Number of rectangles = %d\n", numRects);
    for (i = 0; i < numRects; i++)
        printf("    (%d,%d,%d,%d)\n", boxes->rect[i]->x, boxes->rect[i]->y,
                boxes->rect[i]->w, boxes->rect[i]->h);
}

/*
 *  displayBoxes():  writes rectangle outline for each RECT onto a pixrect.
 */
displayBoxes(pixr, boxes)
Pixrect     *pixr;
BOXES       *boxes;
{
int             i, numRects, x1, y1, x2, y2;
static char     procName[] = "displayBoxes";

if (!isPrDefined(pixr, procName))
        return;

if (!boxes)
    {
        printf(" Error in displayBoxes(): BOXES structure not defined\n");
        return;
    } numRects = boxes->n;
    clearPr(pixr);
    for (i = 0; i < numRects; i++)
    {
```

```
        x1 = boxes->rect[i]->x;
        y1 = boxes->rect[i]->y;
        x2 = x1 + boxes->rect[i]->w - 1;
        y2 = y1 + boxes->rect[i]->h - 1;
        pr_vector(pixr, x1, y1, x2, y1, PIX_SET, 1);
        pr_vector(pixr, x2, y1, x2, y2, PIX_SET, 1);
        pr_vector(pixr, x2, y2, x1, y2, PIX_SET, 1);
        pr_vector(pixr, x1, y2, x1, y1, PIX_SET, 1);
    }
}

/*
 * writeBoxes():  formatted write of a BOXES structure to named file
 */
writeBoxes(filename, boxes)
char         *filename;
BOXES        *boxes;
{
int          n, i, x, y, w, h;
FILE         *fp;

if (!boxes)
    {
        printf(" Error in writeBoxes: no BOXES data structure\n");
        return 1;
    } fp = fopen(filename, "w");
    if (!fp)
    {
        printf(" Error in writeBoxes: failure to open %s\n", filename);
        return 1;
    } n = boxes->n;
    fprintf(fp, " Number of boxes: %d\n", n);
    for (i = 0; i < n; i++)
    {
        fprintf(fp, "   Box %d:\n", i + 1);
        x = boxes->rect[i]->x;
        y = boxes->rect[i]->y;
        w = boxes->rect[i]->w;
        h = boxes->rect[i]->h;
        fprintf(fp, "       (%d,%d,%d,%d)\n", x, y, w, h);
    } fclose(fp);
}

/*
 * readBoxes():  formatted read of a BOXES structure from named file;
 *               returns the structure.
 */
BOXES *
readBoxes(filename)
char         *filename;
{
int          n, i, x, y, w, h, tmp;
FILE         *fp;
BOXES        *boxes, *createBoxes();
```

```c
    fp = fopen(filename, "r");
    if (!fp)
    {
        printf(" Error in readBoxes: failure to open %s\n", filename);
        return NULL;
    } fscanf(fp, " Number of boxes: %d\n", &n);
    boxes = createBoxes(n);
    for (i = 0; i < n; i++)
    {
        fscanf(fp, "    Box %d:\n", &tmp);
        fscanf(fp, "      -(%d,%d,%d,%d)\n", &x, &y, &w, &h);
        boxes->rect[i]->x = x;
        boxes->rect[i]->y = y;
        boxes->rect[i]->w = w;
        boxes->rect[i]->h = h;
    } fclose(fp);

return (boxes);
}

/*
 *  boxesToCoords():   returns the UL corners of each rect, in
 *                     a COORDS data structure.
 */
COORDS *
boxesToCoords(boxes)
BOXES       *boxes;
{
int         i, n;
COORDS      *coords, *createCoords();

if (!boxes)
    {
        printf(" Error in boxesToCoords: no BOXES data structure\n");
        return NULL;
    } n = boxes->n;
    coords = createCoords(n);
    for (i = 0; i < n; i++)
    {
        coords->x[i] = boxes->rect[i]->x;
        coords->y[i] = boxes->rect[i]->y;
    } return coords;
```

```
/******************************************************************
 * Copyright (c) 1989, Xerox Corporation.  All rights reserved. *
   Copyright protection claimed includes all forms and matters
   of copyrightable material and information now allowed by
   statutory or judicial law or hereafter granted, including
   without limitation, material generated from the software
   programs which are displayed on the screen such as icons,
   screen display looks, etc.
 ******************************************************************/

/*
 * tile.c--includes subroutines
 *                 createTile()
 *                 displayTile()
 *                 destroyTile()
 *
 *                 rectOfPixrect()
 */ include <stdio.h>
include <llama.h>
#include <imageReps.h>
#include "alpaca.h"
#include "morph.h"

static char    message[80];

/*
 * createTile()
 */
PRTILE *
createTile(pixr, nx, ny)
Pixrect         *pixr;
int             nx, ny;
{
int             i, j, w, h, x, y;
PRTILE          *prtile;
Pixrect         ***tile;
static char     procName[] = "createTile";

if (!isPrDefined(pixr, procName))
        return NULL;

tile = (Pixrect ***) calloc(ny, sizeof(Pixrect **));
    if (!tile)
    {
        printf(" Error in createTile: calloc failure for row ptrs\n");
        return NULL;
    } for (i = 0; i < nx; i++)
    {
        tile[i] = (Pixrect **) calloc(nx, sizeof(Pixrect *));
        if (!tile[i])
        {
            printf(" Error in createTile: calloc failure for ptrs in row\n");
            return NULL;
        }
```

```
    w = pixr->pr_size.x / nx;    /* width of each tile */
    h = pixr->pr_size.y / ny;    /* height of each tile */
    for (i = 0; i < ny; i++)
    {
        y = i * h;
        for (j = 0; j < nx; j++)
        {
            x = j * w;
            tile[i][j] = mem_create(w, h, 1);
            if (!tile[i][j])
            {
                printf(" Error in createTile: mem_create failure for tile\n");
                return NULL;
            }
            pr_rop(tile[i][j], 0, 0, w, h, PIX_SRC, pixr, x, y);
        }
    } prtile = (PRTILE *) calloc(1, sizeof(PRTILE));
    prtile->nx = nx;
    prtile->ny = ny;
    prtile->w = w;
    prtile->h = h;
    prtile->tile = tile;

return (prtile);

/*
 * displayTile()
 */
displayTile(pixr, prtile)
Pixrect       *pixr;
PRTILE        *prtile;
{
int           nx, ny, w, h, x, y, i, j;
static char   procName[] = "displayTile";

if (!isPrDefined(pixr, procName))
        return 1;

if (!prtile)
    {
        printf(" Error in displayTile: PRTILE structure not defined\n");
        return 1;
    } nx = prtile->nx;
    ny = prtile->ny;
    w = prtile->w;
    h = prtile->h;

if ((nx * w > pixr->pr_size.x) || (ny * h > pixr->pr_size.y))
    {
        printf(" Error in displayTile: destination pr too small for tiles\n");
        return 1;
    }
```

```
    clearPr(pixr);

for (i = 0; i < ny; i++)
    {
        y = i * h;
        for (j = 0; j < nx; j++)
        {
            x = j * w;
            pr_rop(pixr, x, y, w, h, PIX_SRC, prtile->tile[i][j], 0, 0);
            opPrPw(pw6, pixr, COPY);
        }
    } return 0;
}

/*
 *  destroyTile()
 */
PRTILE *
destroyTile(prtile)
PRTILE    *prtile;
{
int         nx, ny, i, j;
Pixrect    ***tile;

if (!prtile)
    {
        printf(" Error in destroyTile:  PRTILE structure not defined\n");
        return NULL;
    } nx = prtile->nx;
    ny = prtile->ny;
    tile = prtile->tile;
    for (i = 0; i < ny; i++)
    {
        for (j = 0; j < nx; j++)
            pr_close(tile[i][j]);
        free(tile[i]);
        tile[i] = NULL;
    }
    free(tile);
    free(prtile);

return NULL;
}

/*
 *  rectOfPixrect():  returns the rect part of a pixrect, if valid; else NULL.
 */
Pixrect *
rectOfPixrect(pixr, rect)
Pixrect     *pixr;
RECT        *rect;
{
int         w, h;
Pixrect     *pixrOut;
```

```
static char     procName[] = "rectOfPixrect";

if (!isPrDefined(pixr,'procName))
        return NULL;

if (!rect)
    {
        printf(" Error in rectOfPixrect: rect not defined\n");
        return NULL;
    } w = pixr->pr_size.x;
    h = pixr->pr_size.y;
    if ((rect->x + rect->w > w) || (rect->y + rect->h) > h)
    {
        printf(" Error in rectOfPixrect: rect not valid size\n");
        return NULL;
    } pixrOut = mem_create(rect->w, rect->h, 1);
    if (!pixrOut)
    {
        printf(" Error in rectOfPixrect: pixrOut not created\n");
        return NULL;
    } pr_rop(pixrOut, 0, 0, rect->w, rect->h, PIX_SRC, pixr, rect->x, rect->y);
    return pixrOut;
}
```

What is claimed is:

1. A method of determining skew of an image in an optical character recognition device (OCR) comprising the steps of optically scanning a document to produce an image of said document, said image in the form of a digital data structure; reducing said image using a thresholded reduction, said thresholded reduction mapping N×N squares of pixels into a destination image, said destination image having an ON pixel when a number of ON pixels in said square is equal to or greater than a threshold value; determining a variance in a number of ON pixels in at least one scanline of said image as a function of document rotation angle, said variance including the sum of the number of ON pixels in said at least one scan line raised to a power greater than one, said skew located at a document rotation angle at which said variance is substantially a maximum; rotating said image about an angle of about said skew to produce a deskewed image of said document; and identifying characters in said deskewed image of said document.

2. A method of determining skew of an image in an optical character recognition device (OCR) comprising the steps of optically scanning a document to produce an image of said document, said image in the form of a digital data structure; reducing said image using a thresholded reduction, said thresholded reduction mapping N×N squares of pixels into a destination image, said destination image having an OFF pixel when the number of OFF pixels in said square is equal to or greater than a threshold value; determining a variance in a number of OFF pixels in at least one scanline of said image as a function of document rotation angle, said variance including the sum of the number of OFF pixels in said at least one scanline raised to a power greater than one, said skew located at a document rotation angle at which said variance is substantially a maximum; rotating said image about an angle of about said skew to produce a deskewed image of said document; and identifying characters in a deskewed image of said document.

3. The method as recited in claims 1, or 2, wherein substantially all of the scanlines in a document are included the calculation of said variance.

4. The method as recited in claims 1, or 2, wherein document rotation angles are simulated by a vertical shear of said image.

5. The method as recited in claims 1, or 2, wherein variance is calculated through a range of about +5 to −5 degrees of rotation.

6. The method as recited in claims 1, or 2, wherein variance is calculated at increments of about 0.2 degrees of rotation.

7. The method as recited in claim 1 or 2 wherein said step of rotating using at least about two orthoganal shears.

8. The method as recited in claim 1 or 2 further comprising the step of identifying characters in said deskewed document image using an optical character recognition system.

9. The method as recited in claim 1 or 2 further comprising the step of reproducing said deskewed document image.

10. An optical character recognition device (OCR) programmed to determine skew of an image of a document, said OCR comprising:
   an optical scanner producing an image of said document, said image in the form of a digital data structure;

a digital processor programmed to input said image of said document; reduce said image using a thresholded reduction, said thresholded reduction mapping N×N squares of pixels into a destination image, said destination image having an ON pixel when a number of ON pixels in said square is equal to or greater than a threshold value; and determine a variance in a number of ON pixels in at least one scanline of said image as a function of document rotation angle, said variance including the sum of the number of ON pixels in said at least one scan line raised to a power greater than one, said skew located at a document rotation angle at which said variance is substantially a maximum;

rotating said image about an angle of about said skew to produce a deskewed image of said document; and means for identifying characters in said deskewed image of said document.

11. An optical character recognition device (OCR) programmed to determine skew of an image of a document, said OCR comprising:

an optical scanner producing an image of said document, said image in the form of a digital data structure;

a digital processor programmed to input said image of said document; reduce said image using a thresholded reduction, said thresholded reduction mapping N×N squares of pixels into a destination image, said destination image having an OFF pixel when a number of OFF pixels in said square is equal to or greater than a threshold value; and determine a variance in a number of OFF pixels in at least one scanline of said image as a function of document rotation angle, said variance including the sum of the number of ON pixels in said at least one scan line raised to a power greater than one, said skew located at a document rotation angle at which said variance is substantially a maximum;

rotating said image about an angle of about said skew to produce a deskewed image of said document; and means for identifying characters in said deskewed image of said document.

12. The digital processing device as recited in claims 17, or 18, programmed to input substantially all of the scanlines in a document are to calculate said variance.

13. The digital processing device as recited in claims 10, or 11, programmed to simulate said rotation angle by a vertical shear of said image.

14. The digital processing device as recited in claims 10, or 11, programmed to calculate said variance is over a range of about ±5 degrees of rotation.

15. The digital processing device as recited in claims 10, or 11, programmed to calculate said variance is at increments of about 0.2 degrees of rotation.

16. The digital processing device as recited in claim 10 or 11 programmed to rotate said image using at least about two orthogonal shears.

17. The digital processing device as recited in claim 10 or 11 further comprising an optical character recognition system for identifying characters in said image.

18. The digital processing device as recited in claim 10 or 11 further comprising reproduction means for reproducing said deskewed document image.

19. An electroreprographic (ER) copier programmed to determine skew of an image of a document, said ER copier comprising an optical scanner producing an image of said document, said image in the form of a digital data structure;

a digital processor programmed to input said image of said document; reduce said image using a thresholded reduction, said thresholded reduction mapping N×N squares of pixels into a destination image, said destination image having an ON pixel when a number of ON pixels in said square is equal to or greater than a threshold value; and determine a variance in a number of ON pixels in at least one scanline of said image as a function of document rotation angle, said variance including the sum of the number of ON pixels in said at least one scan line raised to a power greater than one, said skew located at a document rotation angle at which said variance is substantially a maximum;

means for rotating said image about an angle of about said skew to produce a deskewed image of said document; and means for outputting said deskewed image of said document.

20. An electroreprographic (ER) copier programmed to determine skew of an image of a document, said ER copier comprising:

an optical scanner producing an image of said document, said image in the form of a digital data structure;

a digital processor programmed to input said image of said document; reduce said image using a thresholded reduction, said thresholded reduction mapping N×N squares of pixels into a destination image, said destination image having an OFF pixel when a number of OFF pixels in said square is equal to or greater than a threshold value; and determine a variance in a number of OFF pixels in at least one scanline of said image as a function of document rotation angle, said variance including the sum of the number of ON pixels in said at least one scan line raised to a power greater than one, said skew located at a document rotation angle at which said variance is substantially a maximum;

means for rotating said image about an angle of about said skew to produce a deskewed image of said document; and means for outputting said deskewed image of said document.

* * * * *